(12) United States Patent
Kirker et al.

(10) Patent No.: US 7,294,274 B2
(45) Date of Patent: Nov. 13, 2007

(54) FILTRATION SYSTEM WITH ENHANCED CLEANING AND DYNAMIC FLUID SEPARATION

(75) Inventors: Curtis Kirker, Kamuela, HI (US); Berkeley F. Fuller, Kamuela, HI (US)

(73) Assignee: Phase Inc., Kamuela, HI (US)

( * ) Notice: Subject to any disclaimer, the term of this patent is extended or adjusted under 35 U.S.C. 154(b) by 0 days.

(21) Appl. No.: 10/902,771

(22) Filed: Jul. 30, 2004

(65) Prior Publication Data

US 2005/0023219 A1 Feb. 3, 2005

Related U.S. Application Data

(60) Provisional application No. 60/566,199, filed on Apr. 27, 2004, provisional application No. 60/491,581, filed on Jul. 30, 2003, provisional application No. 60/491,579, filed on Jul. 30, 2003, provisional application No. 60/491,572, filed on Jul. 30, 2003, provisional application No. 60/491,571, filed on Jul. 30, 2003.

(51) Int. Cl.
*B01D 65/00* (2006.01)
*B01D 61/00* (2006.01)
*B01D 63/00* (2006.01)
*C01F 1/44* (2006.01)

(52) U.S. Cl. .............. 210/636; 210/321.6; 210/321.69; 210/321.74; 210/321.84; 210/384; 210/388; 210/391; 210/407; 210/106; 210/650

(58) Field of Classification Search ........... 210/321.75, 210/321.8, 321.74, 384, 391, 407, 408, 413, 210/356, 650, 636, 106–107, 151, 321.6, 210/321.69, 321, 84, 388; 96/4–10
See application file for complete search history.

(56) References Cited

U.S. PATENT DOCUMENTS

| 2,028,168 | A | | 1/1936 | Roberts |
| 2,538,529 | A | | 1/1951 | Komline |
| 2,664,905 | A | | 1/1954 | Harstick ............... 494/4 |
| 2,688,437 | A | | 9/1954 | Monnet |
| 3,327,401 | A | | 6/1967 | Stamos et al. |
| 3,622,003 | A | * | 11/1971 | Czech et al. ......... 210/108 |
| 3,693,415 | A | | 9/1972 | Whittington ......... 73/67.9 |

(Continued)

FOREIGN PATENT DOCUMENTS

DE        246696        3/1910

(Continued)

OTHER PUBLICATIONS

International Search Report PCT/US 99/15891, 6 pages, Jul. 12, 1999.

(Continued)

*Primary Examiner*—Ana Fortuna
(74) *Attorney, Agent, or Firm*—Baker Botts L.L.P.

(57) ABSTRACT

A filtration system is provided with filter media operable to remove solids, particulate and colloidal matter from a process fluid. Acoustic, vibration and sonic energy may be used to clean associated filter media to allow substantially continuous filtration of process fluids. The filtration system may be satisfactorily used with process fluids having a relatively high concentrations of solids, particulate and colloidal matter.

19 Claims, 25 Drawing Sheets

U.S. PATENT DOCUMENTS

| | | | |
|---|---|---|---|
| 3,937,317 A | 2/1976 | Fleury, Jr. | |
| 3,940,056 A | 2/1976 | Schmidt | |
| 3,960,318 A | 6/1976 | Dahlberg | |
| 3,961,746 A | 6/1976 | Werner | |
| 3,967,778 A | 7/1976 | Hunwick | |
| 3,977,515 A | 8/1976 | Lewoczko | |
| 4,005,817 A | 2/1977 | Charlton | |
| 4,015,773 A | 4/1977 | Thylefors | |
| 4,027,820 A | 6/1977 | Kulker | |
| 4,067,494 A | 1/1978 | Willus | |
| 4,070,290 A | 1/1978 | Crosby | |
| 4,071,376 A | 1/1978 | McNeer | 134/1 |
| 4,083,488 A | 4/1978 | Gunnewig | 233/20 |
| 4,103,822 A | 8/1978 | Stroucken | |
| 4,149,668 A | 4/1979 | Zurbruggen | 233/20 |
| 4,164,317 A | 8/1979 | Nelson | 233/20 |
| 4,190,537 A | 2/1980 | Tondreau et al. | 210/98 |
| 4,251,023 A | 2/1981 | Hohne et al. | 233/1 |
| 4,253,962 A * | 3/1981 | Thompson | 210/414 |
| 4,288,029 A | 9/1981 | Epper et al. | 233/20 |
| 4,298,162 A | 11/1981 | Hohne | 233/7 |
| 4,311,270 A | 1/1982 | Hovstadius | 233/46 |
| 4,331,270 A | 5/1982 | Humlong | 224/32 R |
| 4,343,431 A | 8/1982 | Wehling | 233/20 |
| 4,375,870 A | 3/1983 | Bodelson | 494/40 |
| 4,379,976 A | 4/1983 | Pitchford | 310/83 |
| 4,381,849 A | 5/1983 | Conant | 494/43 |
| 4,410,319 A | 10/1983 | Zettier et al. | 494/29 |
| 4,430,221 A | 2/1984 | Spiewok | 210/380.1 |
| 4,490,133 A | 12/1984 | Zettier | 494/27 |
| 4,504,262 A | 3/1985 | Forsberg | 494/53 |
| 4,505,697 A | 3/1985 | Lee et al. | 494/35 |
| 4,514,183 A | 4/1985 | Kohlstette | 494/27 |
| 4,519,496 A | 5/1985 | Ludvigsen | 198/676 |
| 4,543,083 A | 9/1985 | Bounds | 494/4 |
| 4,569,761 A | 2/1986 | Spiewok et al. | 210/380.1 |
| 4,581,896 A | 4/1986 | Andresen et al. | 60/487 |
| 4,629,564 A | 12/1986 | Pinato | 210/512 |
| 4,643,709 A | 2/1987 | Lee et al. | 494/37 |
| 4,645,485 A | 2/1987 | Niemerg | 494/27 |
| 4,698,053 A | 10/1987 | Stroucken | 494/70 |
| 4,701,158 A | 10/1987 | Inge et al. | 494/74 |
| 4,707,259 A * | 11/1987 | Doucet | 210/351 |
| 4,710,159 A | 12/1987 | Gullers | 494/27 |
| 4,717,376 A | 1/1988 | Bruning et al. | 494/40 |
| 4,721,505 A | 1/1988 | Inge et al. | 494/74 |
| 4,729,759 A | 3/1988 | Krook et al. | 494/4 |
| 4,762,615 A * | 8/1988 | Drori | 210/333.01 |
| 4,784,634 A | 11/1988 | Schiele | 494/56 |
| 4,793,932 A * | 12/1988 | Ford et al. | 210/636 |
| 4,813,923 A | 3/1989 | Johansson | 494/48 |
| 4,820,256 A | 4/1989 | Nordstrom | 494/3 |
| 4,840,612 A | 6/1989 | Pallmar | 494/2 |
| 4,861,329 A | 8/1989 | Borgstrom et al. | 494/67 |
| 4,872,988 A | 10/1989 | Culkin | 210/636 |
| 4,876,006 A * | 10/1989 | Ohkubo et al. | 210/321.69 |
| 4,925,442 A | 5/1990 | Bodelson | 494/40 |
| 4,952,317 A | 8/1990 | Culkin | 210/636 |
| 4,978,331 A | 12/1990 | Luchetta et al. | 494/37 |
| 4,995,977 A * | 2/1991 | Hilgendorff et al. | 210/321.69 |
| 5,004,542 A | 4/1991 | Lyons et al. | 210/356 |
| 5,034,124 A | 7/1991 | Kopf | 210/231 |
| 5,045,049 A | 9/1991 | Lantz | 494/70 |
| 5,052,996 A | 10/1991 | Lantz | 494/68 |
| 5,100,556 A | 3/1992 | Nichols | 210/651 |
| 5,108,604 A | 4/1992 | Robbins | 210/321.74 |
| 5,143,613 A | 9/1992 | Bitter et al. | 210/321.8 |
| 5,182,019 A | 1/1993 | Cote et al. | 210/321.8 |
| 5,197,939 A | 3/1993 | Cederkvist et al. | 494/53 |
| 5,202,024 A | 4/1993 | Andersson et al. | 210/360 |
| 5,225,080 A * | 7/1993 | Karbachsch et al. | 210/321.75 |
| 5,234,605 A | 8/1993 | Reipur et al. | 210/741 |
| 5,244,584 A | 9/1993 | Schlieperskoetter | 210/787 |
| 5,275,725 A | 1/1994 | Ishii et al. | 210/321.67 |
| 5,304,312 A | 4/1994 | Forster et al. | 210/808 |
| 5,338,284 A | 8/1994 | Knelson | 494/28 |
| 5,362,292 A | 11/1994 | Borgstrom et al. | 494/74 |
| 5,366,625 A | 11/1994 | Pedersen et al. | 210/321.78 |
| 5,374,234 A | 12/1994 | Madsen | 494/53 |
| 5,380,434 A | 1/1995 | Paschedag | 210/360 |
| 5,397,471 A | 3/1995 | Rodebush et al. | 210/360 |
| 5,429,581 A | 7/1995 | Michaud et al. | 494/54 |
| 5,441,651 A * | 8/1995 | Yamaguchi et al. | 210/780 |
| 5,445,771 A | 8/1995 | Degen | 264/22 |
| 5,500,122 A * | 3/1996 | Schwartz | 210/321.75 |
| 5,550,022 A | 8/1996 | Chakraborty et al. | 435/6 |
| 5,575,910 A | 11/1996 | Karbachsch et al. | 210/321.75 |
| 5,599,271 A | 2/1997 | Eiken | |
| 5,601,522 A | 2/1997 | Piramoon | 156/172 |
| 5,601,524 A | 2/1997 | Knelson | |
| 5,618,409 A | 4/1997 | Kreill | |
| 5,685,980 A | 11/1997 | Patapoff et al. | 210/244 |
| 5,725,767 A | 3/1998 | Culkin | 210/321.75 |
| 5,759,744 A | 6/1998 | Brueck et al. | |
| 5,779,619 A | 7/1998 | Borgstrom et al. | |
| 5,792,037 A | 8/1998 | Bodelson et al. | |
| 5,820,767 A | 10/1998 | Kane et al. | 210/787 |
| 5,824,217 A | 10/1998 | Pearl et al. | 210/321.75 |
| 5,922,201 A | 7/1999 | Yamamori et al. | 210/321.79 |
| 5,979,668 A | 11/1999 | Kane et al. | 210/446 |
| 6,033,564 A | 3/2000 | Kirker et al. | |
| 6,106,715 A | 8/2000 | Thalmann et al. | 210/321.83 |
| 6,149,572 A | 11/2000 | Knelson | |
| 6,149,810 A | 11/2000 | Gonzalez-Martin et al. | 210/321.84 |
| 6,161,435 A * | 12/2000 | Bond et al. | 73/587 |
| 6,221,255 B1 * | 4/2001 | Vadoothker | 210/739 |
| 6,248,053 B1 | 6/2001 | Ehnstrom et al. | |
| 6,312,610 B1 | 11/2001 | Kirker et al. | |
| 6,322,698 B1 | 11/2001 | Rios et al. | |
| 6,332,913 B1 | 12/2001 | Breitschwerdt et al. | 95/55 |
| 6,358,193 B1 | 3/2002 | Nyberg | |
| 6,387,271 B1 | 5/2002 | Geibel et al. | 210/651 |
| 6,390,964 B1 | 5/2002 | Mackel | |
| 6,416,666 B1 | 7/2002 | Salyer et al. | 210/321.75 |
| 6,468,198 B1 | 10/2002 | Mackel | |
| 6,565,747 B1 | 5/2003 | Shintani et al. | 210/321.74 |
| 6,602,325 B1 | 8/2003 | Frost et al. | 95/96 |
| 6,613,231 B1 | 9/2003 | Jitariouk | 210/650 |
| 6,656,356 B2 | 12/2003 | Gungerich et al. | 210/321.8 |
| 6,673,242 B1 | 1/2004 | Herron | 210/321.74 |
| 6,685,832 B2 | 2/2004 | Mahendran et al. | 210/321.8 |
| 6,702,941 B1 | 3/2004 | Haq et al. | 210/315 |
| 6,706,180 B2 | 3/2004 | Kirker et al. | 210/232 |
| 6,706,189 B2 | 3/2004 | Rabie et al. | 210/636 |
| 6,708,957 B2 | 3/2004 | Guibert et al. | 261/23.1 |
| 6,739,459 B1 | 5/2004 | Hartmann | 210/457 |
| 6,770,202 B1 | 8/2004 | Kidd et al. | 210/650 |
| 6,787,046 B2 * | 9/2004 | De Kock et al. | 210/748 |
| 6,893,563 B2 | 5/2005 | Grummert | 210/321.84 |
| 6,919,006 B2 | 7/2005 | Ogle | 204/600 |
| 7,008,540 B1 | 3/2006 | Weavers et al. | 210/636 |
| 2002/0158008 A1 | 10/2002 | Kirker et al. | 210/512.1 |
| 2004/0016699 A1 | 1/2004 | Bayevsky | 210/636 |

FOREIGN PATENT DOCUMENTS

| | | |
|---|---|---|
| DE | 1755388 | 10/1957 |
| DE | 1632324 | 10/1970 |
| DE | 3409107 | 9/1985 |
| EP | 0346056 | 12/1989 |
| FR | 870450 | 3/1942 |
| FR | 1038726 | 10/1953 |
| JP | 2307587 | 12/1990 |

| | | |
|---|---|---|
| JP | 11330379 | 10/1999 |
| JP | 2001113204 A | 4/2001 |
| WO | 00/02663 | 1/2000 |
| WO | 02/42004 A1 | 5/2002 |

OTHER PUBLICATIONS

International Search Report PCT/US 02/13186, Sep. 10, 2002.
International Search Report PCT/US 02/36830, 8 pages, Mar. 12, 2003.
International Search Report PCT/US04/07384, 11 pages, Mailed Sep. 15, 2004.
International Search Report and Written Opinion for application No. PCT/US04/24661, 9 pages, Mailing Date Dec. 9, 2004.
PCT International Search Report PCT/US04/32817, 13 pages, Mailing Date Jan. 19, 2005.
PCT International Search Report PCT/US04/24664, 10 pages, Mailing Date Mar. 3, 2005.
International Search Report and Written Opinion for application No. PCT/US04/20528, 13 pages, Mailing Date Mar. 15, 2005.
Notification concerning transmittal of copy of international preliminary report on patentability for PCT/US04/007384, 7 pages, Mailed Sep. 29, 2005.
International Search Report for EP Application No. 04719722 (4 pages), Sep. 19, 2006.
International Search Report PCT/US04/07384, 11 pages, Mailed Sep. 15, 2004.
Supplemental European Search Report for Application No. 04719722 (5 pages).

* cited by examiner

FILTRATION SYSTEM WITH ENHANCED CLEANING AND DYNAMIC FLUID SEPARATION

CROSS REFERENCE TO RELATED APPLICATIONS

This application claims priority to U.S. Provisional Patent Application Ser. No. 60/491,581, filed Jul. 30, 2003, and entitled "Tensioned Leaf Filter Elements With Perpendicular Vibration."

This application also claims priority to U.S. Provisional Patent Application Ser. No. 60/491,579, filed Jul. 30, 2003, and entitled "Tensioned Stack Plate Filter With Perpendicular Vibration."

This application also claims priority to U.S. Provisional Patent Application Ser. No. 60/491,572, filed July 30, 2003, and entitled "Tensioned Leaf Filter Element With Perpendicular Vibration And Harmonics Control."

This application also claims priority to U.S. Provisional Patent Application Ser. No. 60/491,571, filed Jul. 30, 2003, and entitled "Tensioned Stack Plate Filter With Perpendicular Vibration And Harmonics Control."

This application also claims priority to U.S. Provisional Application Ser. No. 60/566,199, filed Apr. 27, 2004, and entitled "Method For Reducing Solids Bridging, Bio-Fouling And Mineral Blockages On Filter Media."

This application is related to application Ser. No. 10/903,932 filed Jul. 30, 2004, and entitled "Filtration System and Dynamic Fluid Separation Method."

TECHNICAL FIELD

This disclosure relates in general to the field of fluid separation, and more particularly to filtration systems with dynamic fluid separation and enhanced cleaning of associated filter media.

BACKGROUND OF THE INVENTION

An ongoing goal in the filtration industry is to perform filtration continuously for sustained periods, even when processing fluids with high amounts of solids or colloidal materials. A wide variety of filter media designs and configurations have been used in attempts to provide a continuous filtration process. This goal has led to several known techniques for continuously inhibiting the buildup of scale, solids cake or films which tend to deposit on and block passage of desired fluid flow through associated filter media. In some cases, these techniques are used intermittently, to perform what is called cyclic cleaning of filter media surfaces, usually when an associated filtration process has been suspended for such cleaning.

Filtration systems generally require periodic removal of clogged filter media or cleaning of filter media to remove particulate matter, solids and/or colloidal matter. Such materials often build up on upstream surfaces of filter media and reduce the rate permeate or clarified fluids may flow through the filter media. Examples include buildup of mineral scale, bridged solids cake or biological films. Intermittently stopping a filtration process to manually or chemically clean upstream surfaces of filter media or to backwash clarified fluid through associated filter media is generally inefficient, labor-intensive, and expensive.

In order to achieve sufficient surface area to serve in commercial scale filtration applications, multiple layers of filter media such as flat sheet membranes are often collected together within a single filtration device. Combining a plurality of sheet membranes may include arranging them in parallel stacks, mounted either horizontally or vertically, or, winding a relatively long single sheet into a spiral configuration.

Various batch cleaning and manual cleaning techniques have been used, such as backwashing, chemical washing or hand scrubbing of filter media. Other methods for inhibiting or alleviating scaling, caking and/or filming of filter media include application of relatively violent vibration of an entire filtration device parallel to the planes of a plurality of stacked filter media and directing air or other gaseous bubbles under pressure parallel with associated filter media.

U.S. Pat. Nos. 4,872,988; 4,952,317; 5,014,564; 5,725,767 and 6,322,698 teach relatively violent reciprocating, torsional vibration of an entire filtration devices parallel to the planes of associated stacked membranes. The patents teach shaking enclosing vessels, stacked filter leaves or plate frame filters along with associated plumbing and connecting devices, and the contained process fluid. Relatively high construction costs may be required to build structures that can withstand these constant reciprocating motions and high amounts of energy often required to generate such motion to provide commercially viable amounts of upstream membrane cleaning, for applications of sufficient value to justify the costs.

Another method used to inhibit membrane clogging by caking, scaling or filming, is the use of air bubbling. U.S. Pat. No. 6,287,467 teaches cleaning parallel mounted flat leaf elements via air bubbling. The associated leaf filter elements generally require maintenance of uniform, structurally braced spacing between each filter leaf element to provide access for air bubbles to all membrane surfaces. The rigidly held membrane surfaces may provide a highly stable platform on which solids cake may build up which the air bubbles can no longer remove such that manual cleaning may be required.

Filtration systems have previously included membranes and other types of filter media with rigid and solid reinforcing structures disposed generally parallel to, and in some cases within, a leaf type filter element or a plate frame filter element. Vibratory techniques such as ultrasonic excitation have been used for sensing membrane conditions, or applied to a single membrane surface, such as in small-scale laboratory explorations.

SUMMARY OF THE INVENTION

In accordance with teachings of the present invention a filtration system may be provided with at least one membrane sheet or other types of filter media tensioned along two or more edges, or along its entire periphery edge with a relatively open work space to accommodate cleaning of the filter media without stopping an associated filtration process. Tensioning filter media in accordance with teachings of the present invention allows membranes or other types of filter media to flex or bounce like a trampoline, or alternatively, stretch, so as to induce twisting, torsional or other surface changes, all enabling use of various techniques for cleaning membrane surfaces or other types of filter media while an associated filter system remains in full operation.

Another aspect of the present invention includes providing filter systems and filter elements satisfactory for cleaning to remove scale, solids cake and/or film layers without interrupting or stopping an associated filtration process. For example, filter elements may be formed with a central, open work area which is not blocked or obstructed by base plate stiffening members or mechanical spacing elements. As a result, the present invention allows direct vibration or alternatively acoustic and/or sonic waves to directly contact associated membranes or other types of filter media for cleaning.

The present invention allows various types of vibration devices and acoustic devices to clean large scale multi-membrane commercial filtration systems. Vibratory energy and/or acoustical energy may be applied generally perpendicular to the planes of membranes or other types of filter media in filtration systems having multiple filter elements and relatively large surface areas formed in accordance with teachings of the present invention. For some applications vibration and/or acoustic energy may be directed at an acute angle (less than 90° and greater than 10°) relative to associated membrane sheets and/or other types of filter media.

Technical benefits of the present invention include the ability to vary the angle of energy applied to filter media and to vary the type of energy applied to filter media to obtain optimum efficiency in cleaning scale, solids cake and/or film from the filter media. Also, the type of energy used to clean filter media may be varied depending upon the type of filter media and may also be varied based on characteristics of process fluid entering an associated filtration system.

Desired tensioning of a membrane may include an outer supporting ring or frame. The present invention may also include a relatively flexible membrane envelope, formed by sealingly joining two membrane sheets together at their peripheries. Such envelopes may form a complete filter element having two membranes, an enclosed and sealed inner space and a flow path to extract permeate from such space. The envelope may be tensioned to a surrounding support member such as a frame, a rack or the walls of a tank or vessel. The present invention teaches not only the use of vibratory and sonic energy presented generally perpendicular to such tensioned membrane envelopes, but also the ability to adjust the degree of tensioning, including varying the tensioning during dynamic filtration.

The present invention includes applying vectors of motion to, and otherwise making membrane surfaces or other types of filter media inhospitable to collections of solids cake, film or scale, in combination with existing filter media cleaning methods, including air bubbling and the vibration of flat sheet elements parallel to their respective planes.

Technical benefits of the present invention include substantially reducing or eliminating buildup of scale, solids cake and/or film on filter media. A filtration system formed in accordance with teachings of the present invention may provide efficient, cost effective filtration of a process fluid with reduced interruptions for cleaning of the filtration system. The present invention includes apparatus and methods to continuously clean membranes and other types of filter media without stopping or interrupting an associated filtration process. A first group includes improved cleaning techniques for membranes formed as relatively flat sheets and then mounted to function within a filtration device. A second group includes improved cleaning techniques for membranes, originally formed in flat sheet format, but then rolled or wound into a spiral configuration, which may then be mounted to function within a filtration device.

The present invention includes improved methods for upstream surface cleaning of filter media to substantially increase the type of techniques available for such cleaning, to provide flexible and greatly enhanced combinations of cleaning techniques, and to make such cleaning techniques available at substantially lower cost as compared with conventional filtration systems. Filtration systems formed in accordance with teachings of the present invention provide substantially continuous filtration for sustained periods of time, even when processing fluids which contain high amounts of solid, particulate or colloidal materials.

Filtration systems and cleaning methods incorporating teachings of the present invention may inhibit and/or continuously remove buildup of solids cake, mineral scale or biological films on upstream surfaces of filter devices which may include a plurality of stacked membrane sheets or a multi-layer, spiral wound membrane.

Filter elements formed in accordance with teachings of the present invention allow membrane sheets to flex, similar to the motion of a trampoline, during filtering operations. The membrane sheets may be alternating stretched and released either separately or in combination with other cleaning techniques which results in enhanced cleaning of associated membrane surfaces. Alternately, flexing and/or stretching of membrane surfaces may be combined with other methods for cleaning filter media such as air bubbling and/or vibration of the filter media.

The present invention teaches various techniques including apparatus and methods to clean filter media surfaces by stretching, flexing or vibrating surfaces of the filter media. For some applications acoustic energy, sonic energy and/or vibration energy may pass generally perpendicular through associated filter media.

For other applications acoustic energy, sonic energy and/or vibration energy may pass at an acute angle (less than 90° and greater than 10°) relative to surfaces of the media. The present invention allows selecting the type of cleaning energy and the optimum angle for applying such cleaning energy for enhanced performance of an associated filtration system based on characteristics of the filter media and process fluid. For some applications the type of cleaning energy and the angle associated with applying the cleaning energy may be varied based on changes in process fluid entering an associated filtration system.

BRIEF DESCRIPTION OF THE DRAWINGS

A more complete and thorough understanding of the present invention and advantages thereof may be acquired by referring to the following descriptions taken in conjunction with the accompanying drawings, in which like reference numbers indicate like features, and wherein.

DETAILED DESCRIPTION OF THE INVENTION

Various embodiments of the invention and its advantages are best understood by reference to FIGS. 1–33 wherein like numbers refer to same and like parts.

Dynamic filtration may be defined as the use of membranes or other filter media capable of substantially continuous operation with either no interruption of an associated filtration process or substantially reduced frequency of cleaning that interrupts an otherwise substantially continuous filtration process.

Process fluid may generally be defined as a fluid stream containing liquids and/or gases along with suspended solids, colloidal and/or particulate matter. Fluid permeable membranes and other types of filter media may be used to separate various components of a process fluid in accordance with teachings of the present invention.

Membranes and other types of filter media may have an upstream side, which is the side or face communicating with a process fluid. Membranes and other types of filter media generally have a downstream side communicating with clarified fluids removed from the process fluid. Clarified fluids may include liquids, gases, solids, particulate matter and/or colloidal matter which has been able to pass through or permeate an associated filter media. Clarified fluids may also be referred to as "permeate" or "permeate fluids".

Process fluids passing across the upstream side of a membrane or other filter media gradually loses associated liquid and/or gaseous components by permeating the filter media. The process fluid generally becomes relatively thicker with a higher concentration of solids, colloidal and/or particulate matter. The accumulation of these materials on the upstream side of a membrane or other filter media may be referred to as "retentate" or "concentrated fluid."

The term "filter media" may be used to include permeable membranes, sieves and any other filter material operable to separate a process fluid into selected components in accordance with teachings of the present invention. Filter media satisfactory for use with the present invention may be formed from woven materials, non-woven materials and perforated plastic films. Various types of filter media may be used based on desired characteristics such as ability of the filter media to separate liquids from gases and ability to separate suspended solids, colloidal and particulate matter from a fluid stream. Filter media may be selected with desired permeability or porosity for each application.

The term "fluid" may be used to include liquids, gases or a combination of liquids and gases.

The term "flux rate" may be used to define the rate at which a filter media separates retentate and clarified fluid from a process fluid.

The term "housing" may be used to include a container, tank, chamber, vessel, pressure vessel, cartridge, surrounding frame, plate frame system or any other structure suitable for holding filter media incorporating teachings of the present invention.

Figure 1:
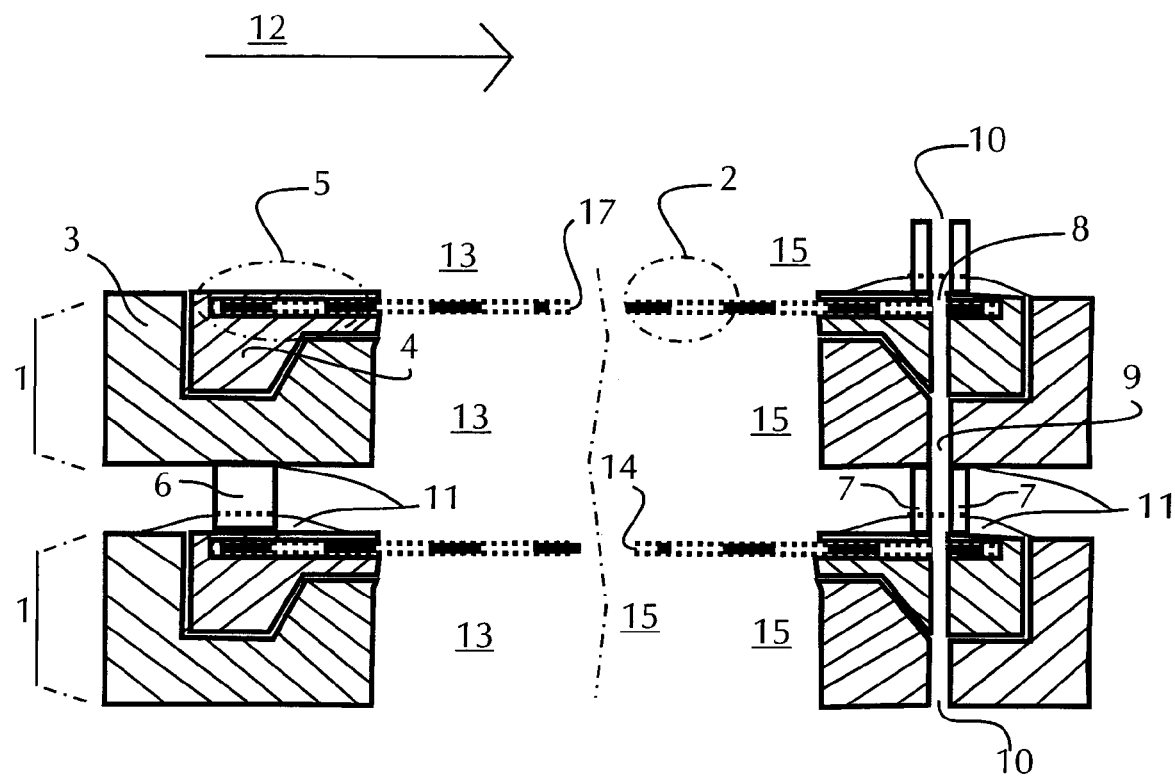
FIG. 1 is a schematic drawing in section with portions broken away showing a pair of filter elements stacked relative to each other to accommodate cleaning of associated filter media during a substantially continuous filtration process in accordance with teachings of the present invention.

FIG. 1 shows a cut-away side view of a two filter elements, stacked vertically and parallel to the planes of their membranes, constructed using a membrane tensioning device which enables various methods of membrane surface cleaning. Each of the two stacked filter elements in FIG. 1 depict two sections of a single peripheral mounting, anchoring and tensioning support element, with the left-hand section being relatively opposed to the right hand section, and with the connecting membrane envelope enclosed by said support element comprising an uninterrupted planar surface between the sections (see FIG. 2 for top perspective view of the entirety.)

Part 1 One of two filter element assemblies, in one particular construction embodiment of several, suitable for stacking as a plurality of such elements to attain substantial membrane surface area.

Part 2 A tensionable membrane envelope may include two or more fluid permeable membrane sheets, an interior separating layer or layers (spacer) operable to maintaining substantial spacing between interior surfaces of said sheets while allowing fluid flow between said sheets in a direction generally parallel thereto. Netting, cross bleed cloth or similar members may be used to form such spacers.

The membrane sheets may be formed from wholly aromatic polyamide and other man made materials. In the field of nanofiltration, the membrane sheets may be formed from polysulfones and other man made materials. Internal separating elements or spacers disposed between the membrane sheets may be formed from nylon, urethane and other man made materials. Cellulose acetate, polyamides and polyamides may also be used to form membranes and other types of filter media satisfactory for use with the present invention.

Part 3 An outer supporting element, such as a open center ring or frame, peripherally surrounding a tensioned membrane envelope (part 2), and serving as a anchoring element for an inner assembly including an inner tensioning ring member which member is sealingly and structurally joined to a membrane envelope. Said hollow-centered ring or frame may be circular, oval, rectangular or other practical shape, and may be cast or machined from any sufficiently rigid material.

Part 4 An inner supporting element, such as a open center ring or frame, sealingly and structurally joined to a tensionable membrane envelope (part 2), with such inner supporting element operable to apply generally uniform tension across the planar face of said envelope when mated with the outer supporting element (part 3).

Part 5 Connection between the tensionable membrane support element (part 2) and the inner supporting element (part 4), wherein such connection permeably seals and structurally joins the two membrane sheets and enclosed membrane spacing member or members together with one another, and also joins the peripheral edges of said resulting sealed envelope (part 2) radially to the inner supporting element (part 4), producing a integral assembly including the tensionable membrane envelope (part 2) and the inner supporting ring (part 4).

Part 6 Spacing members at some locations around the radial outer periphery of the filter element, serving to separate and space multiple stacked filter elements in this embodiment relatively apart from one another.

Part 7 Spacing members at one or more other locations around the radial outer periphery of the filter element, serving the same function as part 6 herein, but additionally having a hollow central space, such that this member additionally serves as a plumbing conduit for removal of permeate fluid accumulating within each interior of the tensioned membrane envelopes.

Part 8 Penetrations in the surfaces of the tensioned membrane envelopes' membranes, communicating with vertical channels or passages to permit the exit of permeate fluid from the interior of said envelopes and the passage of the permeate fluid to egress outlets.

Part 9 Passageways, in this embodiment vertically communicating with all of the tensioned membrane envelopes (parts 2) and with their respective membrane surface penetrations (parts 8), as flow paths for egress from said envelopes of permeate fluid, outbound to permeate fluid exits.

Part 10 One or more permeate fluid outlets from a stacked plurality of filter elements (parts 1), which outlets may communicate with an overall permeate fluid exit for an entire filtration device.

Part 11 Sealing devices or fluid barriers between parts 3 and 6, between parts 3 and 4, between parts 3 and 6, and between parts 4 and 7, which may include flanging and gasketing elements.

Part 12 Direction of process fluid flow across and through plurality of stacked filter elements of this embodiment, with process fluid entering from the left side as drawn, release substantial portions of its fluid through the permeable membrane surfaces of the tensioned membrane envelope (part 2), and with the remaining, impermeable materials from the process fluid exiting the stack of elements toward the right side as drawn.

Part 13 Locations of process fluid just after entering the central open work area in the unrestricted central spaces in each of the filter elements.

Part 14 Collecting regions or zones in the interiors of the tensioned membrane envelopes (part 2).

Part 15 Process fluid location and path, having been substantially de-liquefied by the loss of its permeable fluid elements through the surfaces of the tensioned membrane envelopes (parts 2), with such process fluid now becoming retentate materials, or those incapable of penetrating the membrane surfaces.

Figure 2:
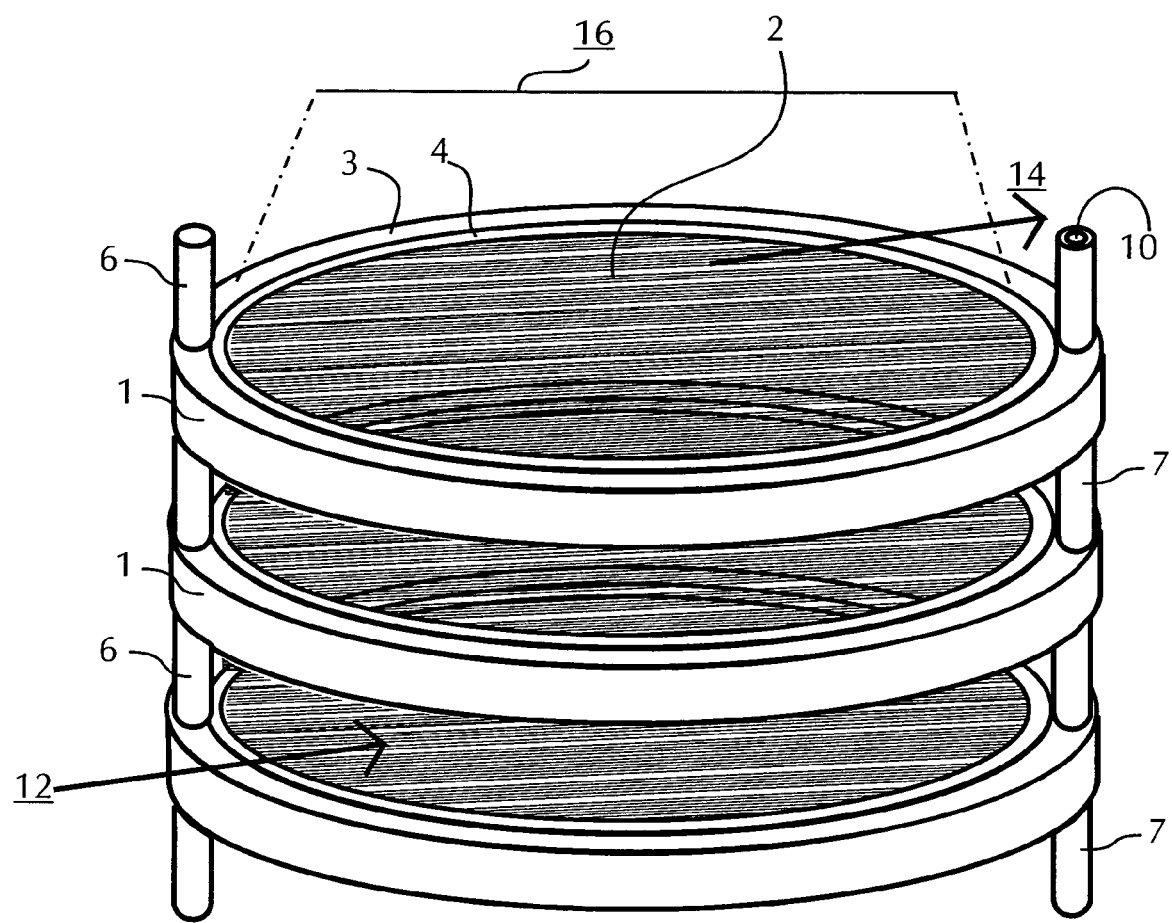
FIG. 2 is an isometric drawing with portions broken away showing three filter elements stacked relative to each other for enhanced cleaning of associated filter media during a substantially continuous filtration process in accordance with teachings of the present invention.

FIG. 2 shows a top perspective view of three filter elements (part 1 from FIG. 1), stacked vertically and parallel to the planes of their membranes, constructed using a membrane tensioning device so as to enable various improved membrane surface cleaning. Each of the stacked filter elements in FIG. 2 shows one example of peripheral mounting, anchoring and tensioning support which enables membrane surface cleaning methods of the present invention.

Part 1 One of two filter element assemblies, in one particular construction embodiment of several, suitable for stacking as a plurality of such elements to attain substantial membrane surface area.

Part 2 A tensionable membrane envelope may include two or more fluid permeable membrane sheets, an interior separating layer or layers (spacer) operable to maintaining substantial spacing between interior surfaces of said sheets while allowing fluid flow between said sheets in a direction generally parallel thereto. Netting, cross bleed cloth or similar materials may be used to form such spacers.

Part 3 An outer supporting element, such as a open center ring or frame, peripherally surrounding a tensioned membrane envelope (part 2), and serving as an anchoring element for an inner assembly having an inner tensioning ring member which is sealingly and structurally joined to a membrane envelope. Said hollow-centered ring or frame may be circular, oval, rectangular or other practical shape, and may be cast or machined from any sufficiently rigid material.

Part 4 An inner supporting element, such as a open center ring or frame, sealingly and structurally joined to a tensionable membrane envelope (part 2), with such inner supporting element operable to apply generally uniform tension across the planar face of said envelope when mated with the outer supporting element (part 3).

Part 6 Spacing members at some locations around the radial outer periphery of the filter element, serving to separate and space multiple stacked filter elements in this embodiment relatively apart from one another.

Part 7 Spacing members at one or more other locations around the radial outer periphery of the filter element, serving the same function as part 6 herein, but additionally having a hollow central space, such that this member additionally serves as a flow path for removal of permeate fluid accumulating within the interiors of the tensioned membrane envelopes.

Part 10 One or more permeate fluid outlets from a stacked plurality of filter elements (parts 1), which outlets may communicate with an overall permeate fluid exit for an entire filtration device.

Part 12 Direction of process fluid flow across and through plurality of stacked filter elements of this embodiment, with process fluid entering from the left side as drawn, release substantial portions of its fluid through the permeable membrane surfaces of the tensioned membrane envelope (part 2), and with the remaining, impermeable materials from the process fluid exiting the stack of elements toward the right side as drawn.

Part 14 Direction of retentate flow as it thickens and accumulates during its travel across the tensioned membrane envelope filter elements (parts 2). The open spaces (shown here exaggerated in vertical scale) between filter elements (parts 1) toward the right-hand side of a device as show in this figure, serve as egress path for the relatively de-liquefied retentate.

Part 16 Central open and unobstructed area of the tensioned membranes' workspaces, enabled by the membrane tensioning in accordance with teachings of the present invention, and permitting various cleaning techniques to be employed therein.

Figure 3:
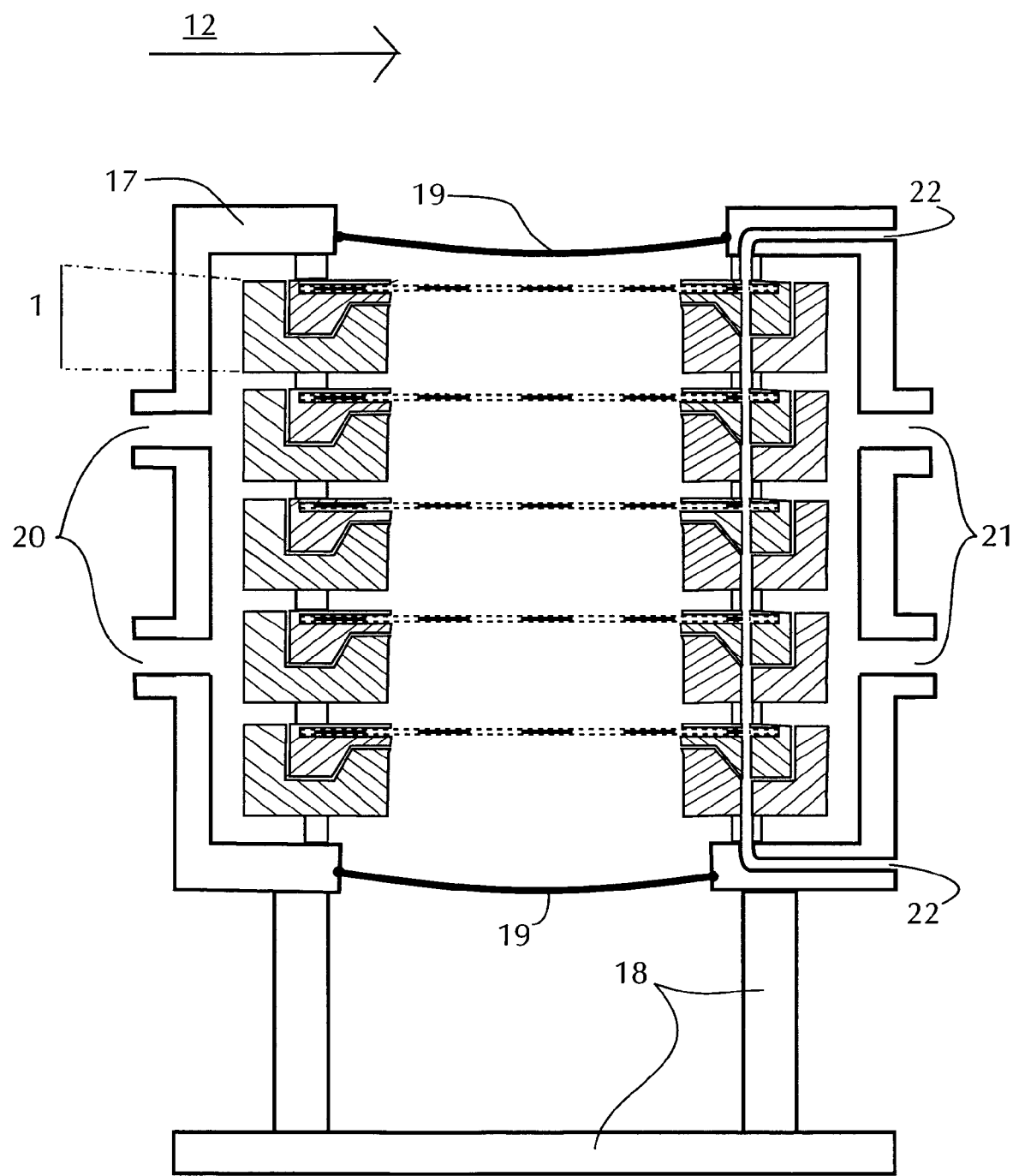
FIG. 3 is a schematic drawing in section and in elevation with portions broken away showing one example of a filtration system having filter elements and fluid flow paths formed in accordance with teachings of the present invention to accommodate cleaning during a filtration process.

FIG. 3 shows a cut-away side view of an entire filtration device, utilizing a stacked plurality of filter elements constructed using a membrane tensioning in accordance with teachings of the present invention, and showing placement of such filter elements within the entire apparatus, and also showing the practicality of construction, including fluid ingress and egress flow paths and other components associated with a functioning filtration system.

Part 12 Direction of process fluid flow across and through a plurality of stacked filter elements in this embodiment, with process fluid entering from the left side as drawn, releasing substantial portions of its fluid through the permeable membrane surfaces of the tensioned membrane envelope (part 2), and with the remaining, impermeable materials from the process fluid exiting the stack of elements toward the right side as drawn.

Part 17 Containing vessel or housing, which may also be a pressure vessel, for supporting and mounting all of the enclosed components including a plurality of stacked filter elements employing tensioned membrane envelopes in various embodiments, and also providing fluid flow paths for ingress and egress as described herein.

Part 18 Supporting and mounting structure for a containing vessel, such as a supporting base.

Part 19 Optional wall embodiments for the containing vessel (part 17), having one or more flexible outer walls in various locations, such as diaphragm-like impermeable membranes, for the purpose of enabling vibratory cleaning through associated open centers of stacked tensioned membrane envelope filter elements (part 1).

Part 20 One or more inlets into the overall filtration device, for the ingress of process fluid, which inlets may be located at various and multiple locations penetrating the outer wall of the containing vessel (part 17).

Part 21 One or more outlets from the interior of the overall filtration device, for the egress of accumulating, relatively de-liquefied retentate materials, which outlets may be located at various and multiple locations penetrating the outer wall of the containing vessel (part 17) and leading to exterior collection, further processing and/or disposal.

Part 22 One or more outlets communicating with one or more passageways which themselves communicate with the interiors of all the tensioned membrane envelopes (part 2), which outlets provide for egress of accumulating permeate liquid from the interior of said envelopes and leading to exterior collection, further processing, and/or disposal.

FIGS. 4 through 9 show six highly magnified, cut-away side views of the impact of vibration directed perpendicular to a membrane in accordance with teachings of the present invention. These six figures show the highly magnified sequence of a membrane sheet segment (part 23), one of the pair of tensioned membrane sheets forming a tensioned membrane envelope (part 2). In these six figures, the area above the magnified membrane sheet segment (part 23), represents process fluid communicating with the upstream side (part 24) of the membrane and therefore exterior to the flexible membrane envelope (part 2), whereas the area below the membrane sheet segment (part 23), which area is indicated as part 25, represents the interior or chamber of the tensioned membrane envelope, wherein permeate accumulates once it has negotiated through the membrane surface.

FIGS. 4 through 9 in particular illustrate the effects of a vibratory, acoustical or ultrasonic wave (part 26) moving generally perpendicular to the plane of said membrane in a reciprocating manner, first traveling upwards as shown in these figures (direction indicated by arrow, part 27) and then back downwards (indicated by the arrow, part 28).

These effects illustrated in FIGS. 4 through 9 include a vibratory wave upwardly moving or bouncing the membrane itself (part 23), upwardly moving the larger relatively solid or colloidal materials (part 29), upwardly moving the smaller water or other liquid components (parts 30). As the vibratory wave ends its trajectory and recedes relatively downwards, additional effects include the membrane (part 23) returning to its at-rest position, and the larger, solid or colloidal materials (parts 29) and the smaller liquid components (parts 30) falling gravitationally at different rates, due to their differing inertial masses. In sequence, these effects tend to lift blocking solid or colloidal materials upwards and away from the membrane surface, providing multiple opportunities on each vibratory sweep for gases, the smaller water molecules or other liquid components to permeate the membrane (part 23).

Part 23 Magnified cross section of a segment of one membrane sheet.

Part 24 Magnified cross section of process fluid communicating with the upstream surface of a membrane.

Part 25 Magnified cross section of permeate fluid, having passed through a membrane sheet and communicating with the downstream surface of that sheet.

Part 26 A vibratory wave, the direction of which in movement is relatively perpendicular to the plane of the membrane sheet (part 23), which wave may also move or bounce said sheet in its path, and which may also tend first to lift both relatively larger solid or colloidal materials (parts 29) and the relatively smaller liquid components (parts 30).

Part 27 Direction of vibratory wave (part 26) during the first half of a reciprocating linear motion.

Part 28 Directory of vibratory wave (part 26) during the second half of its reciprocating linear motion.

Figure 10:
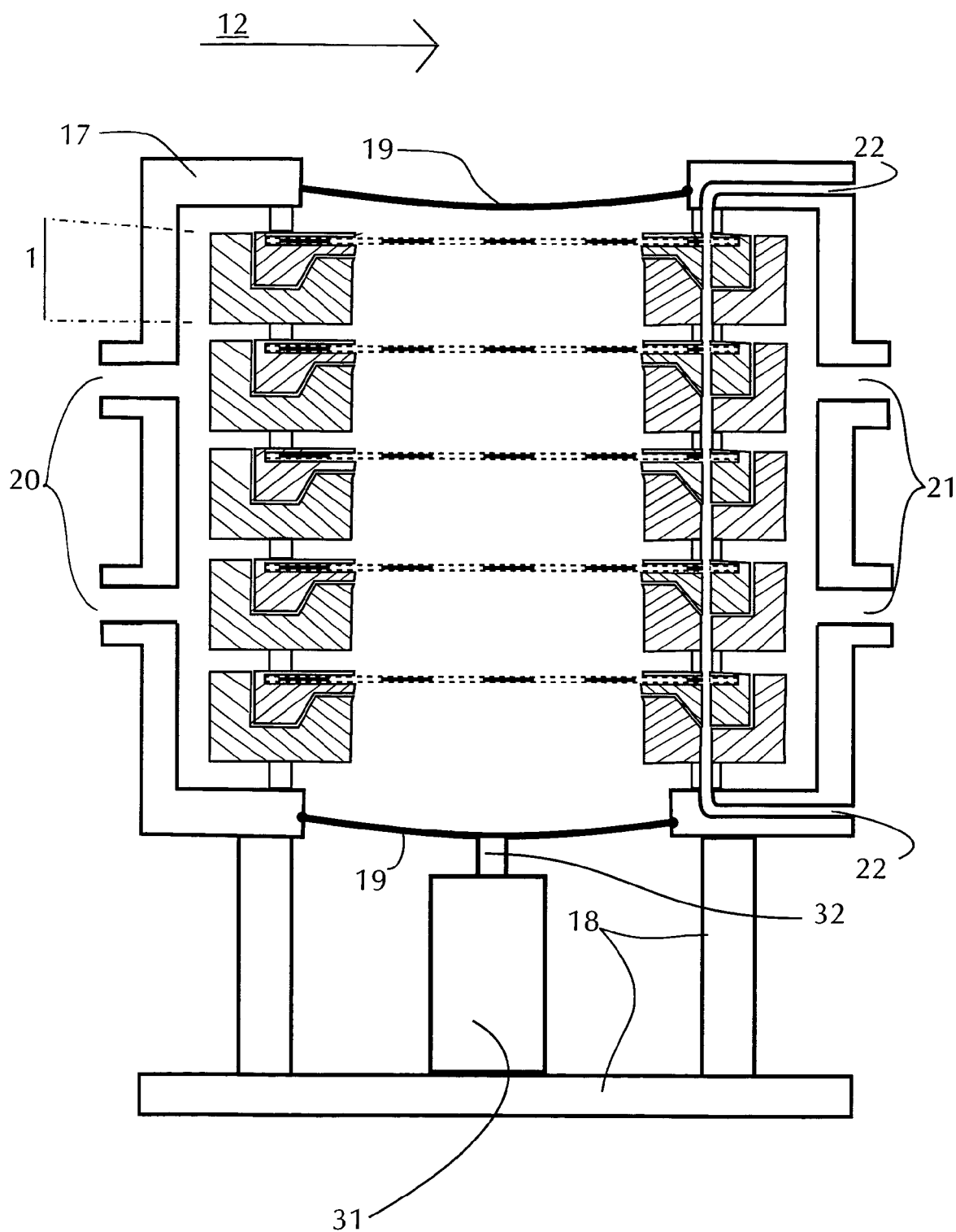
FIG. 10 is a schematic drawing in section with portions broken away of the filtration system in FIG. 3 combined with an energy source operable to clean associated filter media in accordance with teachings of the present invention.

FIG. 10 shows a cut-away side view of an entire present filtration device, utilizing a stacked plurality of filter elements constructed using a membrane tensioning techniques incorporating teachings of the present invention, and showing placement of such filter elements within the entire apparatus, and also showing the practicality of construction, including flow paths for fluid ingress and egress and other components required for a functioning filtration system, but additionally showing one of several continuous membrane cleaning techniques enabled by membrane tensioning, which cannot be achieved by conventional filter element construction and design.

Part 1 One of two filter element assemblies, in one particular construction embodiment of several, suitable for stacking as a plurality of such elements to attain substantial membrane surface area.

Part 12 Direction of process fluid flow across and through plurality of stacked filter elements of this embodiment, with process fluid entering from the left side as drawn, release substantial portions of its fluid through the permeable membrane surfaces of the tensioned membrane envelope (part 2), and with the remaining, impermeable materials from the process fluid exiting the stack of elements toward the right side as drawn.

Part 17 Containing vessel or housing, which may also be a pressure vessel, for supporting and mounting all of the enclosed components including a plurality of stacked filter elements employing tensioned membrane envelopes in various embodiments, and also providing fluid flow paths for ingress and egress as described herein.

Part 18 Supporting and mounting structure for a containing vessel, such as a supporting base.

Part 19 Optional wall embodiments for the containing vessel (part 17), having one or more flexible outer walls in various locations, such as diaphragm-like impermeable membranes, for the purpose of enabling vibratory cleaning through associated open centers of stacked tensioned membrane envelope filter elements (part 1).

Part 20 One or more inlets into the overall filtration device, for the ingress of process fluid, which inlets may be located at various and multiple locations penetrating the outer wall of the containing vessel (part 17).

Part 21 One or more outlets from the interior of the overall filtration device, for the egress of accumulating, relatively de-liquefied retentate materials, which outlets may be located at various and multiple locations penetrating the outer wall of the containing vessel (part 17) and leading to exterior collection, further processing and/or disposal.

Part 22 One or more outlets communicating with one or more passageways which themselves communicate with the interiors of all the tensioned membrane envelopes (part 2), which outlets provide for egress of accumulating permeate liquid from the interior of said envelopes and leading to exterior collection, further processing, and/or disposal.

Part 31 Device for producing linear reciprocating mechanical vibration, such as an air-powered vibratory generator, a motor-powered vibrator or other mechanism, such that the linear reciprocating motion is directed generally perpendicular to the planes of all the tensioned membrane envelopes (parts 2), and also such that, due to the unobstructed central work areas of all the filter elements (parts 1) enabled by a membrane tensioning in accordance with teachings of the present invention, said reciprocating linear vibration may penetrate and pass through all the membrane sheets of all said tensioned membrane envelopes (parts 2), thus imparting such motion differentially to said membrane sheets as well as to the liquid and relatively solid components of the process fluid, as shown in FIGS. 4–9 herein.

Part 32 Device for communicating reciprocating linear vibratory motions produced by part 31 to a flexible portion of the outer wall, such as a diaphragm-like element (part 19), which element in turn transmits such motions into the process fluid center central work space and through all of the tensioned membrane envelopes (parts 2).

Figure 11:
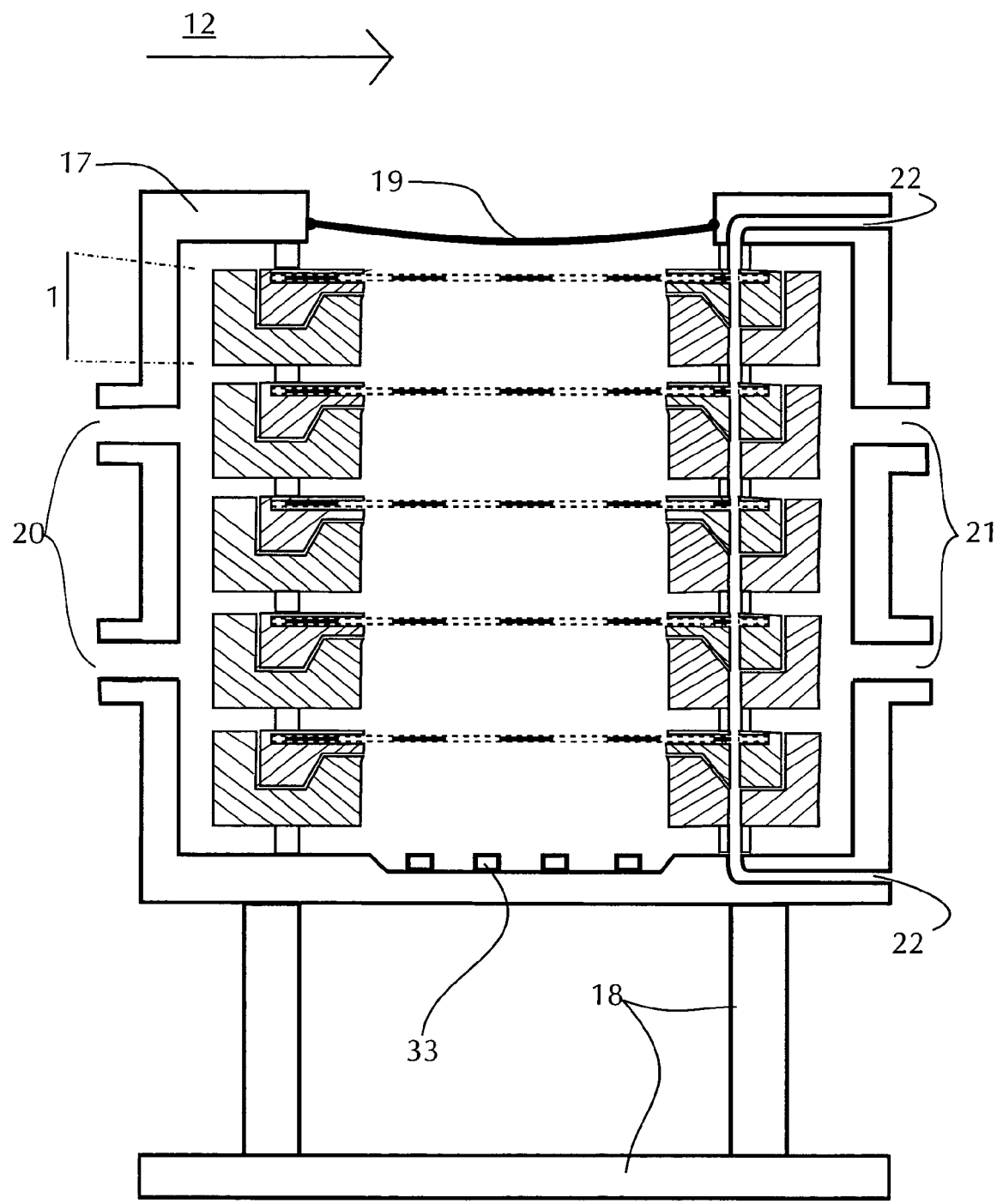
FIG. 11 is a schematic drawing in section with portions broken away showing the filtration system of FIG. 3 in combination with another type of energy source operable to clean associated filter media in accordance with teachings of the present invention.

FIG. 11 shows a cut-away side view of an entire filtration device, utilizing a stacked plurality of filter elements constructed using a membrane tensioning techniques incorporating teachings of the present invention, and showing placement of such filter elements within the entire apparatus, and also showing the practicality of construction, including flow paths for ingress and egress of fluids and other components required for a functioning filtration system, but additionally showing one of several continuous membrane cleaning techniques enabled by a membrane tensioning method of construction.

Part 12 Direction of process fluid flow across and through plurality of stacked filter elements of this embodiment, with process fluid entering from the left side as drawn, release substantial portions of its fluid through the permeable membrane surfaces of the tensioned membrane envelope (part 2), and with the remaining, impermeable materials from the process fluid exiting the stack of elements toward the right side as drawn.

Part 17 Containing vessel or housing, which may also be a pressure vessel, for supporting and mounting all of the enclosed components including a plurality of stacked filter elements employing tensioned membrane envelopes in various embodiments, and also providing fluid flow paths for ingress and egress as described herein.

Part 18 Supporting and mounting structure for a containing vessel, such as a supporting base.

Part 19 Optional wall embodiments for the containing vessel (part 17), having one or more flexible outer walls in various locations, such as diaphragm-like impermeable membranes, for the purpose of enabling vibratory cleaning through associated open centers of stacked tensioned membrane envelope filter elements (part 1).

Part 20 One or more inlets into the overall filtration device, for the ingress of process fluid, which inlets may be located at various and multiple locations penetrating the outer wall of the containing vessel (part 17).

Part 21 One or more outlets from the interior of the overall filtration device, for the egress of accumulating, relatively de-liquefied retentate materials, which outlets may be located at various and multiple locations penetrating the outer wall of the containing vessel (part 17) and leading to exterior collection, further processing and/or disposal.

Part 22 One or more outlets communicating with one or more passageways which themselves communicate with the interiors of all the tensioned membrane envelopes (part 2), which outlets provide for egress of accumulating permeate liquid from the interior of said envelopes and leading to exterior collection, further processing, and/or disposal.

Part 33 Apparatus operable to produce linear reciprocating ultrasonic vibration, such as but not limited to one or more upwards facing piezo-electric transducers, such that the linear reciprocating ultrasonic waves are directed perpendicular to the planes of all the tensioned membrane envelopes (parts 2), and also such that, due to the unobstructed central work areas of all the filter elements (parts 1) enabled by a membrane tensioning means of construction, said ultrasonic energy waves may penetrate and pass through all the membrane sheets of all said tensioned membrane envelopes (parts 2), thus imparting such motion differentially to said membrane sheets as well as to the liquid and relatively solid components of the process fluid, as shown in FIGS. 4–9 herein.

Figure 12:
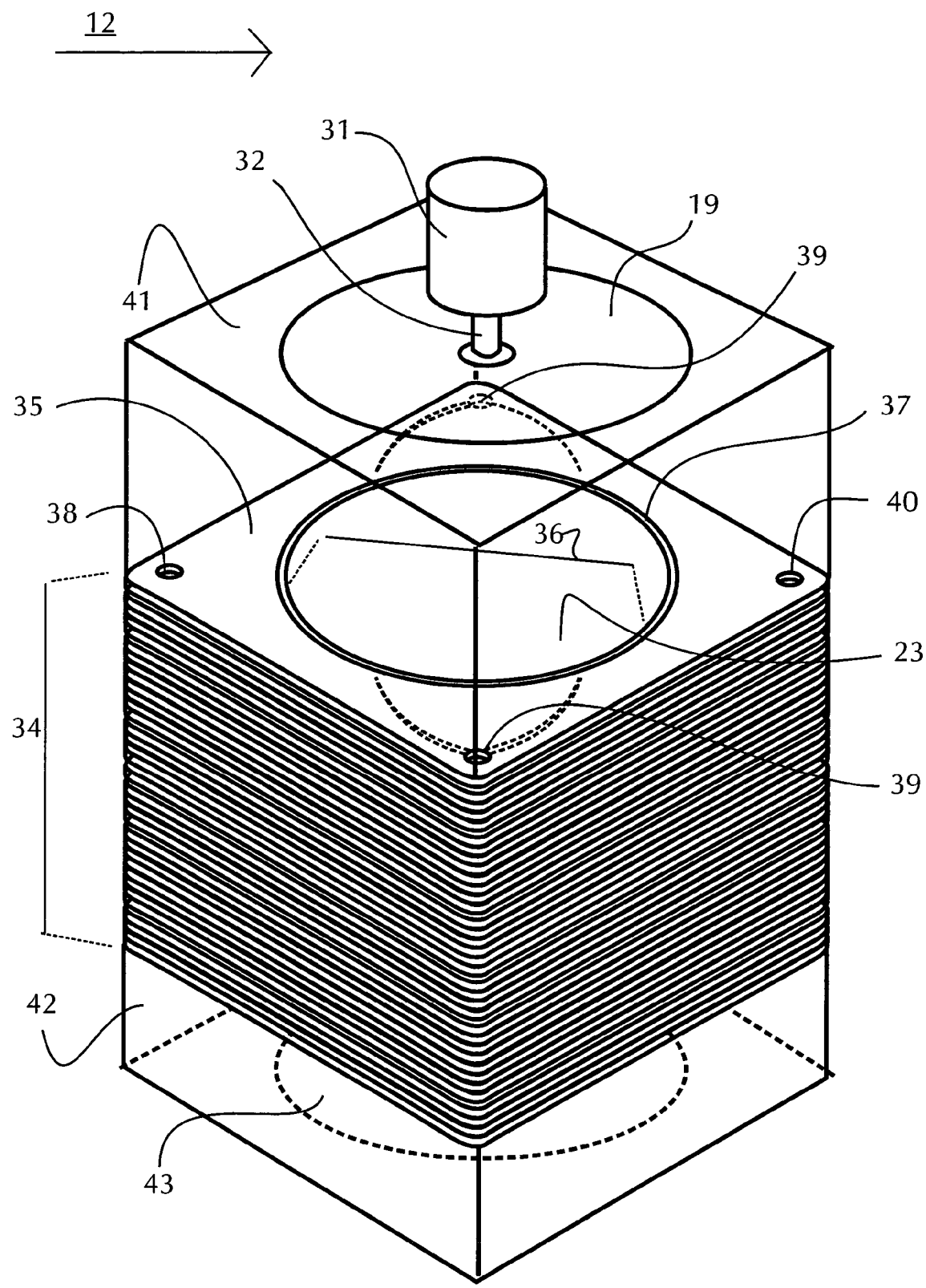
FIG. 12 is a schematic drawing showing an isometric view with portions broken away of a filtration system having a plurality of frame assemblies with each frame including a respective individual, tensioned membrane sheet along with an energy source operable to clean the membrane sheets in accordance with teachings of the present invention.

FIG. 12 shows a partially cut-away perspective view of an entire dynamic or continuous filtration device, incorporated using a plurality of stacked individual filter elements constructed using the tensioned membrane method of construction of the present invention. Each filter plate element may be constructed with membrane tensioning. This figure shows placement of such filter elements within the entire apparatus and also shows the practicality of construction, including fluid flow paths and other devices required for a functioning filtration system in combination with one of several continuous membrane cleaning techniques enabled by membrane tensioning.

Part 12 Direction of process fluid flow across and through plurality of stacked filter elements of this embodiment, with process fluid entering from the left side as drawn, release substantial portions of its fluid through the permeable membrane surfaces of the tensioned membrane envelope (part 2), and with the remaining, impermeable materials from the process fluid exiting the stack of elements toward the right side as drawn.

Part 19 Optional wall embodiments for the containing vessel (part 17), having one or more flexible outer walls in various locations, such as diaphragm-like impermeable membranes, for the purpose of enabling vibratory cleaning through associated open centers of stacked tensioned membrane envelope filter elements (part 1).

Part 23 A single membrane sheet, tensionally anchored and supported by an outer mounting and tensioning device, here via means of a plate frame element (part 35).

Part 31 Apparatus operable to produce linear reciprocating mechanical vibration, such as an air-powered vibratory generator, a motor-powered vibrator or other devices, such that linear reciprocating motion is directed perpendicular to the planes of all the tensioned membrane envelopes (parts 2), and also such that, due to the unobstructed central work areas of all the filter elements (parts 1) enabled by a membrane tensioning said reciprocating linear vibration may penetrate and pass through the membrane sheets of associated tensioned membrane envelopes (parts 2), thus imparting such motion differentially to said membrane sheets as well as to the liquid and relatively solid components of the process fluid, as shown in FIGS. 4–9 herein.

Part 32 Connector for communicating the reciprocating linear vibratory motions produced by part 31 to a flexible portion of the outer wall, such as a diaphragm-like element (part 19), which element in turn transmits such motions into the process fluid center central work space and through all of the tensioned membrane envelopes (parts 2).

Part 34 Symmetrically paired tensioned individual membrane sheets, anchored and held in uniform tension around their peripheries, such that each mated pair of plate frames (parts 35) comprises two tensioned membrane sheets, defining a sealed inner space between said sheets and within the periphery of the outer frame, with a plurality of such mated pairs of surrounding, anchoring and tensioning plate frames vertically stacked in parallel to form a filtration device including fluid flow paths and also an integral containment vessel, which may also be a pressure vessel.

Part 35 An individual plate frame element, one of a mated pair, which joined together and stacked as a plurality of such elements forms (part 34).

Part 36 Inner work area comprising a plurality of parallel stacked tensioned membranes, which work area is kept relatively open and unobstructed for the passage of fluid materials and of motions imparted to and through such membranes, as a result the membrane tensioning method of construction.

Part 37 Juncture between a tensioned membrane sheet and its peripheral anchoring, mounting and tensioning plate frame.

Part 38 Flow paths for the ingress of process fluid into all of the spaces between pairs of tensioned membranes, such that said fluid communicates with the upstream sides of all said membranes.

Part 39 Flow paths for the egress of permeate fluid from the interiors of all the pairs of tensioned membranes.

Part 40 Flow paths for the egress of retentate materials from the upstream surfaces of all tensioned membrane pairs of plate frames.

Part 41 Upper end cap or casing, communicating sealingly with the stack of plate frames (part 34), and operable to direct vibration energy generally perpendicular to and through the plurality of stacked tensioned filter elements.

Part 42 Lower end cap or casing, communicating sealingly with the stack of plate frames (part 34) and operable to receive vibration energy sent generally perpendicularly through the plurality of stacked tensioned filter elements, and optionally supporting energy absorbing material to disperse, absorb or dampen such received energy (see Part 43 above).

Part 43 Material or apparatus for dispersing, absorbing or dampening such received energy, such as but not limited to a flexible wall or other member in the lower end cap or casing (part 42), whose function may be provided by a diaphragm-like member.

Figure 13:
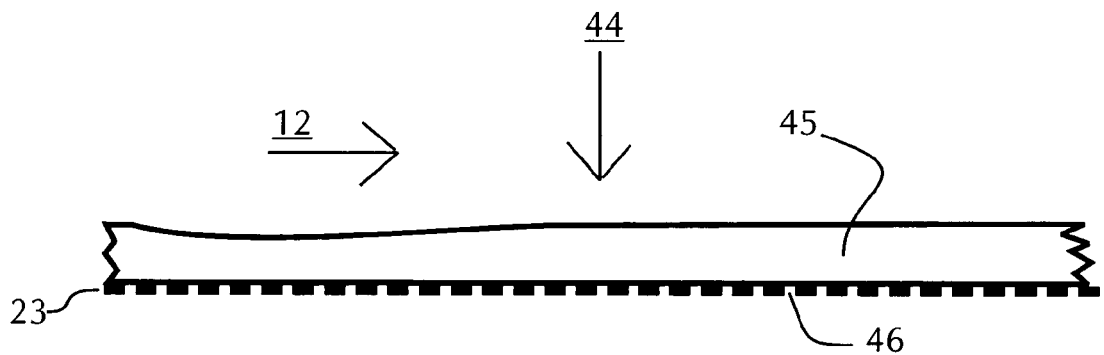
FIGS. 13, 14 and 15 are schematic drawings in section with portions broken away showing the results of alternately tensioning and relaxing a membrane sheet to remove a solids cake disposed on one surface of the membrane sheet.

FIG. 13 shows an enlarged cross-section of a single membrane sheet incorporating teachings of the present invention to enable tensioning of said sheet with said sheet in a relatively high state of tension.

Part 12 Arrow showing direction of process fluid flowing across a membrane sheet (part 23).

Part 23 An individual tensioned membrane sheet.

Part 44 Direction of process fluid pressurization against membrane surface (part 23), due to either a positive pressurization of the container or vessel containing the process fluid and the filtration elements, or to a negative pressurization (a vacuum) of the interiors of the tensioned membrane envelopes.

Part 45 Accumulation of solid, solids cake-like retentate material on the upstream side of a membrane (part 23), which solids cake tends to adhere due to the direction of permeate materials attempting to flux through the membrane (direction shown in arrow, part 44).

Part 46 An individual membrane sheet (part 23), here shown in one tensioning state during dynamic filtration, wherein said sheet is held relatively taut, by a relatively high tensioning pressure from its peripheral anchoring means, with solids cake (part 45) building up on the upstream membrane surface of part 23.

Figure 14:
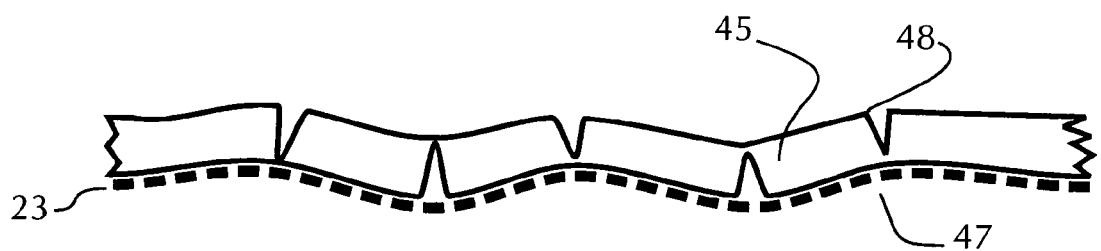

FIG. 14 shows an enlarged cross-section of the same membrane sheet as shown in FIG. 13 incorporating teachings of the present invention to allow variable tensioning of said membrane sheet with said membrane sheet in a relatively reduced or slack state of tension and showing the effects of varying tension on accumulating solid material.

Part 23 An individual tensioned membrane sheet.

Part 45 Accumulation of solid, solids cake-like retentate material on the upstream side of a membrane (part 23), which solids cake tends to adhere due to the direction of permeate materials attempting to flux through the membrane (direction shown in arrow, part 44).

Part 47 The individual membrane sheet of part 23, but here shown in a different tensioning state during dynamic filtration, whereby said sheet is held relatively looser, by relatively lower tensioning pressure from its peripheral anchoring means, with the solids cake (part 45) being brittle, beginning to rupture and dissolve, due to the change in shape of said membrane part 23.

Part 48 Depiction of solids cake on upstream surface of the membrane (part 23) beginning to rupture as its brittle composition fails to follow the change in shape of the membrane (part 23), due to a relaxation of membrane tension during filtration.

Figure 15:
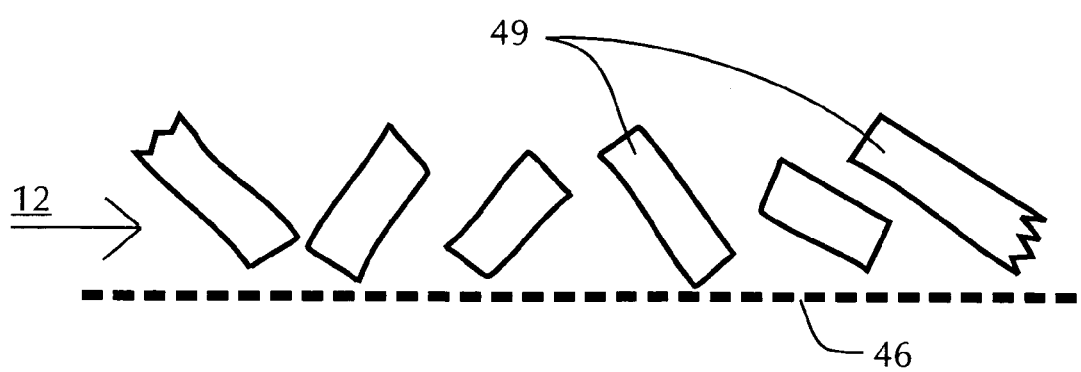

FIG. 15 shows an enlarged cross-sectional view of the same membrane sheet as shown in FIGS. 13 and 14 incorporating teachings of the present invention to allow variable tensioning of said membrane sheet with said membrane sheet returned to a relatively high state of tension and showing additional effects of varying tension on accumulating solids, scale or other undesired materials.

Part 12 Arrow showing direction of process fluid flowing across a membrane sheet (part 23).

Part 46 An individual membrane sheet (part 23), here shown being returned to the original tensioning state during dynamic filtration, wherein said sheet is returned to a relatively taut condition, by re-instating a high tensioning pressure from its peripheral anchoring means, serving essentially to spring the rupturing solids cake up from the membrane surface, where it tends to be moved laterally away from, and off of the membrane surface by the crossflow current (part 12) of the process fluid.

Part 49 Depiction of ruptured solids cake segments (parts 45) being lifted and scoured away from the re-tensioned membrane surface.

Figure 16:
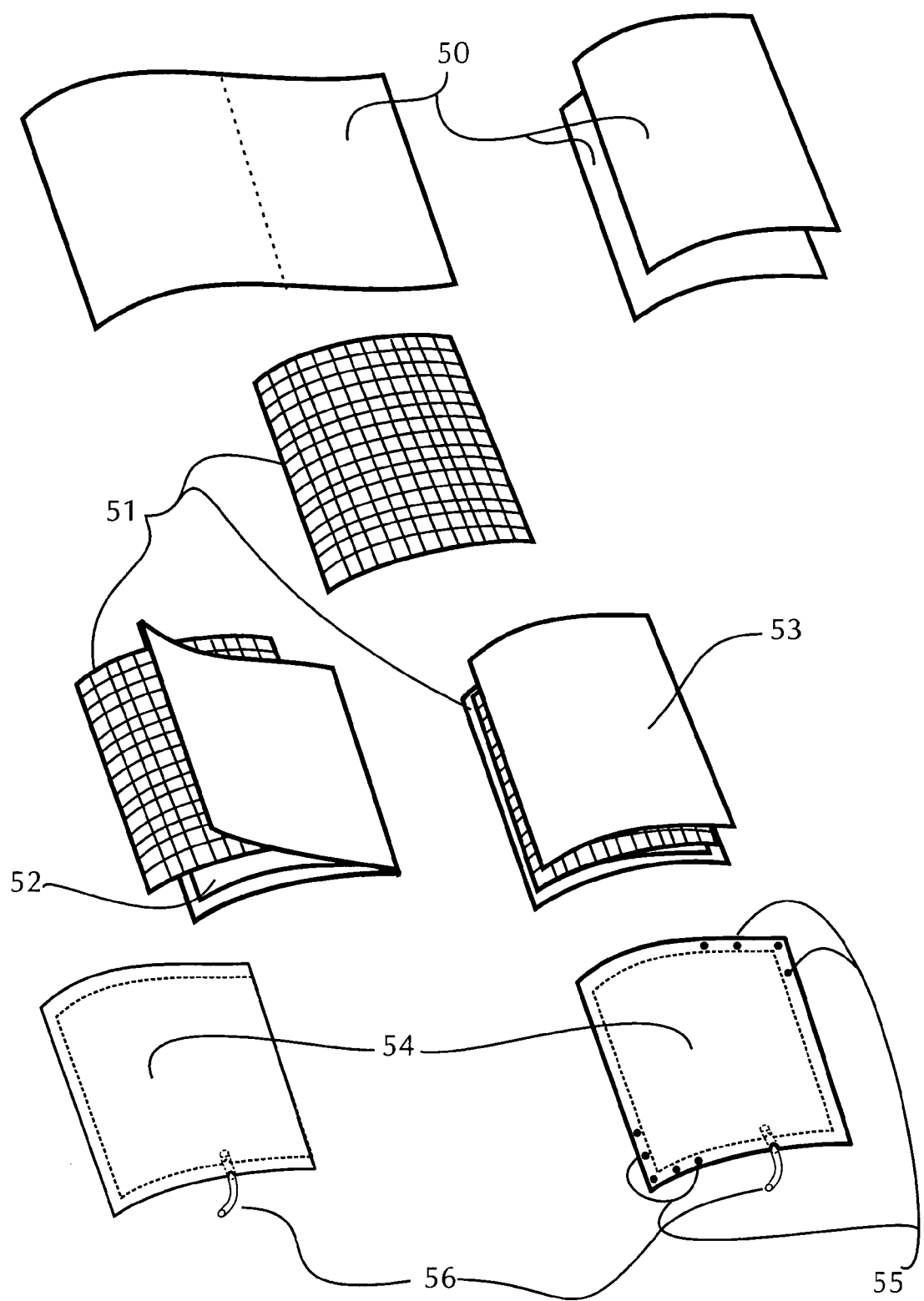
FIG. 16 is a schematic drawing showing a series of steps associated with forming one example of a membrane envelope satisfactory for use with a filtration system incorporating teachings of the present invention.

FIG. 16 shows a perspective view of embodiments of flexible sheet membranes, variously manipulated and sealingly joined to enclose a defined inner space, and resulting in a flexible membrane envelope, whose edges include connectors for tensioned anchoring of said envelope to a surrounding ring, frame, vessel of other support member. This figure is provided to demonstrate the practicality of constructing flexible membrane envelopes and then tensioning them in various embodiments, all to enable membrane cleaning in accordance with teachings of the present invention.

Part 50 Flexible sheet or sheets of filter membrane material.

Part 51 Separator or spacer to keep adjacent interior surfaces of two membrane sheets from directly communicating with each other, such as netting or bleed cloth, which permits substantially unrestricted flow of fluid between any two membranes in a direction substantially parallel to the planes of the membrane sheets.

Part 52 A single part 50 folded onto itself with the three non-folded edges sealingly joined to form an enclosed flexible membrane envelope.

Part 53 Two of parts 50 with all of their edges sealingly joined to form an enclosed flexible membrane envelope, and incorporating and holding in place the membrane separating means (part 51).

Part 54 Flexible membrane envelope formed by various edge-joining and sealing means from parts 50 and 51.

Part 55 Fastening device around the periphery of part 54, for joining a flexible membrane envelope via flexible connectors 57 communicating with an external structure for supporting and tensioning said envelope.

Part 56 Permeate exit conduit from flexible envelope part 54, with a sealed penetration into the interior of said envelope. The conduit may be a flexible tubing communicating to the exterior of an overall filtration device. The location of part or parts 56 may be as shown in this embodiment, or at any location or locations on the periphery of part 54.

Figure 17:
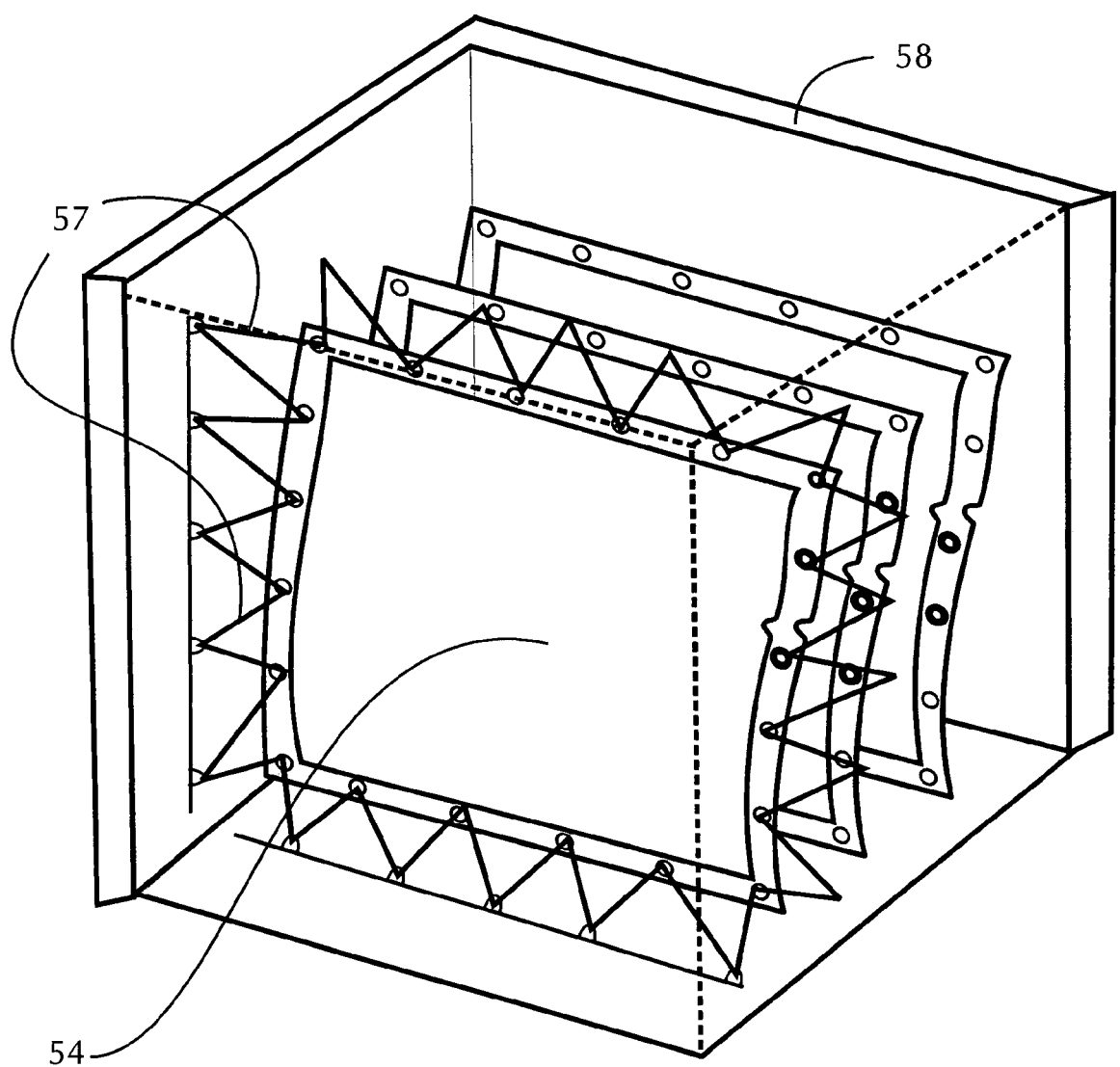
FIG. 17 is a schematic drawing showing an isometric view with portions broken away of a filtration system having a plurality of flexible membrane envelopes attached by resilient connectors with adjacent portions of a housing in accordance with teachings of the present invention.

FIG. 17 shows a perspective view of an embodiment whereby a flexible membrane envelope may be tensionally anchored and mounted directly to the walls of a containment vessel. This embodiment may additionally include intermediary mounting devices, such as fixtures on or in said containment vessel walls. This embodiment is shown to illustrate multiple techniques clean membrane surfaces during filtration, which follow in later figures.

Part 54 A flexible membrane envelope formed as in FIG. 16.

Part 57 Relatively flexible and tensionable connectors attached to fastening devices 55 disposed in the periphery of part 54. Flexible connectors 57 are also joined with an external frame, rack or to walls of a containing vessel, tank or cartridge, such as that shown as part 58. Various types of springs and stretchable elastomeric materials may be used as flexible connectors 57.

Part 58 A containment vessel, to additionally serve as a surrounding frame on which to anchor and tension one or a plurality of stacked, tensionally anchored and mounted filter elements by any of various standard fastening devices.

Figure 18:
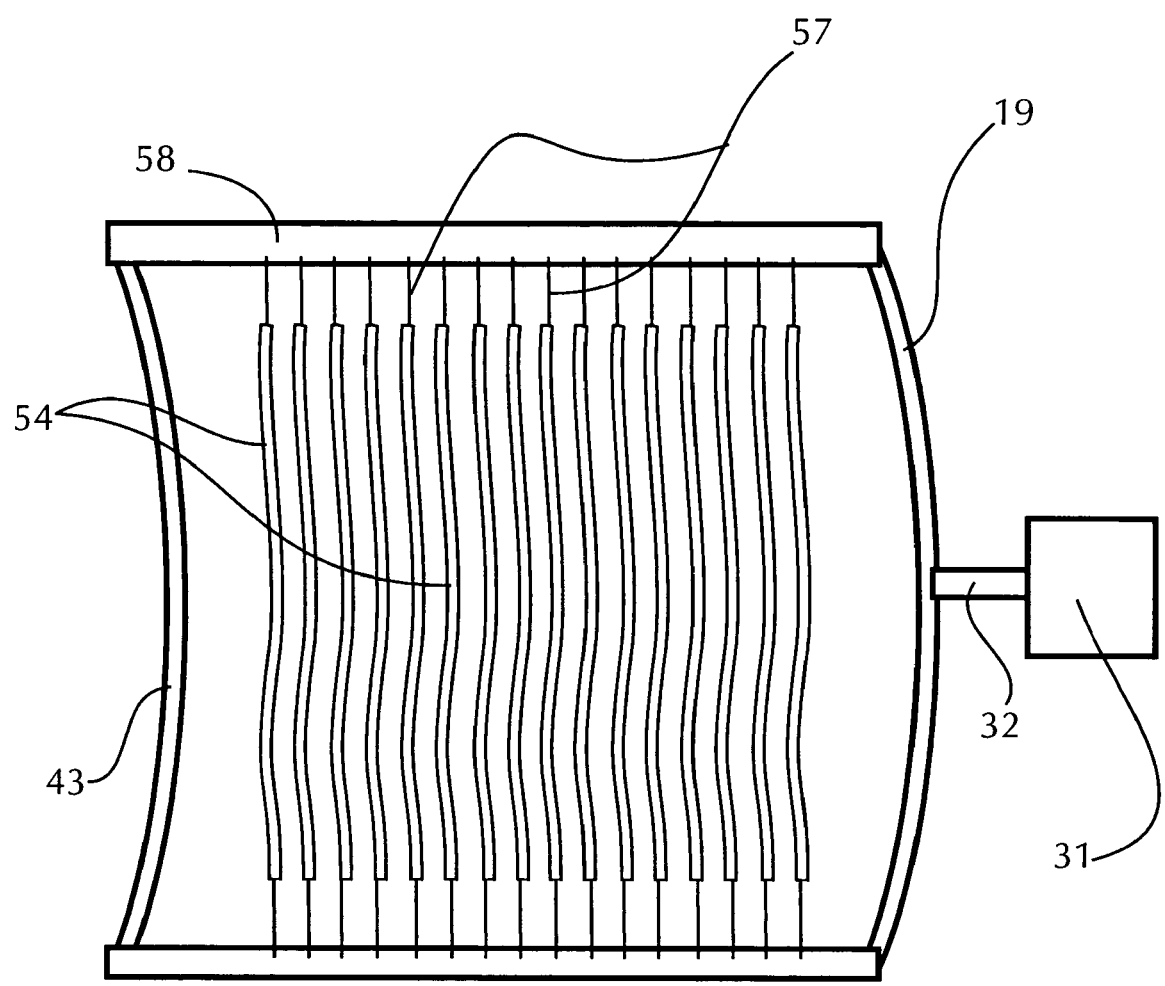
FIG. 18 is a schematic drawing in section with portions broken away showing a filtration system having a plurality of flexible membrane envelopes and an energy source operable to clean surfaces of the membrane envelopes in accordance with teachings of the present invention.

FIG. 18 shows a cut-away side view of a possible embodiment wherein multiple tensioned membrane elements are stacked in parallel within a vessel, wherein such tensioned membrane elements function analogously to filter elements. Note that fluid flow paths for injecting process fluid into the vessel and for egress of accumulated permeate fluid and retentate are not depicted in this figure. Alternative features in this embodiment are also shown in this figure, namely, relatively flexible but fluid impermeable elements at either end (in the figure, left and right walls of the vessel), permitting a diaphragm-like movement of vessel contents on an axis perpendicular to the planes of said elements, and also optionally, an energy source for imparting vibratory or acoustical energy through the vessel, through its fluid contents and through all of the membrane sheets perpendicular to their planes, due to the tensioned membrane envelopes' unrestricted, open central spaces, which unobstructed work area is made possible by the tensioning method of construction of the present invention.

Parts 19 and 43

Optional embodiment (parts 19 and 43), comprising one or more fluid impermeable and relatively flexible, diaphragm-like elements communicating sealingly with the outer containment vessel or tank (part 58) and mounted relatively parallel to the tensioned membrane planes (parts 54).

Part 31 Membrane cleaning device for generating reciprocating mechanical or acoustical vibration, in a direction substantially perpendicular to the planes of the stacked tensioned membrane elements.

Part 32 Optional embodiment of transmitting the reciprocating mechanical or acoustical vibration produced by part 31, into and through the fluid and tensioned membrane surfaces, substantially perpendicular to the plane of those surfaces.

Part 54 Plurality of stacked tensioned membrane envelopes within an enclosing vessel.

Part 57 Relatively flexible and tensionable means of connecting, anchoring and tensioning the peripheries of the tensioned filter envelopes (part 54).

Part 58 A vessel, tank, cartridge or other container enclosing a plurality of stacked, tensionally constructed filter envelopes (parts 54).

Figure 19:
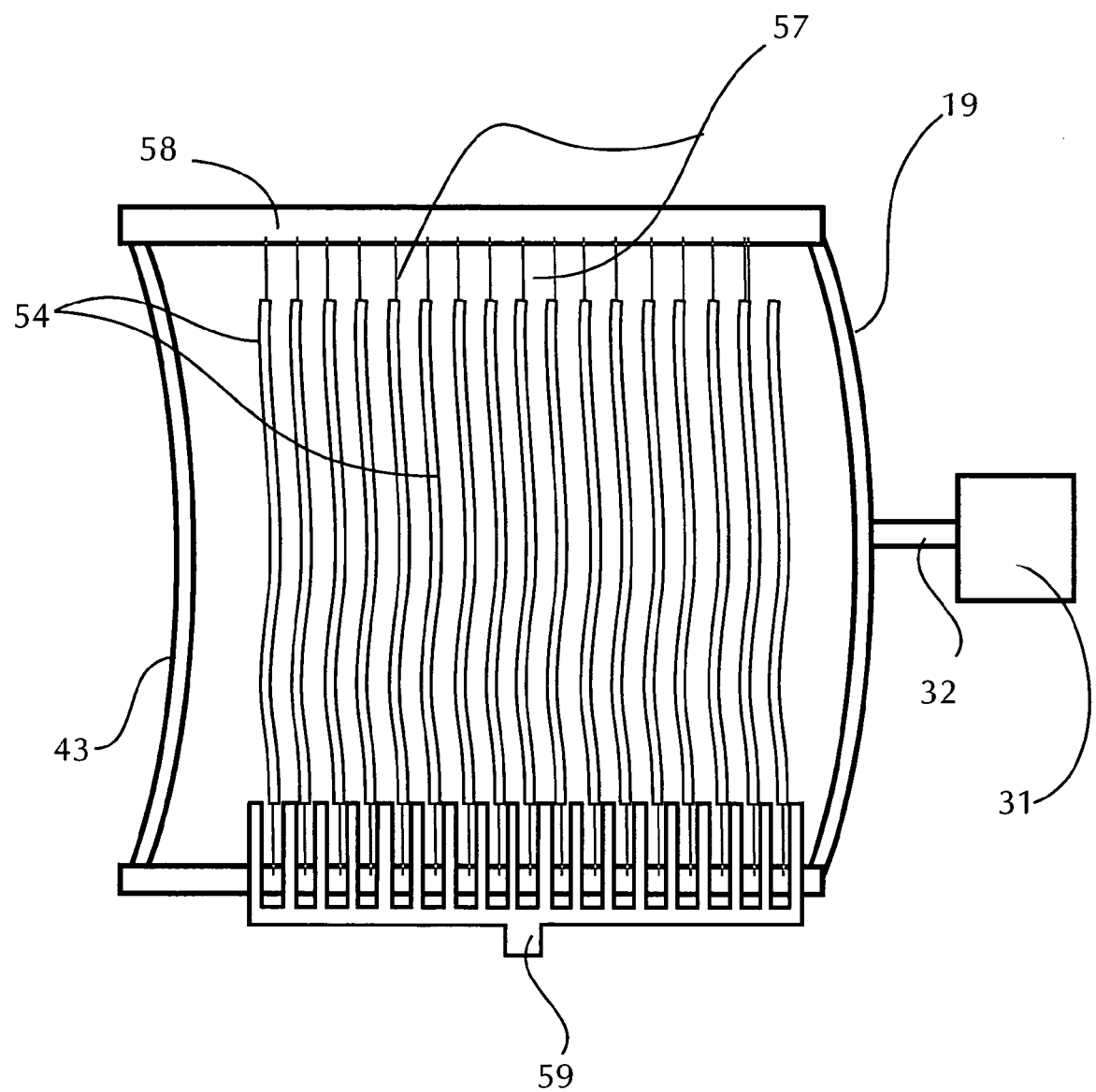
FIG. 19 is a schematic drawing in section with portions broken away showing the filtration system of FIG. 18 in combination with a manifold operable to inject air bubbles or other gases into the filtration system to assist in cleaning associated membrane surfaces.

FIG. 19 shows a similar filtration device embodiment to that shown in FIG. 18 along with two techniques for membrane cleaning. The method of imparting vibratory or acoustical wave energy perpendicular to and through the plurality of tensioned membrane envelopes for cleaning purposes may be combined, with conventional direction of compressed air or other gas bubbles through all of the filter elements, on their upstream membrane sides, in a direction relatively parallel to the planes of the membranes. The excitement, bouncing and flexion of the membrane sheets caused by the perpendicular vibrations tends to dislodge solids cake, film and scale material from their surfaces, greatly facilitating the removal of such materials by continuous or intermittent air bubbling.

Parts 19 and 43 optional embodiment comprising one or more fluid impermeable and relatively flexible, diaphragm-like elements communicating sealingly with the outer containment vessel or tank (part 58) and mounted relatively parallel to the tensioned membrane planes (parts 54).

Part 31 Membrane cleaning apparatus for generating reciprocating mechanical or acoustical vibration, in a direction substantially perpendicular to the planes of the stacked tensioned membrane elements.

Part 32 Optional embodiment to transmit reciprocating mechanical or acoustical vibration produced by part 31, into and through the fluid and tensioned membrane surfaces, substantially perpendicular to the plane of those surfaces.

Part 54 Plurality of stacked tensioned membrane envelopes within an enclosing vessel.

Part 57 Relatively flexible and tensionable connector for anchoring and tensioning the peripheries of the tensioned filter envelopes (part 54).

Part 58 A vessel, tank, cartridge or other container enclosing a plurality of stacked, tensionally constructed filter envelopes (parts 54).

Part 59 Manifold or similar collection and injection device for introducing bubbles into a filtration system and into process fluid areas communicating with all upstream membrane surfaces of the plurality of tensioned membrane envelopes (parts 54).

Figure 20:
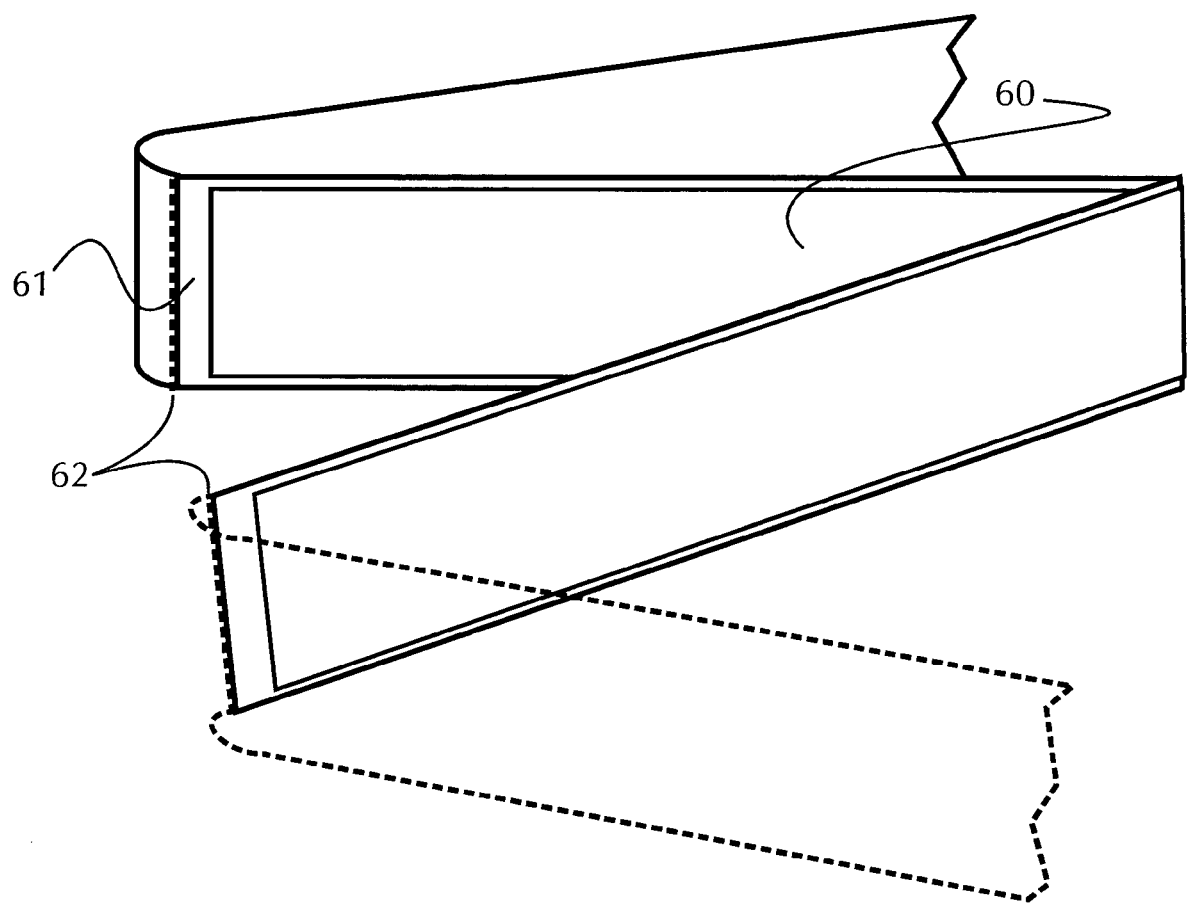
FIG. 20 is a schematic drawing showing an isometric view with portions broken away of a series of flexible membrane envelopes coupled with each other which may be used to form a roll incorporating teachings of the present invention.

FIG. 20 shows a perspective view of an embodiment of a flexible membrane envelope formed by sealed joining of a multi-layer sandwich of two flexible membrane sheets, such that said envelope embodiment is substantially longer than it is wide, and may be formed in a continuous or endless format, with internal sealing dividers placed at intervals along its length, and further, with optional perforations at such sealed divider points, to perform the function of breaking off segments of said envelope without disturbing the function of any segment continuing to act as a sealed envelope containing a separate, defined inner space. This embodiment is presented not to claim its method of tensioned membrane envelope construction, but rather because such a tensioned membrane envelope embodiment supports additional membrane cleaning techniques in accordance with teachings of the present invention.

Part 60 Embodiment of a flexible membrane envelope, formed in a continuous or substantially endless shape.

Part 61 Intermittently spaced, internally sealing dividers, optionally sealing off one longitudinal segment of the relatively continuous flexible membrane envelope from the next.

Figure 21:
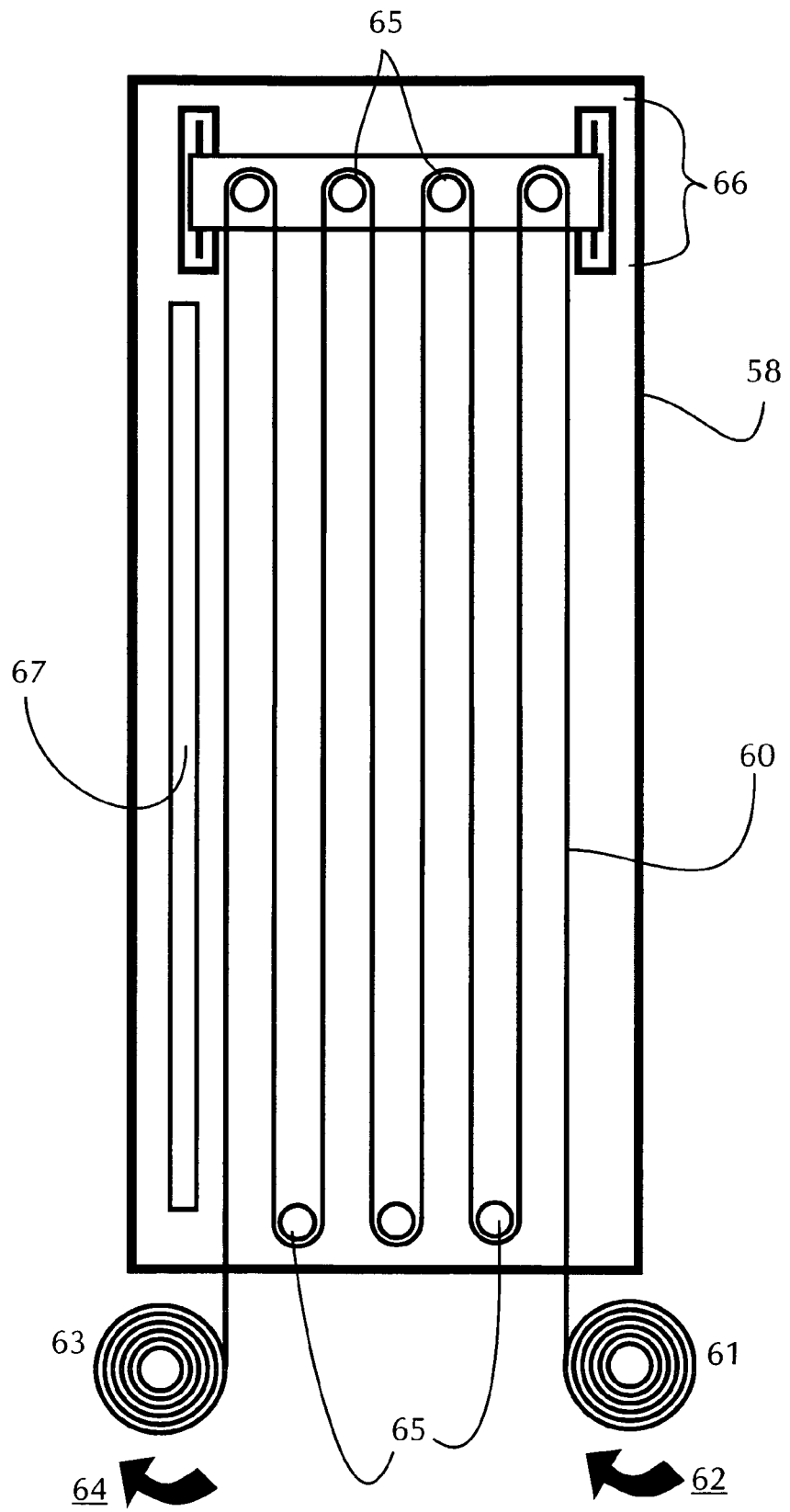
FIG. 21 is a schematic drawing in section with portions broken away showing a filtration system with a roll of filter media operable for movement therethrough in combination with a variable tensioning device engaged with the roll of filter media and an energy source operable to clean the filter media in accordance with teachings of the present invention.

Part 62 Intermittently spaced connector for separation of one segment of a continuous flexible membrane from another, such as a perforation or other removable connector, spaced within part 60, so that both segments retain their sealingly separate interior space after separation FIG. 21 shows a top view of an embodiment of membrane tensioning construction and mounting, wherein a continuous or substantially endless roll embodiment of a flexible membrane envelope is anchored via mounting between a feed and a take-up roller mechanically communicating with a rigid support element such as a containment vessel or tank, and incorporating with intermediate rollers so located as to provide relative evenness of tensioning on all segments of the flexible membrane element.

This figure illustrates how this embodiment of membrane tensioning and mounting allows varying the amount of tension by which a flexible membrane envelope may be held and suspended within a supporting structure such as a containment vessel or tank, such that the variation of such tensioning may be achieved at any time during filtration, and also an energy source for directing mechanical or acoustical vibration perpendicular to and through the tensioned flat planes of all segments of the continuous membrane envelope within the supporting frame or tank. The variable tensioning during dynamic filtration will serve to undermine the physical support of any solids cake clinging to said surfaces, which effect will be enhanced and increased by the simultaneous passage of vibratory energy against and through all of the membrane surfaces.

Part 58 A containment vessel, to additionally serve as a surrounding frame on which to anchor and tension one or a plurality of stacked, tensionally anchored and mounted filter elements.

Part 60 Embodiment of a flexible membrane envelope, formed in a continuous or substantially endless shape.

Part 61 Feed roller on which an unused quantity of part 60 may be mounted, held and stored.

Part 62 Arrow indicating direction in which part 60 may be unrolled from roller part 61.

Part 63 Take-up roller on which a used quantity or segments of part 60 may be captured, held and stored.

Part 64 Arrow indicating direction in which part 50 may be rolled up upon roller part 63.

Part 65 Intermediate tensioning rollers, for maintaining a relatively even tension on all continuous segments of a flexible membrane element part 60

Part 66 Variable tensioner operable to vary the amount of tensioning applied in a relatively uniform manner to all segments of a flexible membrane envelope part 60, either during or between filtration operations. Such device may include a sliding mechanism communicating with all of the intermediate tensioning rollers parts 65 on one side of a support frame or supporting tank walls, such that said sliding mechanism may move all such roller parts further away or closer to the opposite wall of said frame or tank, thus varying the tension on all segments of a tensioned flexible membrane envelope part 60.

Part 67 Energy source for generating and imparting acoustical or mechanical vibration directed perpendicular to and through the parallel planes of flexible membrane envelopes mounted tensionally across a frame or enclosing vessel.

Figure 22:
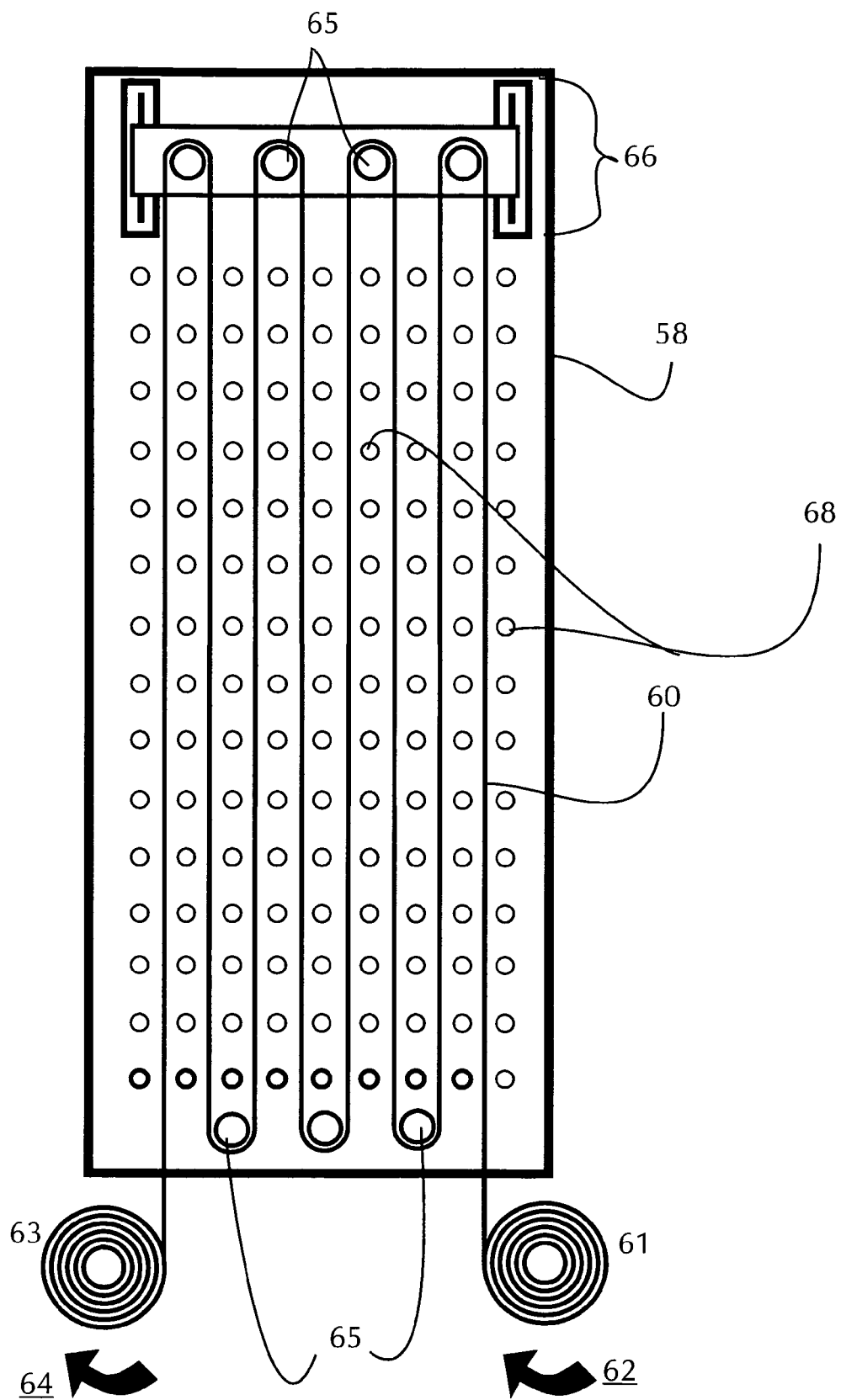
FIG. 22 is a schematic drawing in section with portions broken away showing a filtration system with a roll of filter media operable for movement therethrough in combination with a variable tensioning device engaged with the roll of filter media and conduits for injecting gas bubbles to clean the filter media in accordance with teachings of the present invention.

FIG. 22 shows a top view of another embodiment of membrane tensioning construction and mounting, wherein again a continuous or substantially endless roll embodiment of a flexible membrane envelope is anchored via mounting between a feed and a take-up roller mechanically communicating with a rigid support element such as a containment vessel or tank, and incorporating with intermediate rollers so located as to provide relative evenness of tensioning on all segments of the flexible membrane element.

This figure illustrates how an alternative embodiment of membrane tensioning and mounting enables means that provide for varying the amount of tension by which a flexible membrane envelope may be held and suspended across a supporting structure such as a containment vessel or tank, such that the variation of such tensioning may be achieved at any time during filtration, and also with conduits for directing compressed air or other gaseous bubbles parallel to all of the upstream membrane surfaces. The variable tensioning during dynamic filtration will serve to undermine the physical support of any solids cake clinging to said surfaces, which effect will be enhanced and increased by the simultaneous passage of air bubble cleaning vectors across all of the upstream membrane surfaces.

Part 58 A containment vessel, to additionally serve as a surrounding frame on which to anchor and tension one or a plurality of stacked, tensionally anchored and mounted filter elements.

Part 60 Embodiment of a flexible membrane envelope, formed in a continuous or substantially endless shape.

Part 61 Feed roller on which an unused quantity of part 60 may be mounted, held and stored.

Part 62 Arrow indicating direction in which part 60 may be unrolled from roller part 61.

Part 63 Take-up roller on which a used quantity or segments of part 60 may be captured, held and stored.

Part 64 Arrow indicating direction in which part 50 may be rolled up upon roller part 63.

Part 65 Intermediate tensioning rollers, for maintaining a relatively even tension on all continuous segments of a flexible membrane element part 60.

Part 66 Variable tensioner operable to vary the amount of tension applied in a relatively uniform manner to all segments of a flexible membrane envelope part 60, either during or between filtration operations. Such function may include a sliding mechanism communicating with all of the intermediate tensioning rollers parts 65 on one side of a support frame or supporting tank walls, such that said sliding mechanism may move all such roller parts further away or closer to the opposite wall of said frame or tank, thus varying the tension on all segments of a tensioned flexible membrane envelope part 60.

Part 68 Pluralities of air or other gaseous bubble injecting means, relatively at the bottom of the vessel or tank (part 58), whereby said bubbles may be injected relatively upwards and parallel to all of the upstream tensioned membrane envelope surfaces.

Figure 23:
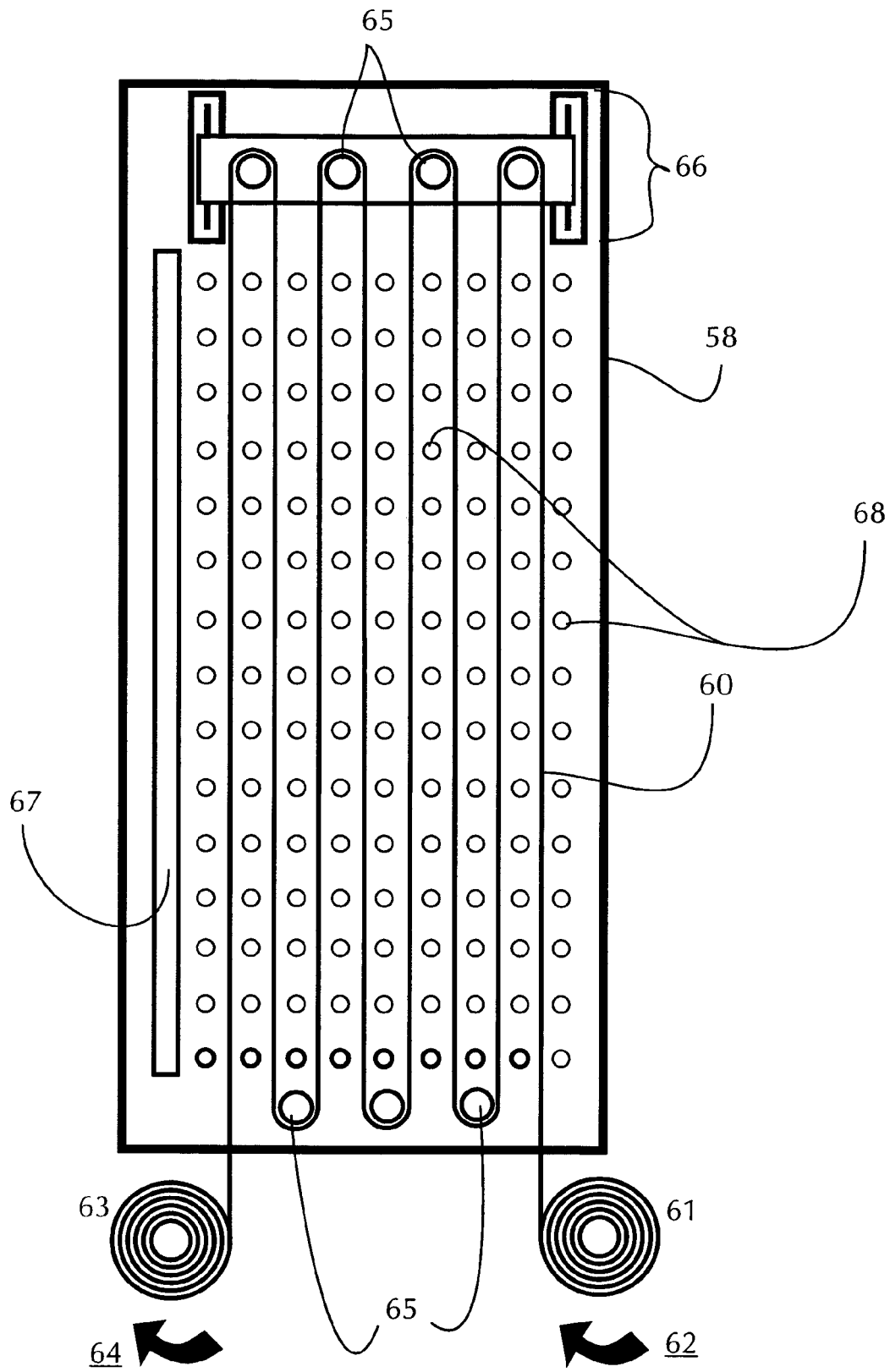
FIG. 23 is a schematic drawing in section with portions broken away showing a filtration system with a roll of filter media operable for movement therethrough in combination with a variable tensioning device engaged with the roll of filter media, an energy source and conduits to inject gas bubbles for use in cleaning the filter media in accordance with teachings of the present invention.

FIG. 23 shows a top view of an additional embodiment of membrane tensioning construction and mounting, wherein again a continuous or substantially endless roll embodiment of a flexible membrane envelope is anchored via mounting between a feed and a take-up roller mechanically communicating with a rigid support element such as a containment vessel or tank, and incorporating with intermediate rollers so located as to provide relative evenness of tensioning on all segments of the flexible membrane element.

This figure illustrates how an alternative and embodiment of membrane tensioning and mounting allows varying the amount of tension by which a flexible membrane envelope may be held and suspended across a supporting structure such as a containment vessel or tank, such that the variation of such tensioning may be achieved at any time during filtration, and also with conduits added for directing compressed air or other gaseous bubbles parallel to associated upstream membrane surfaces, and also with an energy source added for directing vibratory or acoustical wave energy generally perpendicularly to and through the tensioned membrane envelopes. Variable tensioning during dynamic filtration, enhanced by vibratory energy waves, will both serve to undermine the physical support of any solids cake clinging to said surfaces, which effect will be enhanced and increased by the simultaneous passage of air bubble cleaning vectors across the upstream membrane surfaces.

Part 58 A containment vessel, to additionally serve as a surrounding frame on which to anchor and tension one or a plurality of stacked, tensionally anchored and mounted filter elements.

Part 60 Embodiment of a flexible membrane envelope, formed in a continuous or substantially endless shape.

Part 61 Feed roller on which an unused quantity of part 60 may be mounted, held and stored.

Part 62 Arrow indicating direction in which part 60 may be unrolled from roller part 61.

Part 63 Take-up roller on which a used quantity or segments of part 60 may be captured, held and stored.

Part 64 Arrow indicating direction in which part 50 may be rolled up upon roller part 63.

Part 65 Intermediate tensioning rollers, for maintaining a relatively even tension on all continuous segments of a flexible membrane element part 60.

Part 66 Variable tensioner operable to vary the amount of tension applied in a relatively uniform manner to all segments of a flexible membrane envelope part 60, either during or between filtration operations. Such function may include a sliding mechanism communicating with all of the intermediate tensioning rollers parts 65 on one side of a support frame or supporting tank walls, such that said sliding mechanism may move all such roller parts further away or closer to the opposite wall of said frame or tank, thus varying the tension on all segments of a tensioned flexible membrane envelope part 60.

Part 67 Energy source for generating and imparting acoustical or mechanical vibration directed perpendicular to and through the parallel planes of flexible membrane envelopes mounted tensionally across a frame or enclosing vessel.

Part 68 Pluralities of air or other gaseous bubble injecting means, relatively at the bottom of the vessel or tank (part 58), whereby said bubbles may be injected relatively upwards and parallel to all of the upstream tensioned membrane envelope surfaces.

Figure 24:
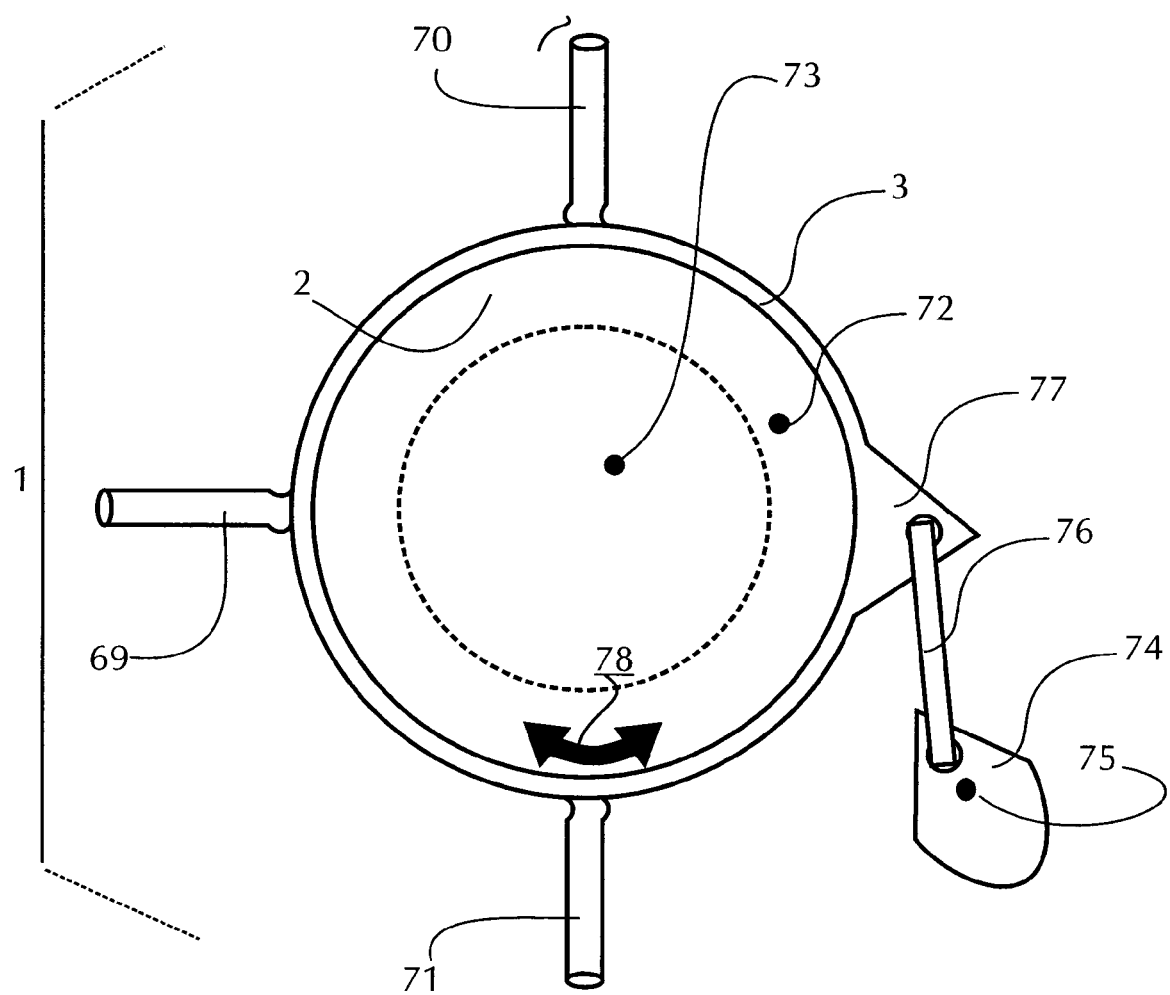
FIG. 24 is a schematic drawing showing a plan view with portions broken away of a filtration system having a plurality of tensioned, stacked membrane elements in combination with an energy source operable to apply reciprocating torsional motion to the associated filter elements.

FIG. 24 shows a top view of a tensioned membrane envelope filter element whose relatively oval, circular, square or rectangular periphery is bounded, anchored, sealed and tensioned by an outer ring or frame-like element. The overall tensioned filter element may be loosely mounted within a surrounding supporting frame structure, vessel, tank or other type of housing (not expressly shown). With such a tensioned membrane envelope so anchored by said outer supporting and tensioning ring or frame element, FIG. 24 illustrates applying reciprocating torsional or orbital vibratory motion parallel to the membrane planes each of the tensioned membrane envelope filter elements, and to these elements alone, rather than to an entire filtration device including its vessel.

In one embodiment of such a method this figure would show a tensioned membrane envelope filter element for placement within a containing vessel, and with the filter element or a stacked plurality of such elements, reciprocally and torsionally vibrated. In another embodiment of this same method, the tensioned membrane filter element would be in the form of a plate frame element, similar to that illustrated by FIG. 12 herein, whereby the entire collection of plate frames may be reciprocally and torsionally oscillated.

Part 1 A tensioned membrane filter element assembly, in one particular construction embodiment of several, suitable for stacking as a plurality of such elements to attain substantial membrane surface area.

Part 2 A tensionable membrane envelope may include two or more fluid permeable membrane sheets, an interior separating layer or layers (spacer) operable to maintaining substantial spacing between interior surfaces of said sheets while allowing fluid flow between said sheets in a direction generally parallel thereto. Netting, cross bleed cloth or similar members may be used to form such spacers.

Part 3 An outer supporting element, such as an open center ring or frame, peripherally surrounding a tensioned membrane envelope (part 2), and serving as an anchoring element for an inner assembly comprising an inner tensioning ring member which member is sealingly and structurally joined to a membrane envelope. Said hollow-centered ring or frame may be circular, oval, rectangular or other practical shape, and may be cast or machined from any sufficiently rigid material.

Part 69 Fluid flow paths for ingress of process fluid into the work area of a tensioned membrane envelope filter element, including sealed, flexible connections between a relatively static and non-moving outer containment vessel or housing and the torsionally reciprocating filter element Part 70 Fluid flow paths for egress of accumulating permeate fluid from the interior of the tensioned membrane envelope, including sealed flexible connections between the torsionally reciprocating filter element and the relatively static and non-moving outer containment vessel or housing.

Part 71 Fluid flow paths for egress of accumulating retentate materials from outer surfaces of the tensioned membrane envelope, including sealed flexible connections between the torsionally reciprocating filter element and the relatively static and non-moving outer containment vessel or housing.

Part 72 The outer work area or zone of the tensioned membrane envelope membrane surface, which due to its comparatively larger distance from the center axis of reciprocating torsional vibration, enjoys a relatively high degree of membrane cleaning motion parallel to the planes of the membrane.

Part 73 The inner work area or zone of the tensioned membrane envelope membrane surface, which due to its comparative proximity to the center axis of reciprocating torsional vibration, enjoys relatively lower degrees of membrane cleaning motion parallel to the planes of the membrane.

Part 74 Eccentric cam, whose offset balance weight is equal to that of the tensioned membrane envelope filter element, such that when rotated, the reciprocating torsional movement imparted to said entire element functions as a relatively balanced system, thus requiring very little energy imparted to produce said movement.

Part 75 Axis of rotation for the weighted eccentric cam, part 74.

Part 76 Coupling for transferring reciprocating torsional motion from the eccentric cam, part 74, to the tensioned membrane envelope (part 1).

Part 77 Connector integral to outer supporting and tensioning ring or frame-like element to communicate with the vibration inducing means of parts 74, 75 and 76.

Part 78 Arrow on FIG. 24, indicating directions of reciprocating torsional motion imparted to the tensioned membrane envelope filter element (part 1), by parts 74, 75 and 76.

Figure 25:
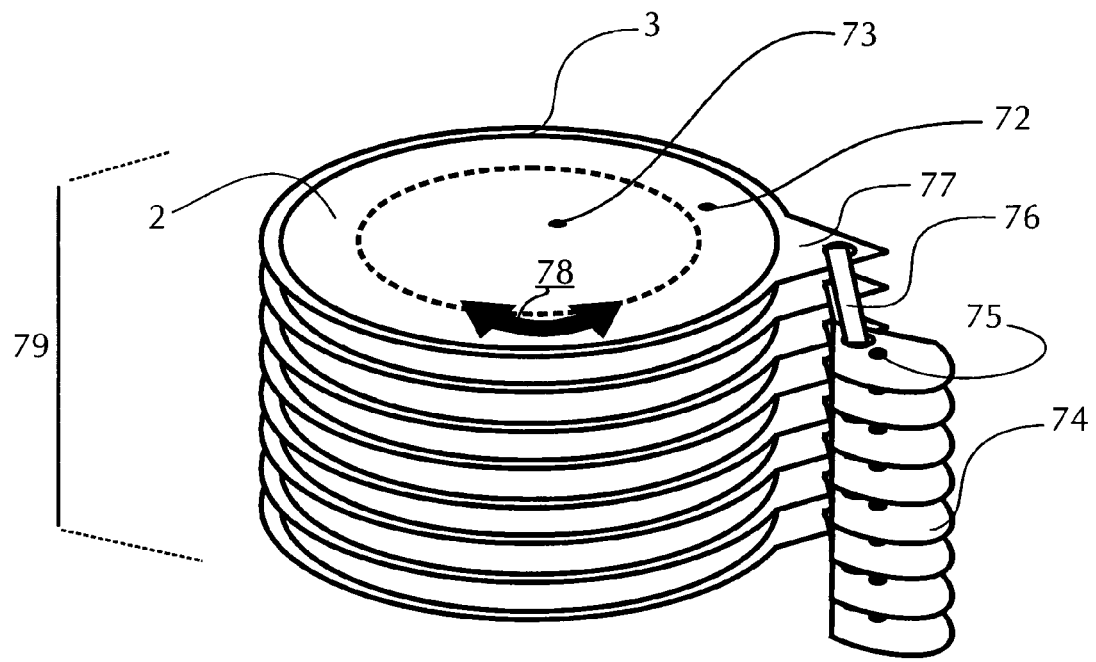
FIG. 25 is a schematic drawing showing an isometric view with portions broken away of the filtration system in FIG. 24.

FIG. 25 shows a top perspective view of a vertically stacked plurality of tensioned membrane filter elements, shown here for clarity without surrounding or containing vessel (in the case of said elements comprising filter elements), or without top and bottom end caps to complete a sealed vessel (in the case of said elements comprising a plate frame type of filtration system), and also with ingress and egress for fluid flow not shown.

This figure illustrates how a stacked plurality of such tensioned membrane filter elements may together receive reciprocatingly torsional vibration parallel to the face of their membrane sheets, for purposes of membrane surface cleaning during filtration operation. It should be noted, however, that with any such reciprocatingly torsional vibration the relatively interior surfaces of each membrane work area receive substantially less vibratory motion than do the relatively outer surfaces, due to their shorter path of travel nearer the central axis of spin.

Figure 26:
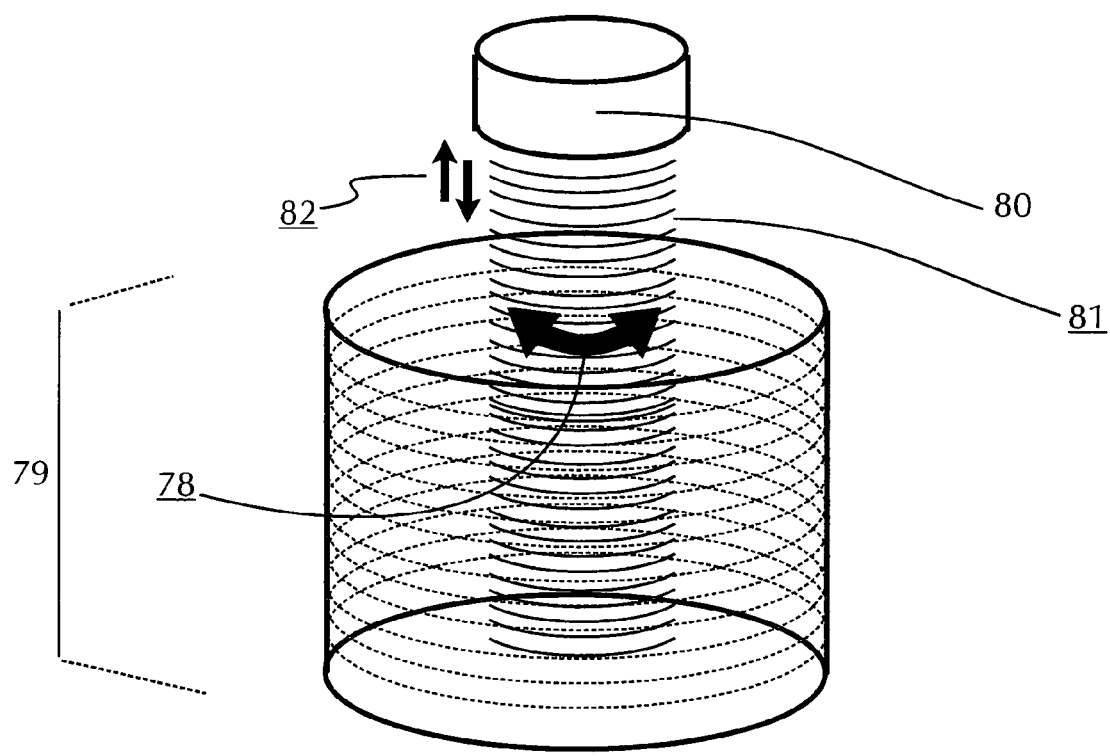
FIG. 26 is a schematic drawing showing an isometric view with portions broken away of a filtration system and an energy source operable to apply acoustic sonic and/or vibratory energy to working surfaces of a plurality of stacked filter elements in accordance with teachings of the present invention.

FIG. 26, below, shows how additional membrane cleaning techniques combined with membrane tensioning method of construction reduces or eliminates this long-standing weakness of vibratory cleaning directed generally parallel to membrane surfaces.

Part 2 A tensionable membrane envelope may include two or more fluid permeable membrane sheets, an interior separating layer or layers (spacer) operable to maintaining substantial spacing between interior surfaces of said sheets while allowing fluid flow between said sheets in a direction generally parallel thereto. Netting, cross bleed cloth or similar members may be used to form such spacers.

Part 3 An outer supporting element, such as an open center ring or frame, peripherally surrounding a tensioned membrane envelope (part 2), and serving as an anchoring element for an inner assembly comprising an inner tensioning ring member which member is sealingly and structurally joined to a membrane envelope. Said hollow-centered ring of frame may be circular, oval, rectangular or other practical shape, and may be cast or machined from any sufficiently rigid material.

Part 72 The outer work area or zone of the tensioned membrane envelope membrane surface, which due to its comparatively larger distance from the center axis of reciprocating torsional vibration, enjoys a relatively high degree of membrane cleaning motion parallel to the planes of the membrane.

Part 73 The inner work area or zone of the tensioned membrane envelope membrane surface, which due to its comparative proximity to the center axis of reciprocating torsional vibration, enjoys relatively lower degrees of membrane cleaning motion parallel to the planes of the membrane.

Part 74 Eccentric cam, whose offset balance weight is equal to that of the tensioned membrane envelope filter element, such that when rotated, the reciprocating torsional movement imparted to said entire element functions as a relatively balanced system, thus requiring very little energy imparted to produce said movement.

Part 75 Axis of rotation for the weighted eccentric cam, part 74.

Part 76 Means for transferring the reciprocating torsional motion from the eccentric cam, part 74, to the tensioned membrane envelope filter element (part 1).

Part 77 Connector integral to outer supporting and tensioning ring or frame-like element to communicate with the vibration inducing devices of parts 74, 75 and 76.

Part 78 Arrows on FIG. 25, indicating directions of reciprocating torsional motion imparted to the tensioned membrane envelope filter element (part 1), by parts 74, 75 and 76.

Part 79 Plurality of vertically, parallel-stacked tensioned membrane envelope filter elements (parts 1).

FIG. 26 shows a top perspective, partially cut-away view of FIG. 25, with most details omitted, but showing how the addition of a second vector of vibratory energy directed perpendicular to and through the multiple membrane faces can improve and enhance membrane cleaning attempted by reciprocatingly vibrating the filter elements parallel to their faces. Specifically, such vibration, perpendicular to and through all the membrane sheets, can add substantial movement to the membrane, and to the process fluid its components, in the central areas of all the stacked membranes, improving the efficiency of an area of the filter element that receives relatively low amounts of reciprocating torsional motion as shown in FIG. 25.

Part 78 Arrows on FIG. 26, indicating directions of reciprocating torsional motion imparted to the tensioned membrane envelope filter element (part 1), as shown in FIGS. 24 and 25.

Part 79 Plurality of vertically, parallel-stacked tensioned membrane envelope filter elements (parts 1).

Part 80 Energy source operable to impart vibratory energy generally perpendicular to and through all the membrane planes as claimed throughout the present invention.

Part 81 Depiction of the vibratory energy waves of part 80.

Part 82 Arrows on FIG. 26, depicting reciprocating direction of the vibratory energy waves of part 80.

Figure 27:
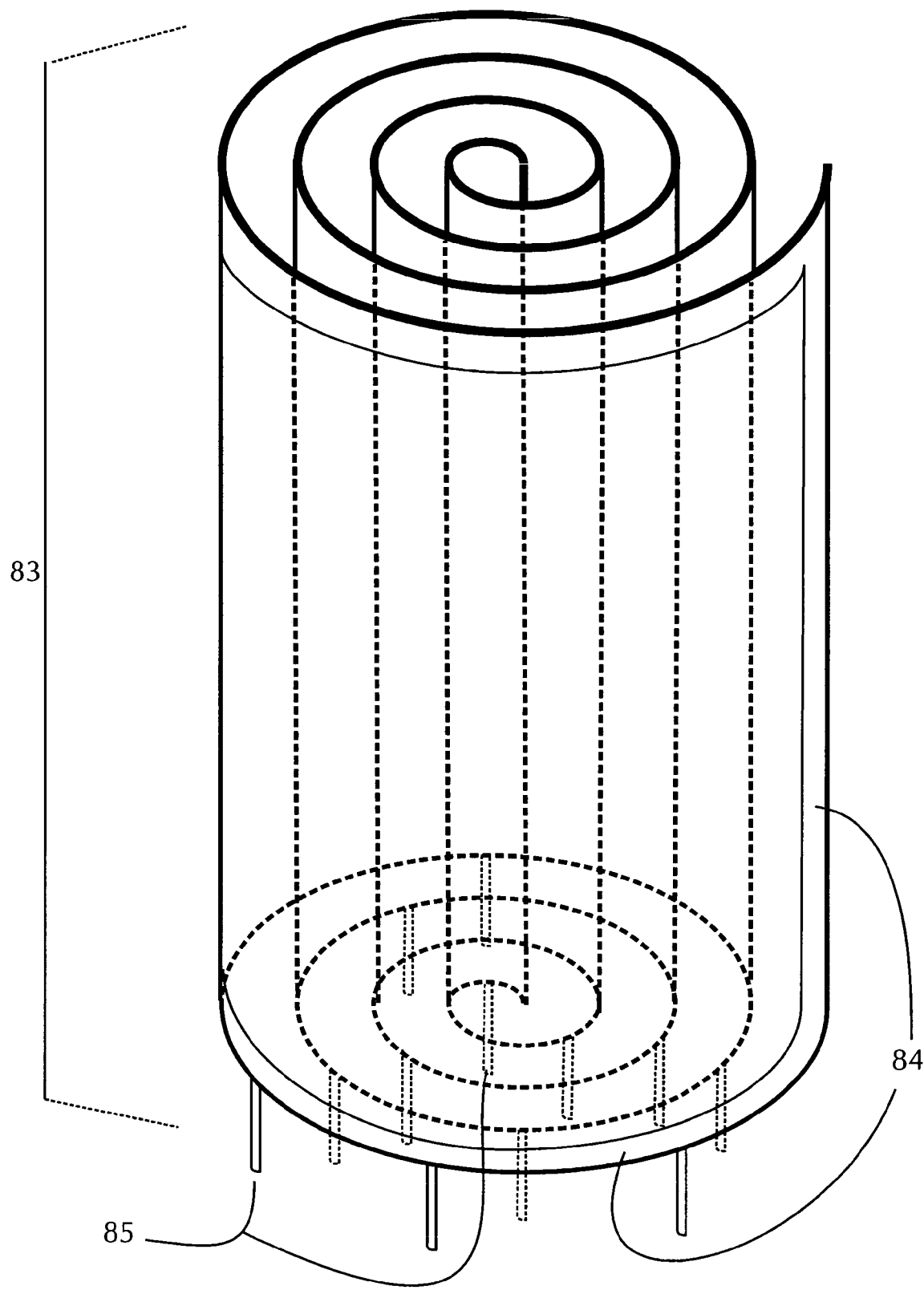
FIG. 27 is a schematic drawing showing an isometric view with portions broken away of a spiral wound flexible membrane envelope formed in accordance with teachings of the present invention.

FIG. 27 shows a top perspective, partial cut-away view of an embodiment of a flexible membrane envelope formed similarly to the relatively endless embodiment of a flexible membrane element shown in FIG. 20, such that said envelope is again formed by sealed joining of two flexible membrane sheets at its peripheral edges, and being relatively longer than it is wide, is spirally wound or rolled up along its length, for mounting within a relatively cylindrical vessel or container, such as a cartridge. Optionally one or more permeate conduits from the sealed interior of said spiral wound flexible membrane envelope may be provided at intermittent points sealingly penetrating bottom edges of said envelope. A spiral wound flexible membrane envelope may be combined with several novel membrane cleaning techniques in accordance with teachings of the present invention.

Part 83 Embodiment of a flexible membrane envelope, formed in a shape relatively longer than its width, with two membrane sheets and one or more internal membrane separating elements such as bleed cloth or netting, wound or rolled into a relatively spiral format.

Part 84 Sealingly joined peripheral edges of part 83.

Part 85 Permeate removal or drain flow path, such as flexible or rigid tubing sealingly penetrating into the interior of the flexible membrane element at intervals, and leading outside of the envelope.

Figure 28:
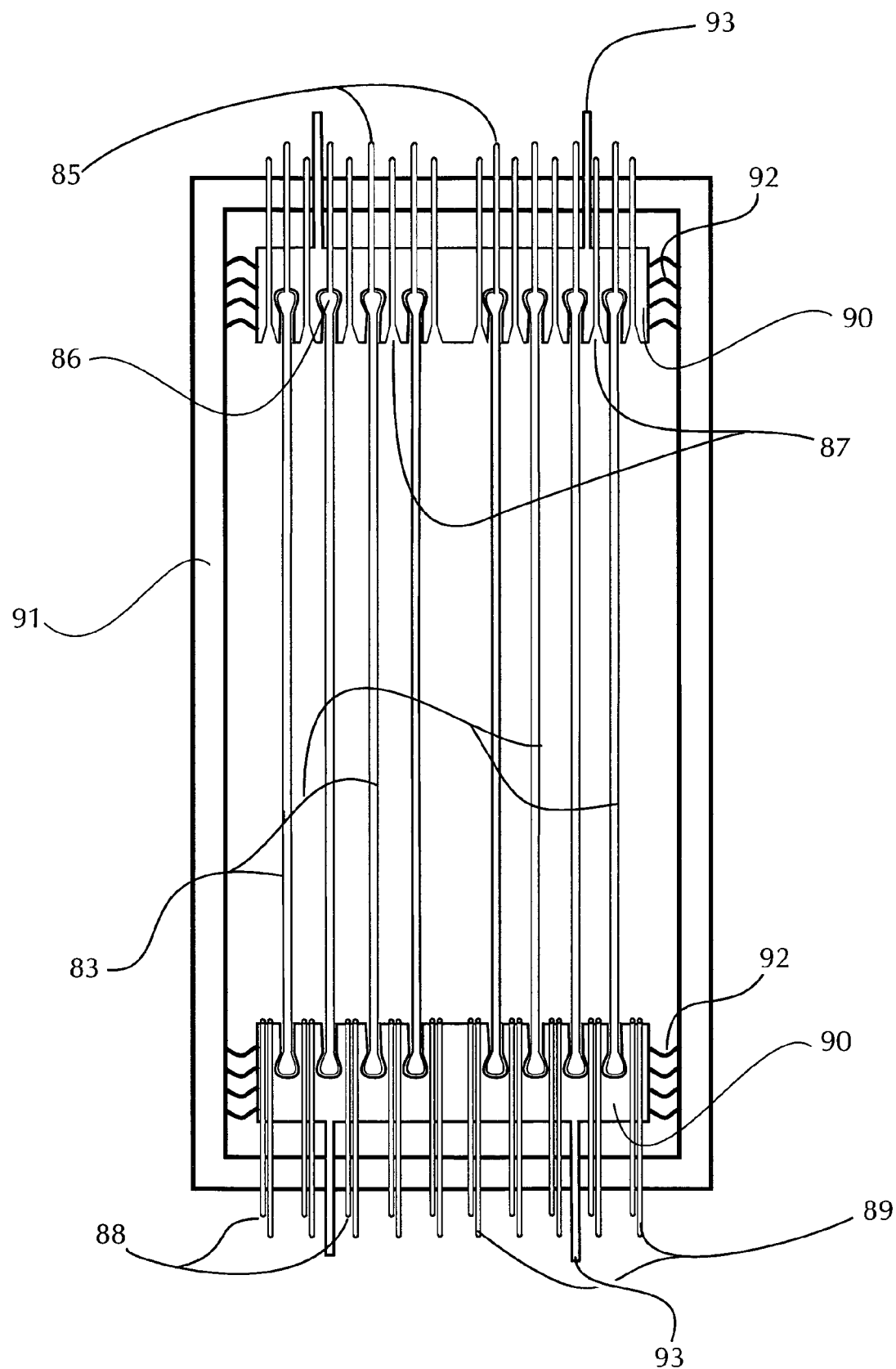
FIG. 28 is a schematic drawings in section with portions broken away showing a filtration system having one or more spiral wound flexible membrane envelopes disposed between a first end cap and a second end operable for reciprocating movement within an associated housing in accordance with teachings of the present invention.

FIG. 28 shows a cut-away side view of one of two embodiments for membrane cleaning methods enabled by the tensioned membrane method of construction of the present invention, as applied to spiral-wound filter mounting. This figure shows the interior of a tank or cartridge in a vertical orientation, wherein the continuous, spiral wound flexible membrane envelope of FIG. 28 (part 83), is mounted and tensioned longitudinally between two anchoring means, such as end caps. Flow paths are shown in this figure for the ingress of process fluid, for the injection of air or other gaseous bubbles for cleaning purposes parallel to the membrane planes, and for the egress of permeate fluid from the membrane envelope interiors and of retentate materials from the process fluid spaces or zones between the membrane envelopes. In addition to the air bubble cleaning, one or both of the supporting end cap elements may be reciprocatingly moved, upwards and downwards as depicted in FIG. 28, varying the tensioning placed on the flexible membrane envelopes mounted there between, once again to flex, bounce and otherwise change the surface characteristics of said envelops, to assist in shedding accumulations of solids cake, scale or film on said surfaces.

Part 83 Embodiment of a flexible membrane envelope, formed in a shape relatively longer than its width, with two membrane sheets and one or more internal membrane separating elements such as bleed cloth or netting.

Part 85 Permeate removal or draining means, such as flexible or rigid tubing sealingly penetrating into the interior of the flexible membrane element at intervals, and leading outside of the envelope.

Parts 86 Relatively bulbous or similar shaped top and bottom edges of the flexible membrane envelope, part 83, as oriented in FIG. 27, as one of several means for mounting said membrane longitudinally and vertically under tension, the tension being applied by said bulbous edge protrusions being held in dovetail like slots in mounting means above and below said envelope, as oriented in this figure and in FIG. 27.

Part 87 Multiple outlets for egress of relatively deliquefied retentate materials.

Part 88 Multiple inlets for ingress of process fluid.

Part 89 Multiple inlets for the ingress of gaseous bubbles, to be directed under pressure through said inlets and in an upwards direction, as shown in this figure, parallel to and against all of the plurality of upstream membrane surfaces.

Part 90 Top and bottom end caps, comprising dovetail-like anchoring spiral grooves to hold and tension the expanded, bulbous edges (parts 86) of the flexible membrane envelope (part 83), sealingly penetrated by multiple inlets (parts 88) for process fluid, by retentate and permeate outlets (parts 87 and 85, respectively), and by air bubble inlets (parts 89).

Part 91 Outer walls of vessel or fluid-containing cartridge for this embodiment, relatively rigidly mounted to end caps (parts 90).

Part 92 Flexible mounting and sealing elements between end caps (parts 90) and outer fluid-containing vessel or cartridge (part 91), which flexible elements may occur on just one end cap, or on both end caps.

Part 93 Connecting means between reciprocally movable end caps (parts 90) and exterior means of imparting linear motion to said end caps, such as but not limited to linear motors, which means may occur communicating with one or with both end caps.

Figure 29:
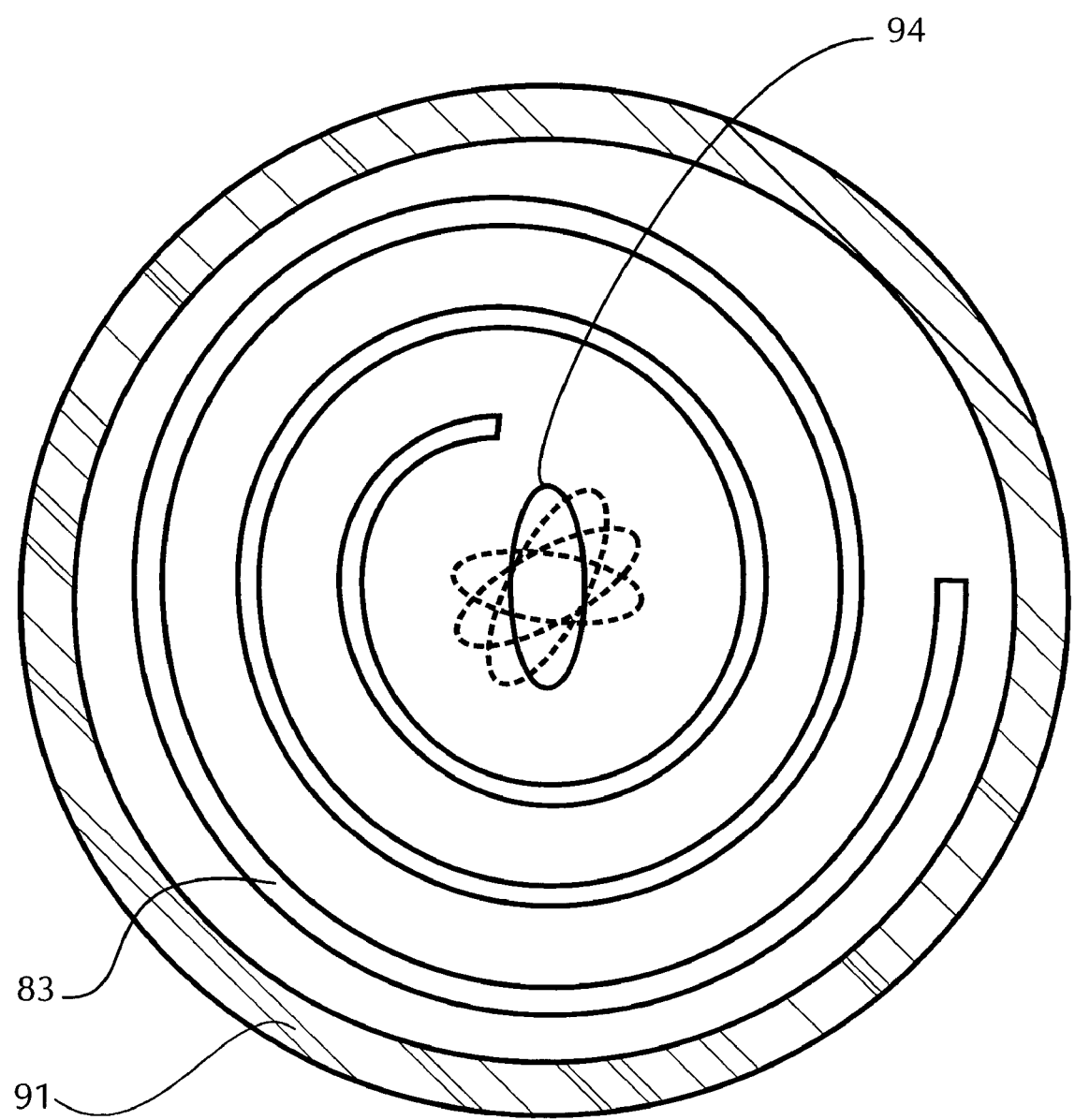
FIG. 29 is a schematic drawing in section showing a plan view of a filtration system having spiral wound filter media in combination with an energy source for imparting radially outward vibratory motion through associated filter media surfaces.

FIG. 29 shows a top cutaway view of an embodiment of a flexible membrane envelope, spirally wound for tensional mounting within a relatively cylindrical cartridge or tank, showing an eccentrically shaped, rotating center rod-like element, inserted and moved to impart vibratory energy radially outwards, perpendicular to and through every point of all the membrane surfaces, as an embodiment to provide additional continuous membrane cleaning.

Part 83 Embodiment of a flexible membrane envelope, formed in a shape relatively longer than its width, with two membrane sheets and one or more internal membrane separating elements such as bleed cloth or netting.

Part 91 Outer walls of vessel or fluid-containing cartridge for this embodiment.

Part 94 Eccentric shaped rod-like element, inserted longitudinally and relatively in the center of the spiral wound flexible membrane envelope (part 83), whose rotation and irregular shape imparts radially outward vibratory motion through the process fluid and through all of the membrane surfaces of said envelopes. (See FIGS. 29 for top view, and FIG. 30 for side view of this part 94).

Figure 30:
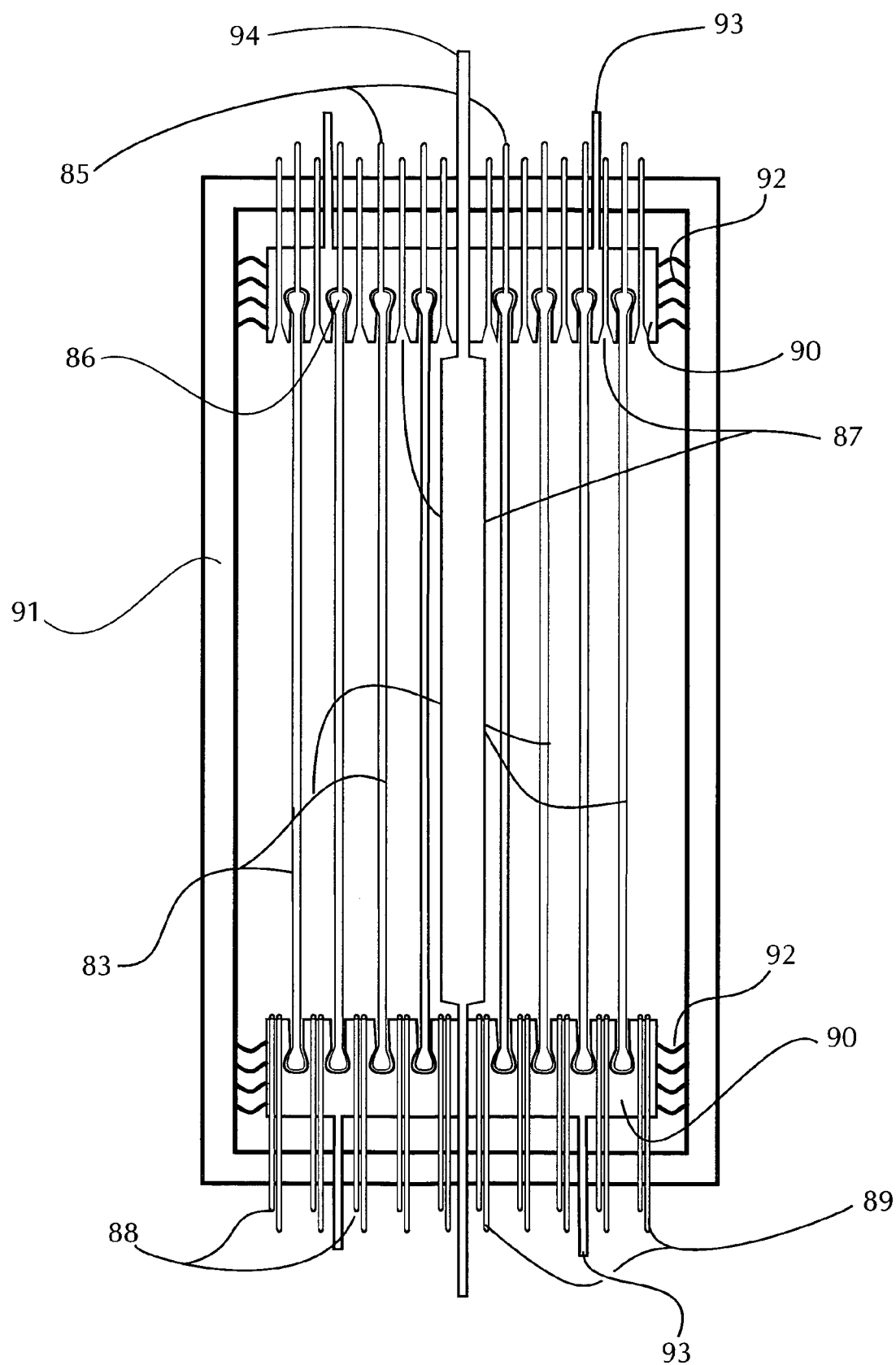
FIG. 30 is a schematic drawing in section with portions broken away showing a filtration system having one or more spiral wound flexible membrane envelopes attached to a first end cap and a second cap slidably disposed within a housing to accommodate reciprocating motion in combination with an energy source operable to direct vibration energy through associated spiral wound membrane envelopes.

FIG. 30 shows a cut-away side view of the second of two embodiments for membrane cleaning methods enabled by the tensioned membrane method of construction of the present invention, as applied to spiral-wound filter mounting. This figure shows the interior of a tank or cartridge in a vertical orientation, wherein the continuous, spiral wound flexible membrane envelope of FIG. 28 (part 83), is again mounted and tensioned longitudinally between two end anchoring means, such as end caps. Means are shown in this figure for the ingress of process fluid, for the injection of air or other gaseous bubbles for cleaning purposes parallel to the membrane planes, and for the egress of permeate fluid from the membrane envelope interiors and of retentate materials from the process fluid spaces or zones between the membrane envelopes.

In addition to the air bubble cleaning, one or both of the supporting end cap elements may be reciprocatingly moved, upwards and downwards as depicted in FIG. 28, varying the tensioning placed on the flexible membrane envelopes mounted there between, again to flex, bounce and otherwise change the surface characteristics of said envelops, to assist in shedding accumulations of solids cake, scale or film on said surfaces. And, in addition to both the air bubbling and to the variable longitudinal tensioning of the tensioned membrane envelopes for cleaning purposes, a third surface cleaning effect may be herein added, namely vibratory motion imparted perpendicular to and through all the membrane surfaces, achieved by a rotating eccentrically shaped stirring element, located centrally within the device.

Part 83 Embodiment of a flexible membrane envelope, formed in a shape relatively longer than its width, with two membrane sheets and one or more internal membrane separating elements such as bleed cloth or netting.

Part 85 Permeate removal or draining means, such as flexible or rigid tubing sealingly penetrating into the interior of the flexible membrane element at intervals, and leading outside of the envelope.

Parts 86 Relatively bulbous or similar shaped top and bottom edges of the flexible membrane envelope, part 83, as oriented in FIG. 27, as one of several means for mounting said membrane longitudinally and vertically under tension, the tension being applied by said bulbous edge protrusions being held in dovetail like slots in mounting means above and below said envelope, as oriented in this figure and in FIG. 27.

Part 87 Multiple outlets for egress of relatively deliquefied retentate materials.

Part 88 Multiple inlets for ingress of process fluid.

Part 89 Multiple inlets for the ingress of gaseous bubbles, to be directed under pressure through said inlets and down.

Part 90 Top and bottom end caps, comprising dovetail-like anchoring spiral grooves to hold and tension the expanded, bulbous edges (parts 86) of the flexible membrane envelope (part 83), sealingly penetrated by multiple inlets (parts 88) for process fluid, by retentate and permeate outlets (parts 87 and 85, respectively), and by air bubble inlets (parts 89).

Part 91 Outer walls of vessel or fluid-containing cartridge for this embodiment, relatively rigidly mounted to end caps (parts 90).

Part 92 Flexible mounting and sealing elements between end caps (parts 90) and outer fluid-containing vessel or cartridge (part 91), which flexible elements may occur on just one end cap, or on both end caps.

Part 93 Connecting means between reciprocally movable end caps (parts 90) and exterior means of imparting linear motion to said end caps, such as but not limited to linear motors, which means may occur communicating with one or with both end caps.

Part 94 Eccentric shaped rod-like element, inserted longitudinally and relatively in the center of the spiral wound flexible membrane envelope (part 83), whose rotation and irregular shape imparts radially outward vibratory motion through the process fluid and through all of the membrane surfaces of said envelopes. (See FIG. 30 for side view).

The remaining figures herein describe means of managing, re-directing or otherwise optimizing the use of vibratory and/or acoustical vibration, as used in multiple ways and formats in the present invention, for the purposes of enhanced membrane surface cleaning during dynamic filtration.

Figure 31:
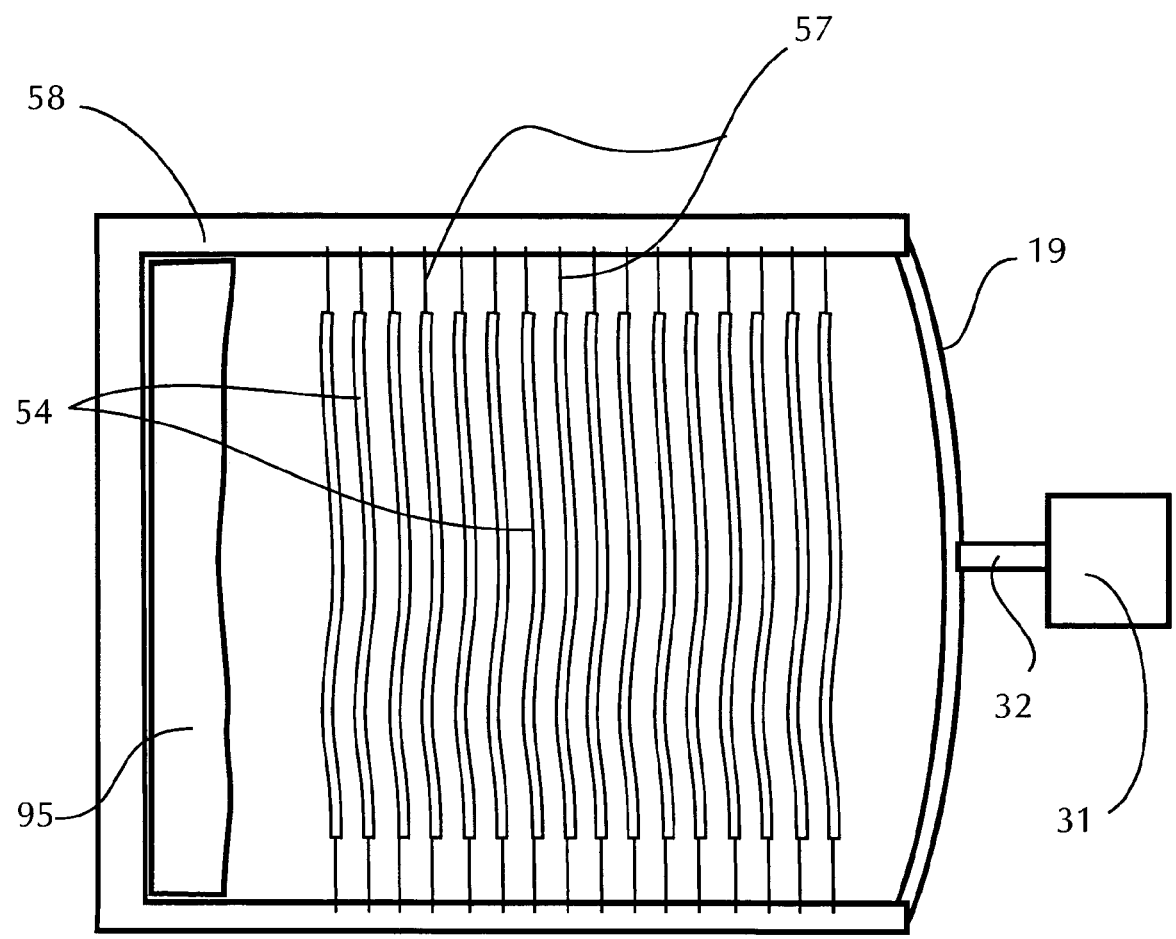
FIG. 31 is a schematic drawing in section with portions broken away showing the filtration system of FIG. 18 in combination with material operable to absorb excess energy associated with cleaning the filter elements.

FIG. 31 shows a cut-away side view of one of several embodiments directing vibration perpendicularly to and through a plurality of tensioned membrane envelopes, and further showing the use of vibratory energy absorbing material at the end or section of a containing vessel relatively opposed to that end from which the vibratory cleaning energy is introduced. The purpose of this absorptive material is to prevent the reflection of vibratory or acoustic energy back towards the source of said energy, and to prevent such reflections from causing undesirable chaotic or otherwise disruptive interference with the purpose of the primary vibratory or acoustic energy, which purpose is uniform membrane surface cleaning.

Parts 19 A fluid impermeable and relatively flexible, diaphragm-like element communicating sealingly with the outer containment vessel or tank (part 58) and mounted relatively parallel to the tensioned membrane planes (parts 54).

Part 31 Membrane cleaning embodiment means for generating reciprocating mechanical or acoustical vibration, in a direction substantially perpendicular to the planes of the stacked tensioned membrane elements Part 32 Optional embodiment means of transmitting the reciprocating mechanical or acoustical vibration produced by part 31, into and through the fluid and tensioned membrane surfaces, substantially perpendicular to the plane of those surfaces Part 54 Plurality of stacked tensioned membrane envelopes within an enclosing vessel.

Part 57 Relatively flexible and tensionable means of connecting, anchoring and tensioning the peripheries of the tensioned filter envelopes (part 54).

Part 58 A vessel, tank, cartridge or other container enclosing a plurality of stacked, tensionally constructed filter envelopes (parts 54).

Part 95 Material substantially covering an end or wall of the enclosing vessel (part 58) relatively opposed to the source for vibratory or acoustical energy, which material comprises an energy-absorbing material.

Figure 32:
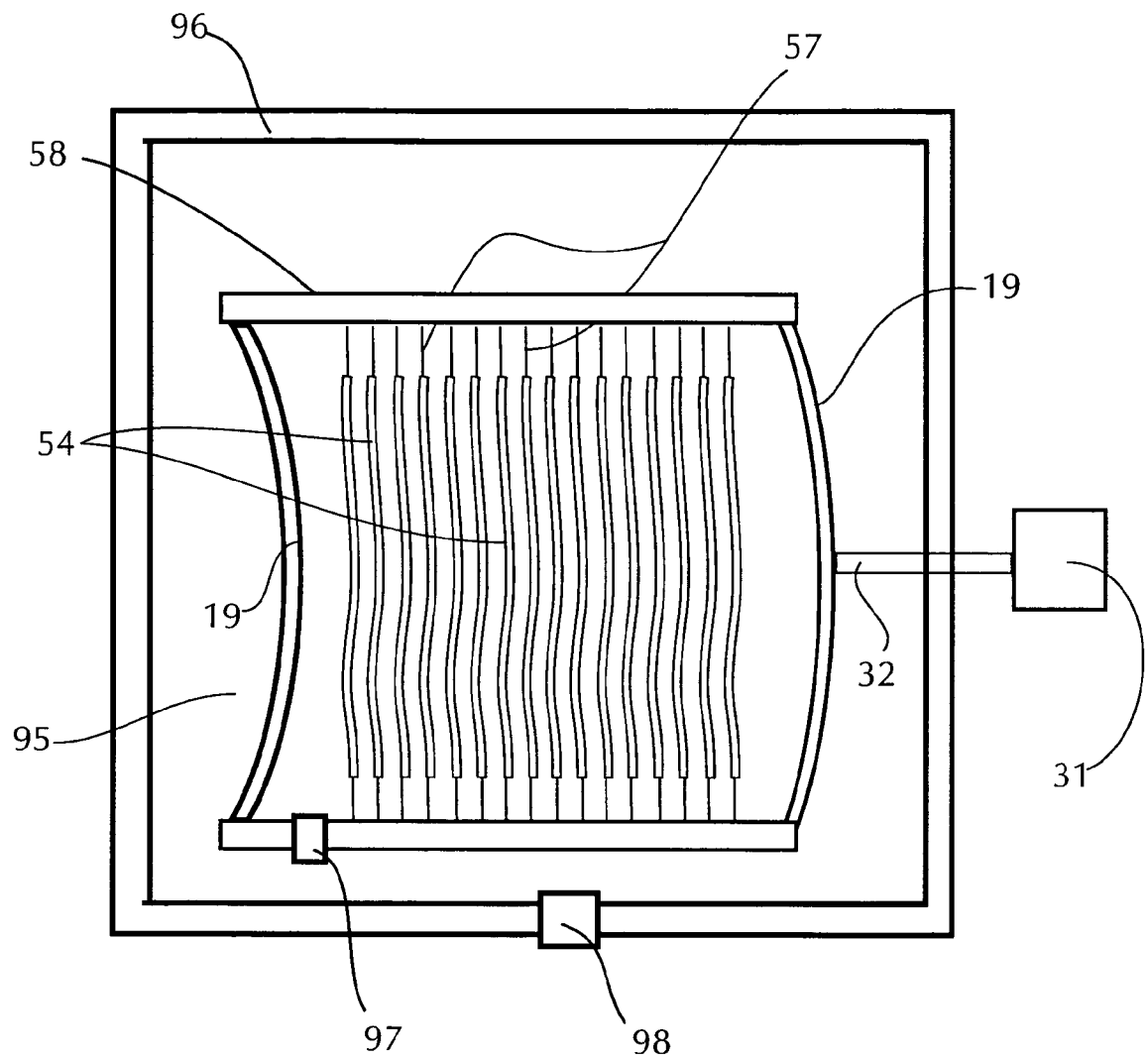
FIG. 32 is a schematic drawing in section with portions broken away showing the filtration system of FIG. 18 disposed within a second pressure vessel.

FIG. 32 shows a cut-away side view of an alternative embodiment for managing or minimizing vibratory interference or excessive energy use by the means of vibration. This embodiment surrounds the primary vessel with a secondary vessel. The intervening spaces are filled with a pressurizable fluid or gas, whose pressure level is kept constant with the pressure within the primary filtration vessel. Vibratory movement from the primary vibratory is equalized by a secondary diaphragm like element (the left hand part 19 in this figure), by means of the pressurized fluid or gas in the intervening space between the two vessels.

Parts 19 A fluid impermeable and relatively flexible, diaphragm-like element communicating sealingly with the outer containment vessel or tank (part 58) and mounted relatively parallel to the tensioned membrane planes (parts 54).

Part 31 Membrane cleaning embodiment means for generating reciprocating mechanical or acoustical vibration, in a direction substantially perpendicular to the planes of the stacked tensioned membrane elements.

Part 32 Optional embodiment means of transmitting the reciprocating mechanical or acoustical vibration produced by part 31, into and through the fluid and tensioned membrane surfaces, substantially perpendicular to the plane of those surfaces Part 54 Plurality of stacked tensioned membrane envelopes within an enclosing vessel.

Part 57 Relatively flexible and tensionable means of connecting, anchoring and tensioning the peripheries of the tensioned filter envelopes (part 54).

Part 58 A vessel, tank, cartridge or other container enclosing a plurality of stacked, tensionally constructed filter envelopes (parts 54).

Part 96 Secondary, outer enclosing pressurized vessel.

Part 97 Pressure sensing device communicating with the interior of the primary pressure vessel (58).

Part 98 Pressure sensing and control device communicating between a space formed between the exterior of the inner vessel (part 58) and the interior of the outer vessel (96), and further communicating to a source of additional fluid or gaseous medium, for purposes of increasing as desired the pressure of said space.

Figure 33:
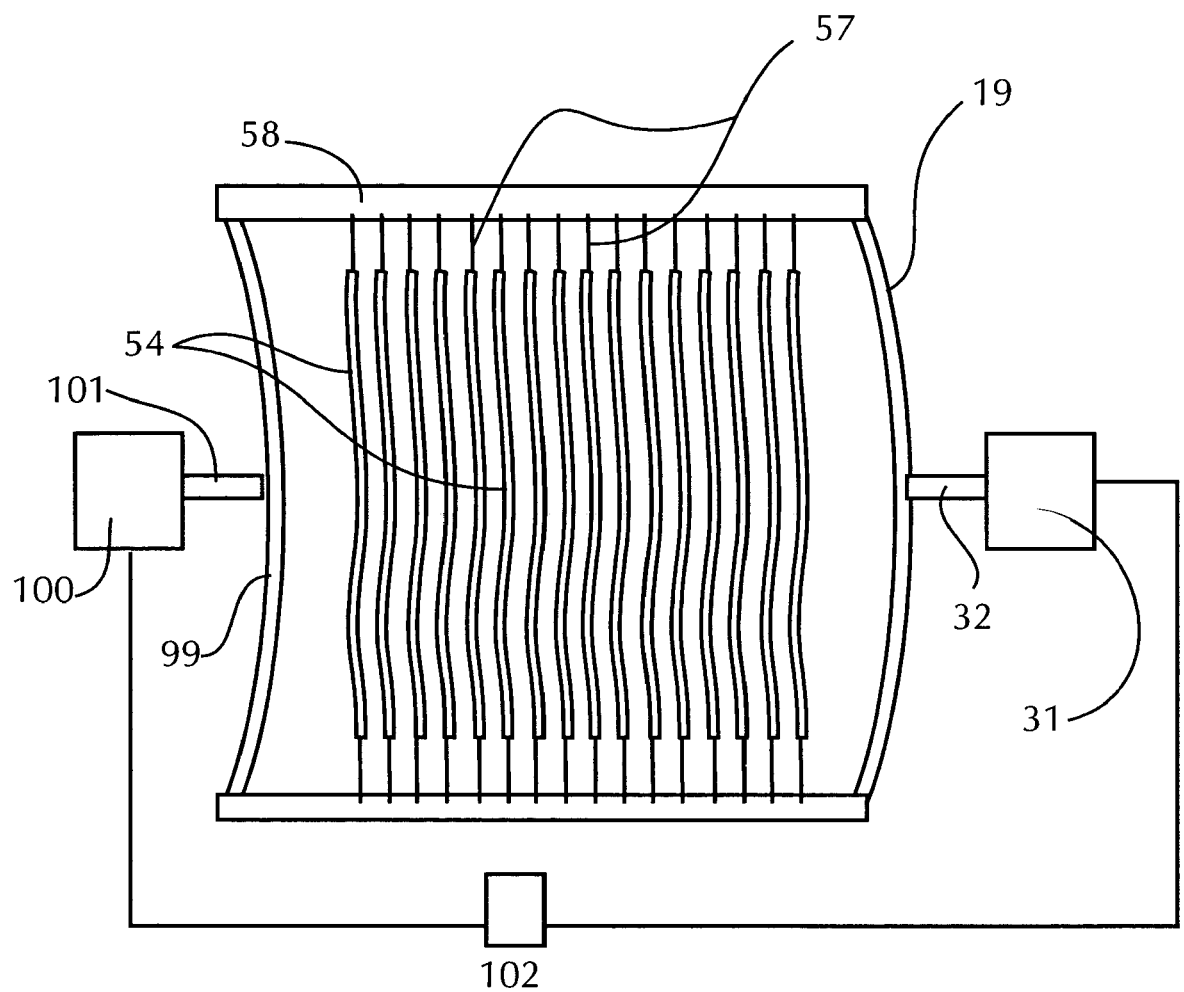
FIG. 33 is a schematic drawing in section with portions broken away showing the filtration system of FIG. 18 in combination with the first energy source and a second energy source for use in cleaning associated filter elements.

FIG. 33 shows a cut-away side view of one of several embodiments directing vibration perpendicularly to and through a plurality of tensioned membrane envelopes, and further showing the use of a logic-controlled, active vibratory energy cancellation means at the end or section of a containing vessel relatively opposed to that end from which the vibratory cleaning energy is introduced. The purpose of these active vibratory or acoustical wave canceling means is to prevent the reflection of vibratory or acoustic energy back towards the source of said energy, and to prevent such reflections from causing undesirable chaotic or otherwise disruptive interference with the purpose of the primary vibratory or acoustic energy, which purpose is uniform membrane surface cleaning.

Parts 19 A fluid impermeable and relatively flexible, diaphragm-like element communicating sealingly with the outer containment vessel or tank (part 58) and mounted relatively parallel to the tensioned membrane planes (parts 54).

Part 31 Membrane cleaning embodiment means for generating reciprocating mechanical or acoustical vibration, in a direction substantially perpendicular to the planes of the stacked tensioned membrane elements.

Part 32 Optional embodiment means of transmitting the reciprocating mechanical or acoustical vibration produced by part 31, into and through the fluid and tensioned membrane surfaces, substantially perpendicular to the plane of those surfaces Part 54 Plurality of stacked tensioned membrane envelopes within an enclosing vessel.

Part 57 Relatively flexible and tensionable means of connecting, anchoring and tensioning the peripheries of the tensioned filter envelopes (part 54).

Part 58 A vessel, tank, cartridge or other container enclosing a plurality of stacked, tensionally constructed filter envelopes (parts 54).

Part 99 A fluid impermeable and relatively flexible, diaphragm-like element communicating sealingly with the outer containment vessel or tank (part 58) and mounted relatively parallel to the tensioned membrane planes (parts 54).

Part 100 Means essentially similar or identical to the linear vibratory inducing element of part 31.

Part 101 Means essentially similar or identical to part 32, for transmitting vibratory energy to part 98 and thence into part 58.

Part 102 Controlling means, including but not limited to electronic logic means, for synchronizing the reciprocating vibratory motions of part 100 with those produced by part 31, such that the diaphragm-like flexible member part 99 moves in synchronization with vibratory or acoustical waves being passed through the vessel (part 58), in a right to left direction as shown in this figure, such that said vibratory waves meet a synchronized receding surface and thereby produce reduced or no vibratory reflections back into the vessel (part 58) interior.

As stated previously herein, the tensioning of membrane members across an outer supporting element, in order to provide shape-holding for an overall filter element and to support the membrane surfaces during filtration and cleaning, has been claimed in a separate and concurrent non-provisional patent application, for the express purpose of enabling multiple means for cleaning membrane surfaces during the process of filtration. The present invention comprises those novel and heretofore non-realizable membrane surface cleaning means that are thus enabled by the referenced means, membrane tensioning means of construction. Several novel cleaning methods are claimed within the scope of the present invention, as well as multiple explicit combinations of such methods with one another, in addition to certain additionally claimed combinations of the means with existing and known membrane cleaning methods. The following sections present this array of methods and combinations.

1. Membrane Tensioning Construction to Enable Vibration Perpendicular to Membrane Surfaces.

FIGS. 1 and 2 of the drawings illustrate one of several of the methods of construction claimed elsewhere, which methods employ the tensioning of the membrane materials themselves to provide shape-holding strength and other structural qualities to a filter element. FIG. 3 shows one of several embodiments of an entire commercial filtration apparatus employing such means in a plurality, to achieve high surface area and commercial scale process fluid throughput. The inventors emphasize that the purpose for such concurrently claimed methods of construction is to enable means of membrane construction not previously possible due to conventional filter device construction methods. Each of the various tensioning methods of membrane described as embodiments of the present invention is directed to enabling an individual membrane surface cleaning method, or a combination of such methods.

2. Advantages of Being Able to Direct Vibratory Energy Perpendicular to, and Through a Plurality of Stacked Membrane Surfaces.

Once a membrane filtration apparatus of any kind is constructed in such a way that substantially all of its membrane surface work area is free to be bounced, similar to a trampoline's inner surface bouncing within its outer supporting frame, it becomes practical to direct vibratory energy, which may be mechanically induced vibration or ultrasonic energy, not only against but also through a single such tensioned membrane, but also through a parallel-stacked plurality of such membranes, this being needed to attain the large-surface area required in commercial filtration devices.

Figure 4:
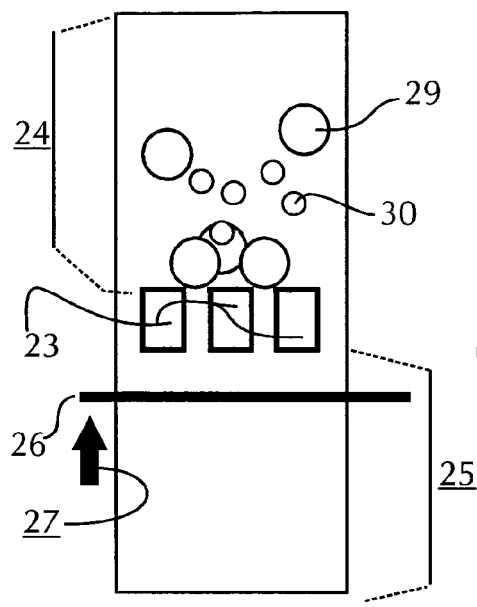
FIGS. 4–9 are schematic drawings showing various steps associated with cleaning a membrane surface in accordance with teachings of the present invention.
Figure 5:
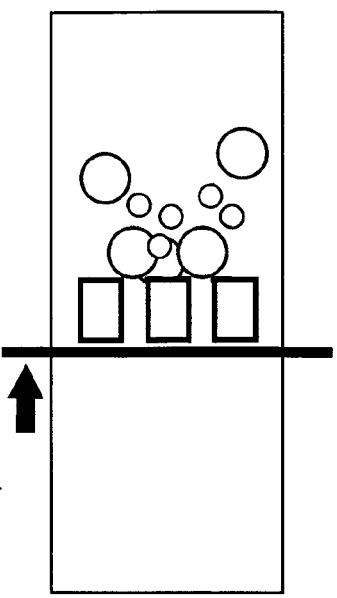
Figure 6:
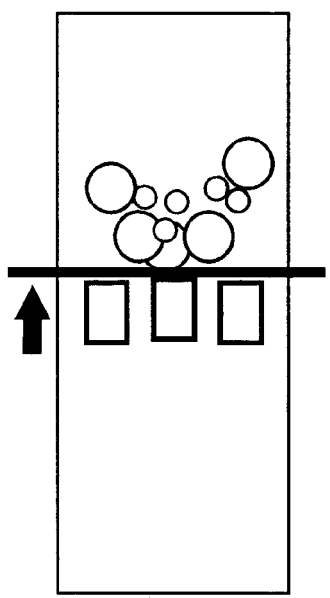
Figure 7:
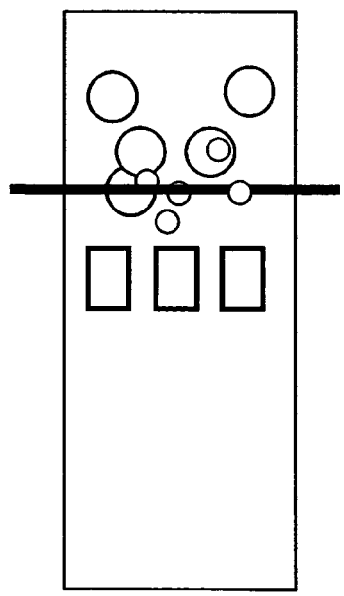
Figure 8:
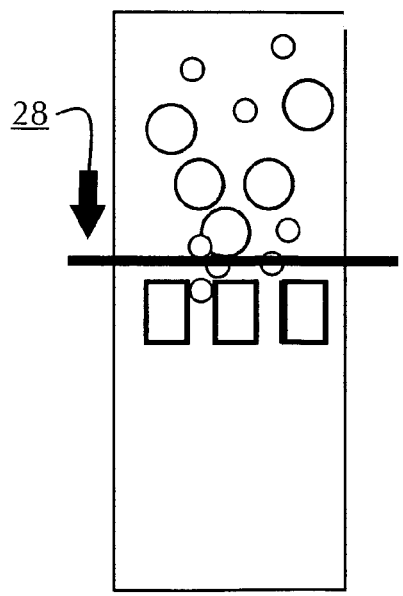
Figure 9:
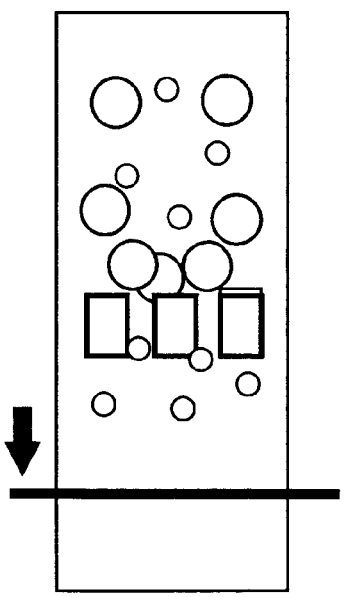

FIGS. 4 through 9 depict a substantially magnified cross section of an individual membrane sheet, and shows the progression of effects as a reciprocating wave of vibratory energy is directed perpendicularly against and through a tensioned membrane, and through all the constituents of any process fluid desirous of being filtered. As the vibratory wave progresses upwards, as shown in FIGS. 4 thorough 9, it first impacts the membrane and shifts it upwards, and then impacts both the elatively more solid or colloidal constituents of a process fluid, as well as the substantially liquid carrying element or elements, such as water, shifting them upwards as well.

The relative sizes and the relative densities of the different constituents of the process fluid will cause differing rates of settling as all are compelled to move up and down, as oriented in FIGS. 4–9, by the vibratory waves. This in turn will continuously generate turbulence within said process fluid, promoting multiple opportunities for the liquid components to permeate through the membrane's surface.

Looking at FIGS. 4–9, the bouncing and flexing of the membrane alone, caused by the passage of vibration perpendicular to and through it, can be seen to provide multiple opportunities in which the larger, relatively solid particles are lifted off the membrane, allowing smaller liquid passage to permeate. In the absence of such perpendicular vibratory action, in many or most filtration applications, the relatively solid particles quickly come to rest and form solids cake on the membrane surface, preventing permeation of the liquids. The turbulence caused by the process fluid constituents having differing sizes and densities, as described above, provides an additional impetus for fluid components to gain access to the membranes surface, and thus to penetrate that surface. Frequent or continual application of such perpendicular vibration to a membrane surface, made possible by filter elements constructed using a membrane tensioning strategy, yields membrane filters that are continuously cleaned, or which, said another way, continuously interrupt or discourage the settling of solids cake, scale and film on upstream membrane surfaces.

3. Three Embodiments Illustrating the Practical Application of Perpendicular Vibratory Cleaning to Tensioned Membrane Filter Elements.

FIG. 10 is a repeat of FIG. 3, except now the purpose for the optional embodiment feature of having one or more walls 19 of the containing vessel being flexible becomes apparent. In FIG. 10, a mechanical vibratory generator, such as an air-driven or a motor-driven, linear reciprocating vibratory device, FIG. 3, 31, communicates with a connecting means 32, which in turn communicates with one or more of the diaphragm-like flexible vessel walls 19. Here, the vibratory generator transmits its reciprocating vibratory waves upwards (as positioned in FIG. 10), through the plurality of open-centered tensioned membrane filter elements, bouncing all of their membrane sheets and also all of the components of the process fluid, as described above and in FIGS. 4–9.

FIG. 11 depicts a similar overall filtration device, again housing a parallel-stacked plurality of tensioned-membrane filter elements, only here a different means of generating vibratory energy perpendicular to the membrane planes is shown, that being one or an array of ultrasonic vibration producing elements, such as but not limited to piezo-electric crystals or other ultrasonic transducing means 33. Once again, these ultrasonic vibratory generators transmit their reciprocating vibratory waves upwards (as positioned in FIG. 11), through the plurality of open-centered tensioned membrane filter elements, bouncing all of their membrane sheets and also all of the components of the process fluid, as described above and in FIGS. 4–9.

FIG. 12 depicts a slightly different construction embodiment, of a parallel-stacked plurality of plate frame type filter elements, each nonetheless anchoring and supporting its membranes through outer periphery tensioning, and with such stack of plate frame elements providing integral and internal plumbing and process fluid pressurization means. As with the embodiment shown in FIG. 10, means 31, 32 and 19 for directing vibratory wave energy perpendicular to and through all of the stacked parallel, open-centered tensioned membranes, provides the highly desirable membrane surface cleaning, or clogging-prevention effects claimed by the present invention.

4. Advantages of Being Able Vary the Degree of Tension Being Applied Across the Membrane Sheets, including During Continuous Filtering Operations.

FIGS. 13 through 15 illustrate a second major cleaning method and advantage made possible only by the membrane tensioning means of construction, namely the ability to vary at will the degree of tension being exerted on and across one or a plurality of membranes during operation. FIG. 13 shows a statically tensioned individual membrane sheet 23, providing a relatively non-moving and stable base, upon which typically a solids cake or a film of relatively solid materials tends to build up 45, due to fluid being pressurized or vacuumed to cause permeate flow through the membrane sheet, in a downwards direction 44 as shown in FIG. 13.

By relatively relaxing the tension across the membrane sheet 23, as shown in FIG. 14, the generally brittle buildup of solids cake, scale or filming tends to crack and lose its footing on the membrane surface 48, becoming unstable. FIG. 15 shows how the combination of the relatively crosswise direction of the process fluid travel in all such membrane devices, encountering the weakened solids cake, scale or film structure caused by the undulating tension changes, causes disruption of the solids cake structure, especially when relatively higher tension is resumed, with a relatively degree of abruptness, across the membrane face 46, thus allowing broken solids cake pieces to be moved across t the membrane surface by the direction of the overall process fluid flow. Several of the following embodiments serve to show practical means for applying this method of variable membrane tensioning, as an effective means for continuous membrane surface cleaning.

5. Embodiments Illustrating Practical Applications for Varying the Degree of Tension Being Applied Across Membrane Sheets, including During Continuous Filtering Operations.

Although the inventors can see ways of performing the variable tensioning of membranes during filter operation within filter elements or plate frame elements, and hereby claim such alternative embodiments, several more commercially buildable and practical alternative embodiments to such methods are presented below.

First, FIG. 16 presents methods for building what is termed a flexible membrane envelope. Such an envelope is notable in that the outer peripheral sealing between two relatively flexible membrane surfaces is provided, not by an outer supporting, anchoring and sealing element, but rather, integral to the flexible membrane edges themselves. In general, and as concurrently claimed in a separate application, such a flexible membrane envelope comprises two membrane sheets FIG. 16, 50, plus one or more separating and spacing elements 51 inserted between and in the interior space of these two membrane sheets.

In the case of the present invention and of this embodiment of that invention, said bleed cloth or netting serves a second function in addition to providing for membrane spacing. This second function is to reinforce certain structural qualities of the membrane sheets or the overall sandwich-like assembly of said sheets and the separating member or members, all in support of the tensioning method of filter element construction claimed herein. These reinforcing structural qualities are twofold. First, the bleed cloth, netting or other membrane separating member needs to be made of a material or of materials which offer a certain degree of elasticity, allowing said member and its related membranes to bounce and/or stretch within their outer anchoring members. Second, said material of construction needs to supply the structural quality of shape-holding, also known as memory. Thus, such a separating member, and its associated membrane sheets, may be stretched across their plane, or bounced similar to the motion of an elastic trampoline surface. To achieve this, the separating member and its membrane sheets as an assembly, all sealingly tensioned by the outer supporting, anchoring and tensioning member, must on their own return to their or its original shape, after being so stretched and/or bounced by an external force. Certain commercially available netting and bleed cloth materials offer these qualities.

To summarize, the two outer membrane sheets, the enclosed structurally reinforcing spacing element or elements and the sealingly joined outer peripheries, form a flexible membrane envelope. Along the peripheral edges of such envelope may additionally be means of connecting, anchoring and tensioning said edges to a separate, surrounding frame, rack or to the walls of a surrounding vessel.

FIG. 17 shows an embodiment comprising parallel stacked or mounted plurality of the resulting flexible membrane envelopes, with all of their edges mounted, anchored and tensionally supported by the surrounding walls of a vessel or tank. Once again, these embodiments are not included as the crux of the present invention, but only to set the stage for the vibratory cleaning improvements which they enable. For example, FIG. 18 shows a different view of multiple, tensioned membrane envelopes suspended and tensioned within a vessel or tank, with vibratory cleaning means 31, 32, 19 such as an air-driven or motor driven reciprocating linear vibrator, located relatively at one end of the vessel, and capable of transmitting vibratory wave energy perpendicular to and through all of the open-centered, tensioned membrane surfaces, again for the cleaning effects shown in FIG. 4-9 and in their explanatory text.

FIG. 19 shows a very similar embodiment to FIG. 18, except that means for injecting air or other gaseous bubbles under pressure, parallel with and along all of the upstream membrane surfaces is combined with the application of perpendicular vibration through the membrane centers. It should be here noted that a major cause of filter element clogging in many commercial systems, is the buildup of solids cake on upstream membrane surfaces. The membrane cleaning embodiment shown here in FIG. 19 provides two effects that combat such caking. First, the flexible but tensioned membrane elements, due to their basic construction, are permitted to waver and flutter slightly within their flexible mounting means. Relatively rigid solids cake has a much harder time clinging to such an undulating, wavering surface, than to the rigidly held surfaces of conventionally constructed filter elements. Second, the addition of vibratory wave energy transmitted perpendicularly through all the membranes adds the solids cake, scale and film destabilizing qualities to the surface of the membranes described previously in this invention. When combined with conventional air bubble cleaning, as in the cleaning shown in FIG. 19, the likelihood of being able to maintain exceptionally clean membrane surfaces continuously is even further enhanced.

The inventors, having furthered pursued additional technique for effecting vibratory cleaning methods and advantages of the present invention, next present FIG. 20. This represents a different embodiment of a flexible membrane envelope, although its construction means are virtually identical with those described in FIG. 16. However, in FIG. 20, said flexible tensioned envelope is substantially longer than it is wide, and indeed may comprise an essentially endless format, including means for breaking off relatively long segments without losing the sealing of the separately defined interior spaces.

FIGS. 21 through 23 depict additional membrane cleaning methods and combinations of such methods claimed by the present invention, which utilize the relatively endless flexible membrane envelope shown in FIG. 20. FIG. 21 is a top view of a tank or vessel 58, into which a relatively endless flexible membrane envelope 60 is immersed and covered by process fluid.

One end of the relatively endless flexible membrane envelop is delivered rolled up on a feed roller 61. It proceeds into the tank wound around an alternating series of tensioning rollers 65, and terminates outside the tank again on a take-up roller 63. Two improved cleaning means are claimed for this embodiments, which means are unavailable to filter elements constructed via means other than the inventors' membrane tensioning methods. First, all of the surfaces of the flexible membrane envelopes, now tensioned by the tensioning rollers 65, may be variably tensioned relatively tighter or relatively looser at will, during filtration operation. This variable tensioning results in the solids cake, scale or film shedding behavior depicted in FIGS. 13–15 and their accompanying text. Second, means of directing vibratory or ultrasonic wave energy 67 perpendicular to and through all of the open centered, tensioned membrane envelopes, may further enhance membrane cleaning effectiveness. In combination, these two cleaning effects discourage the buildup of solids cake, scale or film on all of the membrane surfaces, and/or may be used intermittently to remove such deposits therefrom.

FIG. 22 shows a very similar constructional layout to that of FIG. 21, but a different combination of membrane cleaning methods is illustrated. As in the embodiment of FIG. 21, variable tensioning of all of the tensioned flexible membrane envelopes is attained by tensioning rollers 65. However, here, instead of being combined with perpendicular vibration, this variable tensioning is combined with conventional air bubbling. FIG. 22 shows a plurality of air or other gaseous bubble injecting means such as injection jets, located on the floor of the tank and directing bubbles upwards parallel to all of the tensioned membrane surfaces. This combination provides all of the cleaning effects described in FIGS. 13–15, to loosen membrane surface contaminants which are then further scrubbed and moved away by the air bubbles. Such a combination makes air bubble cleaning far more effective than it is when used alone, and far more effective than it can be when used with rigidly constructed filter elements, whose solid surfaces are ideal for solids cake generation.

FIG. 23 shows all of the cleaning method improvements of FIGS. 21 and 22 combined in a single embodiment. Such a powerful cleaning method combination may be used to make membrane filtration practical for extremely difficult process fluids, such as those having very high concentrations of solids, colloidal materials, or scale building components.

6. Conventional Vibration of Membranes Parallel to their Membrane Surfaces Improved, by Simplified Vibration Generation and Combining Vibration Perpendicular to Membrane Planes, as Enabled by Membrane Tensioning Construction.

FIG. 24 shows the top view of a single filter element or of a single plate frame filter element, whose membrane envelope or sheets are supported, anchored and tensioned according to the inventors' membrane tensioning means of construction. Most important to consider, once again, is that this membrane tensioning means of construction achieves a filter element, such as that shown in FIG. 24, whose membrane work area is free of mechanical obstructions, and whose membrane materials, including their space-holding interior netting, are constructed so as to permit bouncing of the membrane surfaces, as by applied vibration to said surfaces.

If it were proven desirable to use conventionally known reciprocating, torsional vibration on such an element, its comparative lightness of weight, due to its tensional method of construction, over traditional constructional means, would be a first advantage. The inventors herein claim a second advantage for their tensional means of construction, as they enable an improved method for reciprocally and torsionally vibrating membrane surfaces. This method is to reciprocally and torsionally vibrate only a filter element, or a parallel-stacked plurality of such elements, within the relatively inert process fluid, and within a static and non-moving containment vessel, rather than to reciprocally and torsionally vibrate an entire filter apparatus, as is done in prior art.

A third, more important advantage is also claimed for this improved method of membrane surface cleaning. In any torsional movement of a filter element, whose reciprocating motion is indicated by the arrows on FIG. 24 78, relatively more movement is applied to the outer regions of a membrane sheet 72, and relatively less to the inner regions 73, because the outer regions simply have to travel further about their central axis of rotation than do the inner regions. This means that substantially less vibratory differential, between the moving membrane surfaces and the surrounding process fluid, can be developed toward the inner work zones of such filter devices.

FIG. 26 therefore presents an improved membrane surface cleaning method claimed as part of the present invention, namely the combination of reciprocating torsional vibration 78 of the filter elements, with vibratory energy 81 directed perpendicular to and through all of the membrane surfaces, as described previously in this application, via a vibratory generator 80 placed relatively as shown. Combining the two vectors or directions of vibration directed across and through membrane surfaces is seen as a method for substantially improving the cleaning ability of conventional, reciprocating and torsional motions. In particular, the relatively slowly moving central portions of the membranes are likely to receive the greatest surface cleaning boost by the addition of the vibrations passed therethrough perpendicularly.

7. Application of Improved Membrane Cleaning Methods and their Combinations to Spiral Wound Filter Elements.

FIG. 27 shows another, slightly different embodiment of the inventors' claimed flexible membrane envelope, as previously presented in FIGS. 16 and 20. In the embodiment of FIG. 27, such a flexible membrane envelope again comprises two membrane sheets, separated by one or more flexible spacing elements which allow the passage of fluid across the interior space of said envelope, parallel to the membrane surfaces, and which also help provide the two qualities of elasticity and memory to the resulting envelope. But here the membrane envelope is of a predetermined length and is configured to be spirally rolled or wound up on itself, as shown in FIG. 27. Means are also supplied, as in the other flexible membrane envelope embodiments, for the exit 85 of accumulating permeate fluid from one or more edges of the envelopes. This constructional embodiment is provided herein solely to show the practicality of the membrane cleaning effects that the construction of such a flexible membrane envelope enable.

FIG. 28 shows one embodiment means for enclosing, anchoring and tensioning such a spiral-wound, flexible membrane envelope. Note that the multi-layer, spiral winding format provides the high surface area, in a relatively small device, desirable for commercial filter applications. This embodiment includes means for tensioning all relatively opposed edges of the spiral flexible membrane envelope 86, means for process fluid ingress 88, means for the injection of conventional air bubble cleaning 89, means for permeate egress 85, and means for retentate egress 87. This embodiment is presented herein to demonstrate the practicality of such a device as a platform for delivering the following improved membrane cleaning effects.

In addition to conventional air bubble cleaning, parallel to the membrane surfaces, a second membrane surface cleaning technique for spiral wound filter elements is the ability to vary at will the tension placed on all the tensioned membrane surfaces. This technique includes flexibly mounting 92 the respectively opposed two membrane holding end caps (end caps shown as parts 90), and linearly and reciprocatingly moving at will said end caps, in alternating upwards and downwards directions as shown in FIG. 28 and 30, such as one or more linear motors, communicating to said end caps by driving means 93. Such linear movement may be applied to either one or both end caps. Using such means to move the end caps relatively closer together or relatively further apart is the method claimed for varying the tension on all of the membrane surfaces. Such variable tensioning achieves similar membrane cleaning effects as shown in FIGS. 13–15 and as described in their accompanying text, only this time in a spiral wound filtration device.

As described in other embodiments of this application, combining conventional air bubble cleaning with variable membrane surface tensioning enhances the ability of a spiral wound filtration device such as that shown in FIG. 28, to avoid surface clogging, perform continuous operation, and reduce other, intermittent or manual cleaning procedures.

FIGS. 29 and 30 repeat all the features and the two improved cleaning method embodiments of FIG. 28, but this additional spiral-wound membrane cleaning embodiment adds a third cleaning technique to further enhance the methods of FIG. 28. First, FIG. 29 shows a simplified top view of the spiral wound filter apparatus of FIG. 30. The only change is the addition, down the central core of the device, of a relatively eccentric shaped rod or stirring element 94. When rotated at varying speeds, the eccentric shape of said element produces and transmits vibrations radially outward, through all of the surrounding spirally wound membrane surfaces. FIG. 30 shows the addition of this vibration producing, additional cleaning method 94. In combination with the conventional air bubbling shown, and with the variable tensioning cleaning method, the direction of vibratory waves perpendicular to each individual point of every membrane surface will add to this embodiment cleaning effects shown in FIGS. 13–15, and described in their accompanying text.

8. Methods for Controlling, Managing or Minimizing Possible Chaotic Effects of Various Vibratory Cleaning Techniques.

This application has presented and claims various devices and methods for cleaning filtration membrane surfaces, via the use of vibration directed perpendicularly to and through tensioned membranes. In some cases, some such uses of vibration may produce secondary vibratory results such as reflected vibrations, which may conflict or interfere with, and thereby reduce the maximum achievable efficiency of the vibratory cleaning methods claimed.

Thus the present invention presents additional methods for management or minimization of such possible vibratory interference effects upon the efficacy of filter media and filtration systems.

FIG. 31 shows a parallel-stacked or mounted plurality of flexibly tensioned membrane envelopes, again whose surfaces are being continuously cleaned by the application of vibratory energy perpendicular to and through all the planes of the membranes. A first technique shown for controlling possible interfering vibratory reflections, primarily from that end of the vessel relatively opposed to the location of the vibratory generator, is the use of vibratory or acoustically absorbent material 95 located on said vessel end, for the purpose of absorbing vibrations and minimizing their reflection back into the work area of the vessel.

FIG. 32 depicts the same parallel-stacked or mounted plurality of flexibly tensioned membrane envelopes, with the same device for directing perpendicular vibration against and through all the membranes as FIG. 31. However, in this embodiment of an alternative method for managing or minimizing possible adverse affects of vibratory interference within the vessel, the entire vessel is sealingly immersed within and surrounded by a secondary pressuring means such a vessel. The space between the outer walls of the primary vessel and the inner walls of the surrounding vessel is filled with pressurizable fluid or gas. Said fluid or gas is kept at a pressure relatively the same as that within the primary vessel. Via sensing means on the wall of the primary vessel 97, an inlet valve using control logic means 98 can vary the pressure of the gas or fluid in the space between the inner and outer vessel, to maintain said equalized pressure with each of the two vessels. This allows the primary vibratory force to operate without any hindrance from pressure differential.

Finally, FIG. 33 presents a third means for managing or minimizing any adverse vibratory interference effects with a vessel. This embodiment repeats all of the membrane, membrane supporting, and vibratory-cleaning effect production methods of FIGS. 31 and 32.

This third embodiment uses a second vibratory driver 101, located at a point on the vessel relatively opposed to the primary such driver 31, with said secondary vibratory driver communicating to a flexible diaphragm-like vessel wall 99 via a connecting means 100. The function of this secondary vibratory driver is to actively move the secondary diaphragm 99, parallel to and in exact sync with the movements of the secondary diaphragm 19, such that interference reflections from the far end of the vessel from the primary vibratory source are actively cancelled. The actions of the secondary vibratory 101 are controlled via electronic logic connections and a processor 102, which monitors the vibratory actions of the primary vibrator 31. As with the embodiment of FIG. 32, the overall effect of this embodiment is to allow the use of vibratory force without any hindrance from pressure differential.

Additional features of the present invention include a vibratory source which drives energy for cleaning into planar faces of the envelopes.

The present invention also includes apparatus and methods for killing any return energy wave pattern which might start at a wall away from the vibration source.

One example includes an acoustic absorption sheet which may be used in a pressure vessel and which may be directly applied to far wall.

Although the present invention and its advantages have been described in detail, it should be understood that various changes, substitutions and alternations may be made without departing from the spirit and scope of the invention as defined by the following claims.

What is claimed is:

1. A filtration system operable to separate a process fluid into selected components comprising:
   a housing having at least one inlet operable to receive the process fluid;
   the housing having at least a first outlet for a concentrated fluid and a second outlet for a clarified fluid;
   a plurality of filter elements disposed within the housing;
   each filter element having a first membrane layer and a second membrane layer spaced from each other;
   a respective support element peripherally surrounding the membrane layers of each filter element;
   a central portion of each membrane layer having a generally open planar surface operable for contact with the process fluid and operable to separate the process fluid into the concentrated fluid and the clarified fluid;
   a first flow path coupling the concentrated fluid with the first outlet;
   a second flow path coupling the clarified fluid with the second outlet;
   an energy source operable to vibrate the central portion of each membrane without interruption of an association filtration process;
   energy absorbing material disposed within the housing opposite from the energy source; and
   the filter elements disposed between the energy absorbing material and the energy source.

2. The filtration system of claim 1 further comprising the energy source selected from the group consisting of a linear reciprocating mechanical vibrator, an ultrasonic vibrator, a sonic energy vibrator and a plurality of piezo-electric transducers.

3. The filtration system of claim 1 further comprising vibration energy directed substantially perpendicular with each membrane layer.

4. The filtration system of claim 1 further comprising vibration energy directed at an acute angle less than ninety degrees and more than ten degrees relative to each membrane layer.

5. A filtration system operable to separate a process fluid into selected components comprising:
   a housing having at least one inlet operable to receive the process fluid;
   the housing having at least a first outlet for a concentrated fluid and a second outlet for a clarified fluid;
   at least one filter element disposed within the housing;
   each filter element having a first membrane layer and a second membrane layer spaced from each other;
   a respective support element peripherally surrounding the membrane layers of each filter element;
   a central portion of each membrane layer having a generally open planar surface operable for contact with the process fluid and operable to separate the process fluid into the concentrated fluid and the clarified fluid;
   a first flow path coupling the concentrated fluid with the first outlet;
   a second flow path coupling the clarified fluid with the second outlet; and
   an energy source operable to vibrate the central portion of each membrane without interruption of an association filtration process; and
   at least one flexible outer wall generally aligned with the central portion of each membrane to facilitate vibratory cleaning of each membrane.

6. The filtration system of claim 5 further comprising a second flexible outer wall disposed in the housing generally opposite from the first flexible outer wall.

7. A filtration system for separating a process fluid into selected components comprising:
   a housing having at least one inlet to receive the process fluid;
   the housing having at least one outlet for a concentrated fluid and at least one outlet for a clarified fluid;
   at least one filter element disposed within the housing;
   each filter element having a first membrane layer and a second membrane layer spaced from each other;
   each membrane operable to separate the process fluid into the concentrated fluid and the clarified fluid;
   a first flow path coupling the concentrated fluid with the at least one outlet therefore;
   a second flow path coupling the clarified fluid with the at least one outlet therefore;
   an energy source operable to vibrate a central portion of each membrane without interruption of an association filtration process;
   the housing having at least one flexible outer wall generally aligned with the central portion of each membrane to facilitate cleaning of each membrane; and
   an energy source coupled with the at least one flexible outer wall and operable to vibrate the central portion of each membrane.

8. A method for separating a process fluid stream into a clarified fluid stream and a concentrated fluid stream comprising:
   applying tension to a plurality of flexible filter elements by tension applying means attached to the filter elements with each flexible filter element having a relatively open work space to accommodate cleaning of the flexible filter element without stopping an associated filtration process;
   communicating the process fluid to at least one inlet of a filtration system;
   directing the process fluid to contact the plurality of flexible filter elements disposed within the filtration system;
   separating the clarified fluid from the process fluid by the clarified fluid flowing through at least one work surface of each flexible filter element;
   directing the clarified fluid to at least one respective outlet from the filtration system;
   directing the remaining concentrated fluid to at least one respective outlet from the filtration system; and
   applying energy to each flexible filter element to clean the respective flexible filter element by removing any accumulation of scale, solids cake or film from each flexible filter element.

9. The method of claim 8 further comprising directing acoustic energy to clean the at least one surface of each filter element.

10. The method of claim 8 further comprising directing sonic energy to clean the at least one surface of each filter element.

11. The method of claim 8 further comprising vibrating each filter element to clean the at least one surface which separates the clarified fluid from the process fluid.

12. The method of claim 8 further comprising combining a first method for cleaning each filter element with a second method for cleaning each filter element.

13. The method of claim 8 further comprising alternatively tensioning and relaxing a membrane sheet disposed within each filter element to clean the respective filter element by removing any buildup of scale, solids cake or film on the associated membrane sheet.

14. The method of claim 8 further comprising alternately flexing a membrane sheet disposed within each filter element to clean the respective filter element by removing any buildup of scale, solids cake or film on the associated membrane sheet.

15. The method of claim 8 further comprising producing reciprocating linear mechanical vibration energy using a motor powered vibrator and applying the energy to each flexible filter element.

16. A method for separating a process fluid into a clarified fluid and a concentrated fluid comprising:
   communicating the process fluid to at least one inlet of a housing;
   directing the process fluid to contact at least one filter element disposed within the housing;
   applying tension along two or more edges of each filter element using a tensionable connector supported on a surrounding support member;
   separating the clarified fluid from the process fluid by the clarified fluid flowing through a central portion of at least one surface of each filter element;
   directing the clarified fluid to at least one respective outlet from the housing;
   directing the remaining concentrated fluid to at least one respective outlet from the housing;
   applying vibration energy to each filter element to remove or inhibit any accumulation of scale, solids cake or film;
   producing the vibration energy using an air powered vibratory generator, and
   directing vibration energy selected from the group consisting of acoustic or ultrasonic through at least one membrane sheet disposed within each filter element;
   bouncing the at least one membrane sheet with the vibration energy to displace any solids, particulate and colloidal matter from at least one surface of the at least one membrane sheet to allow clarified fluid to flow through the at least one membrane sheet; and
   directing the vibration energy through at least a second membrane sheet disposed within each filter element.

17. A method for forming a filtration system operable to separate a process fluid into selected components comprising:
   forming a housing having at least one inlet operable to receive a process fluid;
   forming at least a first outlet from the housing for a retentenate fluid to exit from the housing;
   forming at least one second outlet from the housing for a permeate fluid to exit the housing;
   forming at least one spiral wound membrane envelope;
   attaching the at least one spiral wound membrane envelope with a first end cap and a second end cap;
   installing the at least one spiral wound membrane envelope and attached end caps in the housing;
   connecting at least one conduit with a chamber formed within each membrane envelope to allow communication of permeate fluid from the chamber to the second outlet from the housing; and
   applying vibration energy to the membrane envelope to clean any scale, solids cake and film from upstream surfaces of each membrane envelope;
   reciprocating each membrane envelope and attached end caps relative to the housing during an associated filtration process; and
   applying vibration energy to each membrane envelope while reciprocating the first end cap and the second end cap.

18. The method of claim 17 further comprising:
   placing the housing within a second pressure vessel; and
   controlling variations in fluid pressure within the second pressure vessel and the housing during a filtration process.

19. A method for separating a process fluid stream into a clarified fluid stream and a concentrated fluid stream during a filtration process comprising:
   applying tension to a plurality of flexible filter elements using means for tensioning each flexible filter elements attached with each flexible filter element and each filter element having at least one working space to accommodate cleaning of the flexible filter element without stopping the filtration process;
   communicating the process fluid stream to at least one inlet of an associated filtration system;
   directing the process fluid stream to contact the plurality of flexible filter elements disposed within the filtration system;
   separating the process fluid stream into the concentrated fluid stream and the clarified fluid stream by flowing the clarified fluid stream through the flexible filter elements;
   directing the clarified fluid stream to at least one outlet from the filtration system; directing the concentrated fluid stream to at least one outlet from the filtration system;
   applying energy to each flexible filter element to clean the respective flexible filter element by removing any accumulation of scale, solids cake or film on the at least one working surface of each flexible filter element;
   directing a reciprocating energy wave selected from the group consisting of vibration, acoustic and ultrasonic through the at least one working surface of each filter element; and
   bouncing each working surface with the energy wave to displace any solids, particulate and colloidal matter from the at least one working surface of each filter element to allow clarified fluid to flow through the associated working surface.

* * * * *